(12) United States Patent
Kondou et al.

(10) Patent No.: US 7,790,915 B2
(45) Date of Patent: Sep. 7, 2010

(54) NAPHTHALENE COMPOUND WITH TERMINAL HYDROGEN, LIQUID CRYSTAL COMPOSITION INCLUDING THE COMPOUND, AND LCD DEVICE INCLUDING THE LIQUID CRYSTAL COMPOSITION

(75) Inventors: Tomoyuki Kondou, Chiba (JP); Shuichi Matsui, Chiba (JP); Keiji Kimura, Chiba (JP)

(73) Assignees: Chisso Petrochemical Corporation, Tokyo (JP); Chisso Corporation, Osaka (JP)

( * ) Notice: Subject to any disclaimer, the term of this patent is extended or adjusted under 35 U.S.C. 154(b) by 0 days.

(21) Appl. No.: 11/470,538

(22) Filed: Sep. 6, 2006

(65) Prior Publication Data

US 2007/0051919 A1 Mar. 8, 2007

(30) Foreign Application Priority Data

Sep. 8, 2005 (JP) .............................. 2005-260157

(51) Int. Cl.
*C07C 69/00* (2006.01)
*C07D 213/20* (2006.01)
*C07D 239/00* (2006.01)
*C09K 19/20* (2006.01)

(52) U.S. Cl. .................. 560/65; 546/348; 544/242; 252/299.67

(58) Field of Classification Search .............. None
See application file for complete search history.

(56) References Cited

U.S. PATENT DOCUMENTS 6,159,561 A * 12/2000 Schmidt et al. ............. 428/1.1
6,468,607 B1 10/2002 Takehara et al. ............ 428/1.1

FOREIGN PATENT DOCUMENTS

| DE | 10251017 | | 5/2003 |
|---|---|---|---|
| EP | 1544187 | | 6/2005 |
| GB | 2 227 019 | | 7/1990 |
| GB | 2 271 771 | | 4/1994 |
| GB | 2271771 | | 4/1994 |
| JP | 62223155 | * | 10/1987 |
| JP | 04-504571 | | 8/1992 |
| JP | 10221890 | * | 8/1998 |
| JP | 2001-26560 | | 1/2001 |
| JP | 2001-026560 | | 1/2001 |
| WO | WO 9006119 | | 6/1990 |
| WO | WO 2004029015 | | 4/2004 |

OTHER PUBLICATIONS

Maya et al., Journal of Medicinal Chemistry (2005), 48(2), 556-568.*
Han et al., Synlett (2002), (6), 871-874.*
Katritzky et al., Journal of Organic Chemistry (2002), 67(21), 7526-7529.*
Furukawa et al., Chemistry Express (1989), 4(5), 337-40.*
Ittah et al., Journal of Fluorine Chemistry (1980), 16(2), 137-44.*
Robinson et al., Journal of the Chemical Society, Perkin Transactions 1: Organic and Bio-Organic Chemistry (1972-1999) (1972), (9-10), 1277-81.*
Johnson et al., Journal of the Chemical Society (1962) 4652-5.*
Martinez et al., Journal of Organometallic Chemistry (1970), 23(2), 285-90.*
Yamamoto et al., Nippon Kagaku Kaishi (1989), (9), 1587-92.*
Database Caplus citation 1998:406222 [retrieved Nov. 6, 2009] from STN, Columbus, OH, USA.*
A. K. Prajapati "Effect of lateral methyl group on azo-mesogens containing the naphthalene moiety" Liquid Crystals ISSN 0267-8292, vol. 27, No. 8, 2000 Taylor & Francis Ltd., pp. 1017-1020.

* cited by examiner

*Primary Examiner*—Karl J Puttlitz
(74) *Attorney, Agent, or Firm*—J.C. Patents

(57) ABSTRACT

A liquid crystal (LC) compound having generally required physical properties, low viscosity, proper optical anisotropy, proper dielectric anisotropy and good compatibility with other LC compounds is described. An LC composition including the compound and an LCD device including the composition are also described. The compound is expressed by formula (1a):

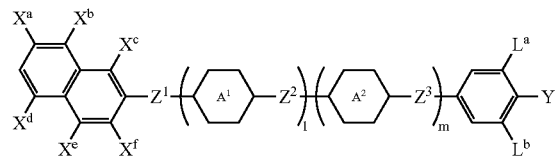

(1a)

wherein the ring $A^1$ and the ring $A^2$ are independently 1,4-phenylene, pyridine-2,5-diyl, pyrimidine-2,5-diyl or naphthalene-2,6-diyl, in which any hydrogen can be replaced by halogen; $Z^1$, $Z^2$ and $Z^3$ are independently a single bond, —$(CH_2)_2$—, —$(CH_2)_4$—, —CH=CH—, —C≡C—, —$CF_2O$—, —$OCF_2$—, —COO— or —OCO—; $X^a$, $X^b$, $X^c$, $X^d$, $X^e$ and $X^f$ are independently hydrogen or fluorine; Y is —$OCH_2F$, —$OCHF_2$, —$OCF_3$, —$SCH_2F$, —$SCHF_2$, —$SCF_3$, —$CH_2F$, —$CHF_2$, —$CF_3$, fluorine or chlorine; $L^a$ and $L^b$ are independently hydrogen or fluorine; and "l" and "m" are independently equal to 0 or 1.

31 Claims, No Drawings

NAPHTHALENE COMPOUND WITH TERMINAL HYDROGEN, LIQUID CRYSTAL COMPOSITION INCLUDING THE COMPOUND, AND LCD DEVICE INCLUDING THE LIQUID CRYSTAL COMPOSITION

CROSS-REFERENCE TO RELATED APPLICATION

This application claims the priority benefit of Japan application serial no. 2005-260157, filed on Sep. 8, 2005. All disclosure of the Japan application is incorporated herein by reference.

BACKGROUND OF THIS INVENTION

1. Field of this Invention

This invention relates to a liquid crystal (LC) compound, an LC composition and a liquid crystal display (LCD) device, and more particularly relates to a naphthalene compound with a terminal hydrogen atom, an LC composition including the compound and an LCD device including the liquid crystal composition.

2. Description of the Related Art

In a LCD device, classification based on an operating mode of LCs includes phase change (PC), twisted nematic (TN), in-plane switching (IPS), super twisted nematic (STN), optically compensated bend (OCB), electrically controlled birefringence (ECB), vertical alignment (VA) and so forth. Classification based on a driving mode includes a passive matrix (PM) and an active matrix (AM). The PM is further classified into static, multiplex and so forth, and the AM is further classified into a thin film transistor (TFT), a metal-insulator-metal (MIM) and so forth. Each of the LCD devices includes an LC composition with suitable properties. In order to improve the general properties of LCD devices, the LC compositions are required to have the following general properties:

| No. | General property of LC compositions | General property of LCD devices |
|---|---|---|
| 1 | being thermally stable | long lifetime |
| 2 | being UV-stable | long lifetime |
| 3 | wide temperature range for nematic phase | wide temperature range for use |
| 4 | low viscosity | short response time |
| 5 | low threshold voltage | low power consumption |
| 6 | high specific resistance | high voltage holding ratio |

In addition, the LC composition should allow UV to be applied in the LCD process. It is also desired that the LC composition can be injected into an LC cell in a short period.

The above properties 1-6 are all important to an LC composition used in an AM devices while only the properties 1-5 are important to that used in a PM device. Except the above properties, the optical anisotropy ($\Delta n$), the dielectric anisotropy ($\Delta \in$), the elastic constants and so forth are also important. For a single LC compound cannot meet all the requirements, multiple LC compounds are mixed into an LC composition in use. Hence, good compatibility between LC compounds is required, especially in low-temperature conditions. Meanwhile, because recently LCD devices are miniaturized and the device driving voltage is lowered, LC compositions with low threshold voltages are required. According to H. J. Deuling, et al., *Mol. Cryst. Liq. Cryst.*, 27 (1975) 81, the threshold voltage ($V_{th}$) can be expressed by the following equation:

$$V_{th} = \pi [K/(\in_0 \cdot \Delta \in)]^{1/2}$$

wherein K is the elastic constant of the composition and $\in_0$ is the dielectric constant of vacuum. According to the equation, the $V_{th}$ value can be lowered in two ways, i.e., increasing the dielectric anisotropy ($\Delta \in$) or decreasing the elastic constant. However, since controlling the elastic constant of an LC composition is difficult, LC compositions with large dielectric anisotropy are usually used, thus causing great development of LC compounds with large dielectric anisotropy.

Moreover, for the techniques of fabricating LCD substrates are better recently, the cell gap tends to be smaller, especially for the AM devices of TN mode, OCB mode or the like. The cell gap is the distance between the two substrates, being equal to the thickness of the LC composition. When the cell gap of a TN-mode device is small, the response time is short and a reverse domain is difficult to form. When the cell gap of an OCB-mode device is small, the transfer time from splay alignment to bend alignment becomes short, and the response time, i.e., the time needed for the alignment of the LC molecules to change in response to the change of the applied voltage, is also short.

In addition, the product ($\Delta n \times d$) of the optical anisotropy ($\Delta n$) and the cell gap (d) is constant for the above modes. In such a case, the optical anisotropy should be large if the cell gap is small, so that a composition with large optical anisotropy is required. Hence, LC compounds with large optical anisotropy are also greatly developed, as described in the following patent documents: Japan Patent Publication No. Hei 4-504571, Japan Patent Publication No. 2001-26560, GB 2227019A, GB 2271771A, DE 10251017A and WO 2004/029015 pamphlet.

SUMMARY OF THIS INVENTION

Issues to be Solved

One object of this invention is to provided an LC compound having generally required physical properties, low viscosity, proper optical anisotropy, proper dielectric anisotropy and good compatibility with other LC compounds. Another object is to provide an LC composition that includes the LC compound and thereby has a wide temperature range for nematic phase, low viscosity, proper optical anisotropy and low threshold voltage. Still another object is to provide an LCD device that includes the LC composition and thereby has short response time, low electric power consumption, high contrast and high voltage holding ratio.

Solutions for the Issues

For the above objects, this invention includes the following items.

The 1$^{st}$ item is a compound expressed by formula (1a):

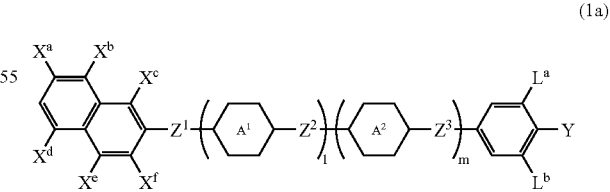

(1a)

wherein the ring $A^1$ and the ring $A^2$ are independently 1,4-phenylene, pyridine-2,5-diyl, pyrimidine-2,5-diyl or naphthalene-2,6-diyl, in which any hydrogen can be replaced by halogen; $Z^1$, $Z^2$ and $Z^3$ are independently a single bond, —(CH$_2$)$_2$—, —(CH$_2$)$_4$—, —CH═CH—, —C≡C—, —CF$_2$O—, —OCF$_2$—, —COO— or —OCO—; $X^a$, $X^b$, $X^c$, $X^d$, $X^e$ and $X^f$ are independently hydrogen or fluorine; Y is —OCH$_2$F, —OCHF$_2$, —OCF$_3$, —SCH$_2$F, —SCHF$_2$, —SCF$_3$, —CH$_2$F, —CHF$_2$, —CF$_3$, fluorine or chlorine; $L^a$ and $L^b$ are independently hydrogen or fluorine; and "l" and "m" are independently equal to 0 or 1.

The 2$^{nd}$ item is a compound expressed by formula (1b):

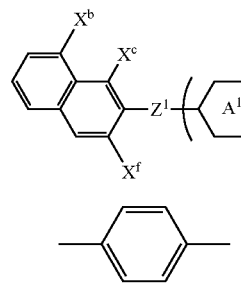
(1b)

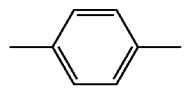
(a)

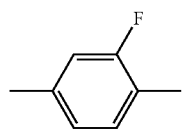
(b)

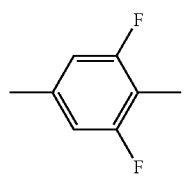
(c)

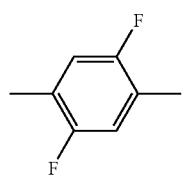
(d)

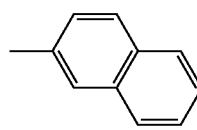
(e)

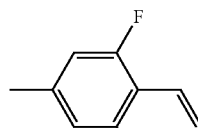
(f)

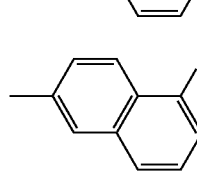
(g)

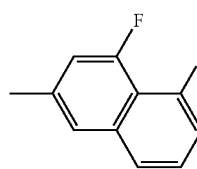
(h)

-continued

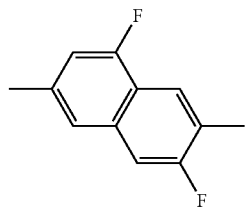
(i)

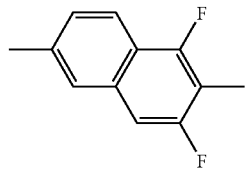
(j)

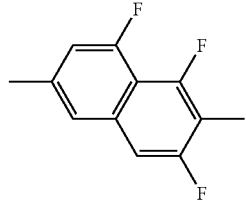
(k)

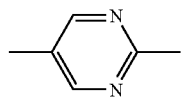
(l)

wherein the ring $A^1$ and the ring $A^2$ each is selected from the above ring structures (a)-(1); $Z^1$, $Z^2$ and $Z^3$ are independently a single bond, —(CH$_2$)$_2$—, —CH=CH—, —C≡C—, —CF$_2$O—, —OCF$_2$—, —COO— or —OCO—; $X^b$, $X^c$ and $X^f$ are independently hydrogen or fluorine; Y is —OCH$_2$F, —OCHF$_2$, —OCF$_3$, —CH$_2$F, —CHF$_2$, —CF$_3$, fluorine or chlorine; $L^a$ and $L^b$ are independently hydrogen or fluorine; and "l" and "m" are independently equal to 0 or 1.

The 3$^{rd}$ item is a compound of the 2$^{nd}$ item, wherein in formula (1b), the ring $A^1$ and the ring $A^2$ each is selected from the ring structures (a)-(d); $Z^1$, $Z^2$ and $Z^3$ are independently a single bond, —(CH$_2$)$_2$—, —CF$_2$O— or —COO—; $X^b$ and $X^f$ are hydrogen and $X^c$ is hydrogen or fluorine; Y is —OCF$_3$, fluorine or chlorine; $L^a$ and $L^b$ are independently hydrogen or fluorine; and "l" and "m" are independently equal to 0 or 1.

The 4$^{th}$ item is a compound expressed by any one of formulae (1c-1) to (1c-3):

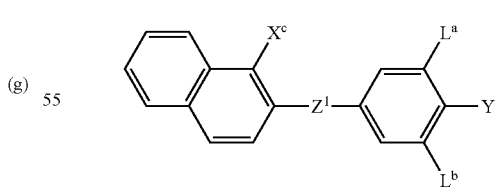
(1c-1)

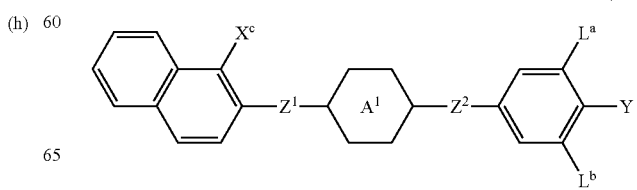
(1c-2)

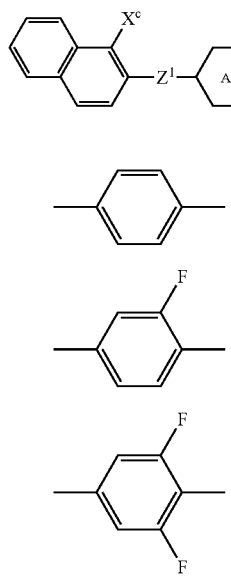

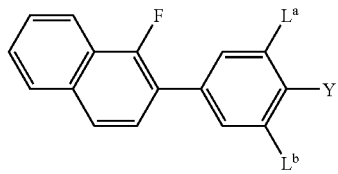

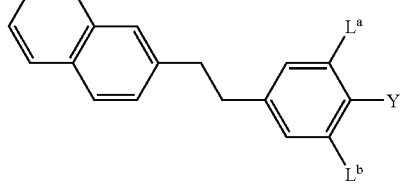

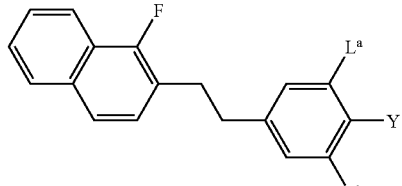

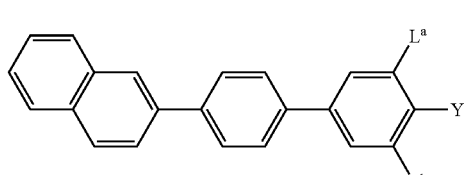

wherein the ring $A^1$ and the ring $A^2$ each is selected from the ring structures (a)-(c); $Z^1$, $Z^2$ and $Z^3$ are independently a single bond, —$(CH_2)_2$—, —$CF_2O$— or —COO—; $X^c$ is hydrogen or fluorine; Y is —$OCF_3$, fluorine or chlorine; and $L^a$ and $L^b$ are independently hydrogen or fluorine.

The 5th item is a compound of the 4th item, wherein in formulae (1c-1) to (1c-3), $Z^1$ is a single bond or —$(CH_2)_2$—.

The 6th item is a compound of the 4th item, wherein in formulae (1c-1) to (1c-3), $Z^1$, $Z^2$ and $Z^3$ each is a single bond.

The 7th item is a compound of the 4th item, wherein in formulae (1c-1) to (1c-3), $Z^1$ is —$(CH_2)_2$— and $Z^2$ and $Z^3$ each is a single bond.

The 8th item is a compound of the 4th item, wherein in formulae (1c-2) and (1c-3), $Z^1$ and $Z^3$ each is a single bond and $Z^2$ is —$(CH_2)_2$—.

The 9th item is a compound of the 4th item, wherein in formula (1c-3), $Z^1$ and $Z^2$ each is a single bond and $Z^3$ is —$(CH_2)_2$—.

The 10th item is a compound of the 4th item, wherein in formulae (1c-1) to (1c-3), one of $Z^1$, $Z^2$ and $Z^3$ is —$CF_2O$— and the rest is single bond.

The 11th item is a compound of the 4th item, wherein in formulae (1c-1) to (1c-3), one of $Z^1$, $Z^2$ and $Z^3$ is —COO— and the rest is single bond.

The 12th item is a compound expressed by any one of formulae (1c-1-1) to (1c-1-4) and formulae (1c-2-1) to (1c-2-12):

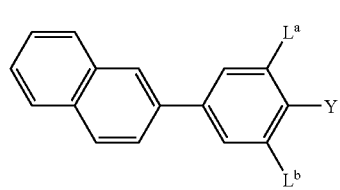

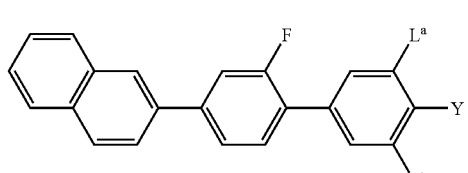

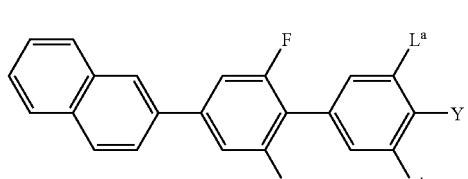

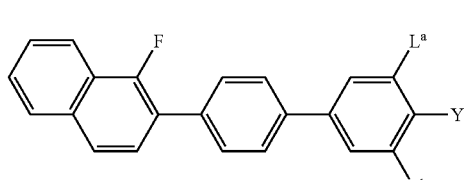

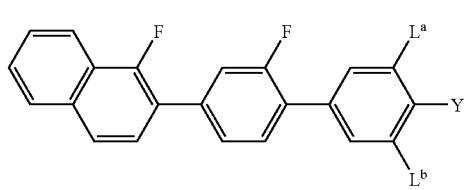

-continued (1c-2-6)
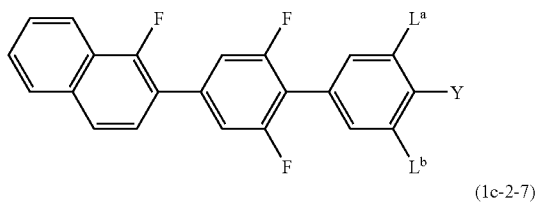
(1c-2-7)

(1c-2-8)
(1c-2-9)
(1c-2-10)
(1c-2-11)
(1c-2-12)
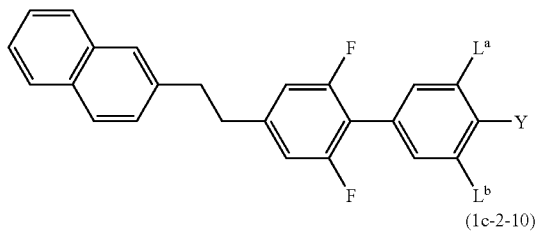
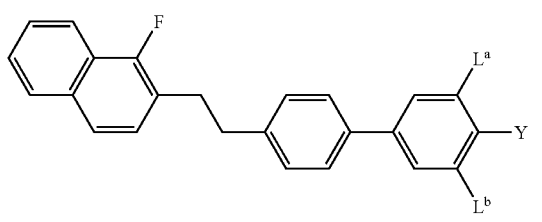
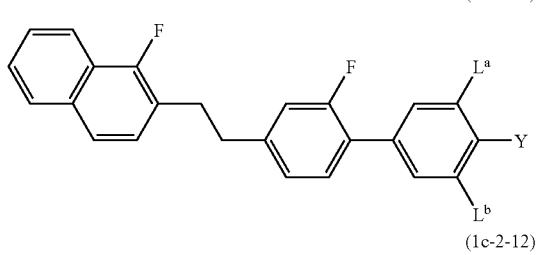
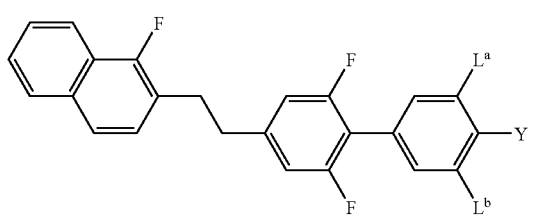

wherein Y is —OCF$_3$, fluorine or chlorine, and L$^a$ and L$^b$ are independently hydrogen or fluorine.

The 13$^{th}$ item is a compound of the 12$^{th}$ item, wherein in any one of formulae (1c-1-1) to (1c-1-4) and formulae (1c-2-1) to (1c-2-12), Y is —OCF$_3$ and L$^a$ and L$^b$ are hydrogen.

The 14$^{th}$ item is a compound of the 12$^{th}$ item, wherein in any one of formulae (1c-1-1) to (1c-1-4) and formulae (1c-2-1) to (1c-2-12), Y is —OCF$_3$, L$^a$ is fluorine and L$^b$ is hydrogen.

The 15$^{th}$ item is a compound of the 12$^{th}$ item, wherein in any one of formulae (1c-1-1) to (1c-1-4) and formulae (1c-2-1) to (1c-2-12), Y is —OCF$_3$ and L$^a$ and L$^b$ are fluorine.

The 16$^{th}$ item is a compound of the 12$^{th}$ item, wherein in any one of formulae (1c-1-1) to (1c-1-4) and formulae (1c-2-1) to (1c-2-12), Y is fluorine and L$^a$ and L$^b$ are hydrogen.

The 17$^{th}$ is a compound of the 12$^{th}$ item, wherein in any one of formulae (1c-1-1) to (1c-1-4) and formulae (1c-2-1) to (1c-2-12), Y is fluorine, L$^a$ is fluorine and L$^b$ is hydrogen.

The 18$^{th}$ item is a compound of the 12$^{th}$ item, wherein in any one of formulae (1c-1-1) to (1c-1-4) and formulae (1c-2-1) to (1c-2-12), Y is fluorine and L$^a$ and L$^b$ are fluorine.

The 19$^{th}$ item is a compound of the 12$^{th}$ item, wherein in any one of formulae (1c-1-1) to (1c-1-4) and formulae (1c-2-1) to (1c-2-12), Y is chlorine and L$^a$ and L$^b$ are hydrogen.

The 20$^{th}$ item is a compound of the 12$^{th}$ item, wherein in any one of formulae (1-c-1-1) to (1c-1-4) and formulae (1c-2-1) to (1c-2-12), Y is chlorine, L$^a$ is fluorine and L$^b$ is hydrogen.

The 21$^{st}$ item is a compound of the 12$^{th}$ item, wherein in any one of formulae (1c-1-1) to (1c-1-4) and formulae (1c-2-1) to (1c-2-12), Y is chlorine and L$^a$ and L$^b$ are fluorine.

The 22$^{nd}$ item is a liquid crystal composition including two or more compounds, which includes at least one compound of any one of the 1$^{st}$ to 21$^{st}$ items.

The 23$^{rd}$ item is a liquid crystal composition of the 22$^{nd}$ item that further includes at least one compound selected from the group consisting of compounds respectively expressed by formulae (2), (3) and (4):

(2)
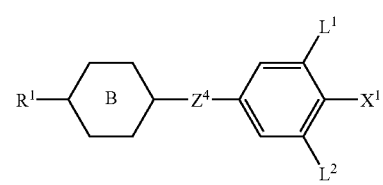

(3)
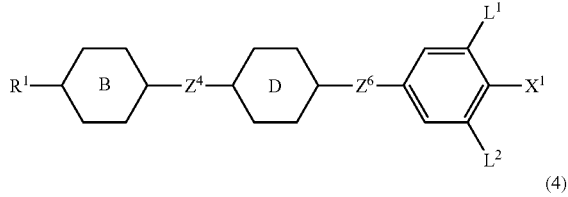

(4)

wherein R$^1$ is alkyl with 1-10 carbon atoms, in which any —CH$_2$— can be replaced by —O— or —CH=CH— and any hydrogen can be replaced by fluorine; $X^1$ is fluorine, chlorine, —OCF$_3$, —OCHF$_2$, —CF$_3$, —CHF$_2$, —CH$_2$F, —OCF$_2$CHF$_2$ or —OCF$_2$CHFCF$_3$; the ring B and the ring D are independently 1,4-cyclohexylene, 1,3-dioxane-2,5-diyl, or 1,4-phenylene in which any hydrogen can be replaced by fluorine; the ring E is 1,4-cyclohexylene, or 1,4-phenylene in which any hydrogen can be replaced by fluorine; $Z^4$ and $Z^5$ are independently —(CH$_2$)$_2$—, —(CH$_2$)$_4$—, —COO—, —CF$_2$O—, —OCF$_2$—, —CH=CH— or a single bond; and $L^1$ and $L^2$ are independently hydrogen or fluorine.

The 24$^{th}$ item is a liquid crystal composition of the 22$^{nd}$ item that further includes at least one compound selected from the group consisting of compounds respectively expressed by formulae (5) and (6):

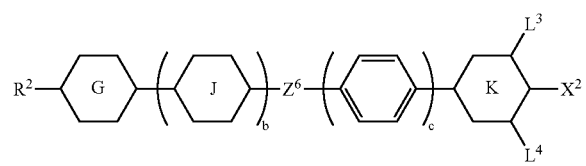

(5)

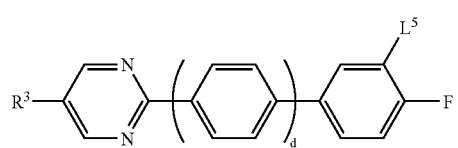

(6)

wherein $R^2$ and $R^3$ are independently alkyl with 1-10 carbon atoms, in which any —CH$_2$— can be replaced by —O— or —CH=CH— and any hydrogen can be replaced by fluorine; $X^2$ is —CN or —C≡C—CN; the ring G is 1,4-cyclohexylene, 1,4-phenylene, 1,3-dioxane-2,5-diyl or pyrimidine-2,5-diyl; the ring J is 1,4-cyclohexylene, pyrimidine-2,5-diyl, or 1,4-phenylene in which any hydrogen can be replaced by fluorine; the ring K is 1,4-cyclohexylene or 1,4-phenylene; $Z^6$ is —(CH$_2$)$_2$—, —COO—, —CF$_2$O—, —OCF$_2$— or a single bond; $L^3$, $L^4$ and $L^5$ are independently hydrogen or fluorine; and "b", "c" and "d" are independently equal to 0 or 1.

The 25$^{th}$ item is a liquid crystal composition of the 22$^{nd}$ item that further includes at least one compound selected from the group consisting of compounds respectively expressed by formulae (7), (8), (9), (10) and (11):

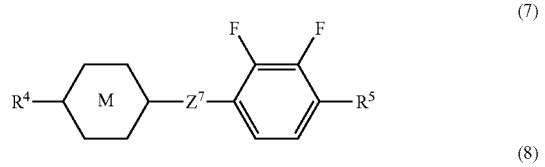

(7)

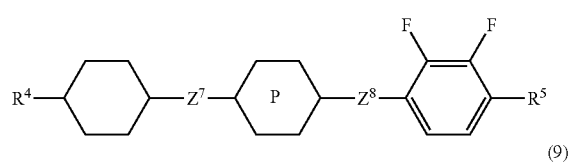

(8)

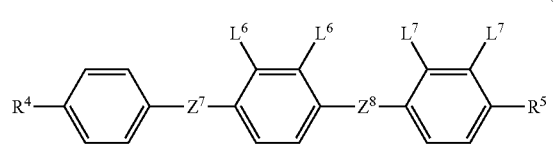

(9)

-continued

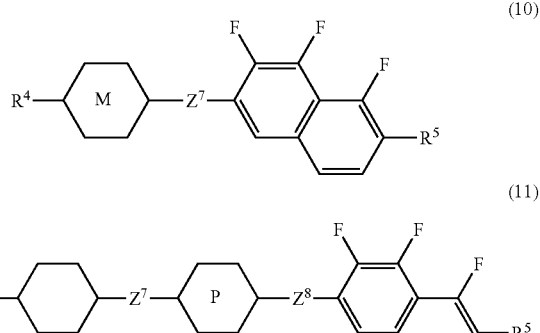

(10)

(11)

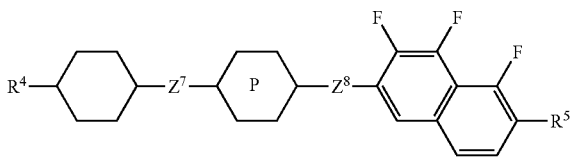

wherein $R^4$ is alkyl with 1-10 carbon atoms, in which any —CH$_2$— can be replaced by —O— or —CH=CH— and any hydrogen can be replaced by fluorine; $R^5$ is fluorine or alkyl with 1-10 carbon atoms, in which any —CH$_2$— can be replaced by —O— or —CH=CH— and any hydrogen can be replaced by fluorine; the ring M and the ring P are independently 1,4-cyclohexylene, 1,4-phenylene or decahydro-2,6-naphthylene; $Z^7$ and $Z^8$ are independently —(CH$_2$)$_2$—, —COO— or a single bond; $L^6$ and $L^7$ are independently hydrogen or fluorine, while at least one of $L^6$ and $L^7$ is fluorine.

The 26$^{th}$ item is a liquid crystal composition of the 22$^{nd}$ item that further includes at least one compound selected from the group consisting of compounds respectively expressed by formulae (12), (13) and (14):

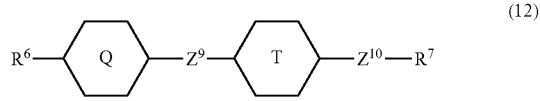

(12)

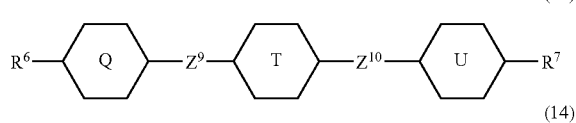

(13)

(14)

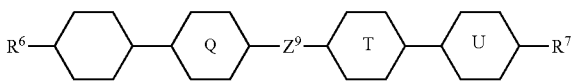

wherein $R^6$ and $R^7$ are independently alkyl with 1-10 carbon atoms, in which any —CH$_2$— can be replaced by —O— or —CH=CH— and any hydrogen can be replaced by fluorine; the ring Q, the ring T and the ring U are independently 1,4-cyclohexylene, pyrimidine-2,5-diyl, or 1,4-phenylene in which any hydrogen can be replaced by fluorine; and $Z^9$ and $Z^{10}$ are independently —C≡C—, —COO—, —(CH$_2$)$_2$—, —CH=CH— or a single bond.

The 27$^{th}$ item is a liquid crystal composition of the 23$^{rd}$ item that further includes at least one compound selected from the group consisting of compounds respectively expressed by formulae (5) and (6) in the 24$^{th}$ item.

The 28$^{th}$ item is a liquid crystal composition of the 23$^{rd}$ item that further includes at least one compound selected from the group consisting of compounds respectively expressed by formulae (12), (13) and (14) in the 26$^{th}$ item.

The 29$^{th}$ item is a liquid crystal composition of the 24$^{th}$ item that further includes at least one compound selected from the group consisting of compounds respectively expressed by formulae (12), (13) and (14) in the 26th item.

The 30th item is a liquid crystal composition of the 25th item that further includes at least one compound selected from the group consisting of compounds respectively expressed by formulae (12), (13) and (14) in the 26th item.

The 31st item is a liquid crystal composition of any one of the 22nd to 30th items that further includes at least one optically active compound.

The 32nd item is a liquid crystal display (LCD) device that includes the liquid crystal composition of any one of the 22nd to 31st items.

EFFECTS OF THIS INVENTION

The LC compound of this invention is positively large in the dielectric anisotropy and the optical anisotropy, and is also excellent in the properties generally required for an LC composition. The LC composition including the LC compound has the properties generally required for an LC composition, and is large in the dielectric anisotropy and the optical anisotropy. Such an LC composition is particularly useful in lowering the driving voltage of the LCD device, and is also particularly useful to an LCD device having a small cell gap for high-speed response.

DESCRIPTION OF THE PREFERRED EMBODIMENTS

The terminology used is this specification is described as follows. The term "liquid crystal compound" is a general term for a compound having a LC phase like nematic phase or smectic phase, and so forth, and for a compound having no LC phase but is useful as a component of LC composition. An LC compound, an LC composition and an LCD device are often simply called a compound, a composition and a device, respectively. The term "LCD device" is the general term for a LCD panel and a LCD module. The upper-limit temperature of a nematic phase is the phase transition temperature from the nematic phase to an isotropic phase, sometimes simply called an upper-limit temperature, while the lower-limit temperature of a nematic phase is sometimes simply called a lower-limit temperature. The compounds respectively expressed by formulae (1a), (1b), (1c-1), (1c-2) and (1c-3) are often simply called compounds (1a), (1b), (1c-1), (1c-2) and (1c-3), respectively. This abbreviation rule is also applied to the compounds respectively expressed by formulae (1c-1-1) to (1c-1-4), formulae (1c-2-1) to (1c-2-12) and formula (2). Moreover, the compounds (1a), (1b), (1c-1) to (1c-3), (1c-1-1) to (1c-1-4) and (1c-2-1) to (1c-2-12) are generally called compounds (1). In formulae (2) to (14), the hexagonal symbols with B, D, E and so forth respectively enclosed therein correspond to rings B, D, E and so forth, respectively. The amount of a compound expressed with "%" means the percentage by weight based on the total weight of the composition.

The compound expressed by formula (1a) of this invention is described below.

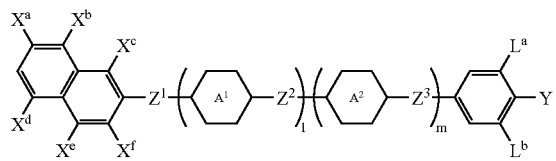

(1a)

In formula (1a), the ring $A^1$ and the ring $A^2$ are independently 1,4-phenylene, pyridine-2,5-diyl, pyrimidine-2,5-diyl or naphthalene-2,6-diyl, in which any hydrogen can be replaced by halogen.

The preferred examples of the ring groups in which one or more hydrogen atoms have been replaced by halogen include the following ring groups (15-1) to (15-21), wherein (15-2), (15-3), (15-4), (15-12), (15-13), (15-14), (15-15), (15-16) and (15-17) are more preferred.

(15-1)

(15-2)

(15-3)

(15-4)

(15-5)

(15-6)

(15-7)

(15-8)

-continued

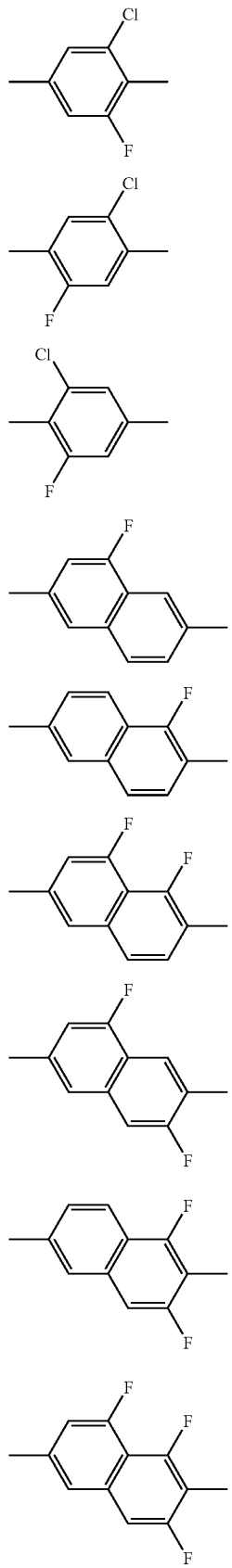

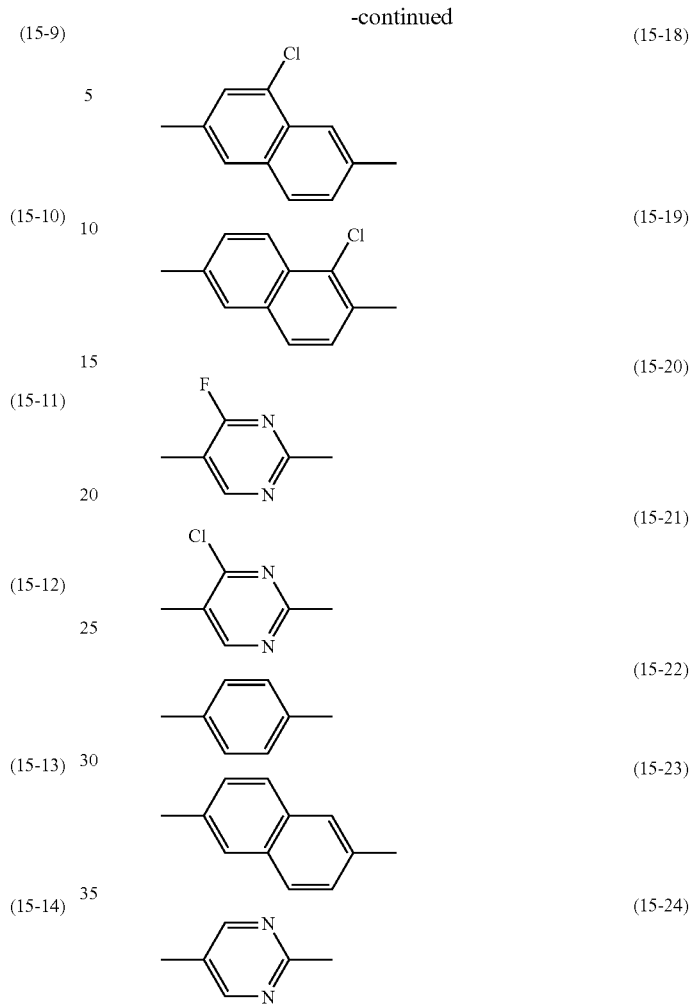

The ring $A^1$ and the ring $A^2$ are independently preferably the above ring group (15-2), (15-3), (15-4), (15-12), (15-13), (15-14), (15-15), (15-16), (15-17), (15-22), (15-23) or (15-24), more preferably the above ring group (15-2), (15-3), (15-4) or (15-22), and particularly preferably the above ring group (15-2), (15-3) or (15-22).

In formula (1a), $Z^1$, $Z^2$ and $Z^3$ are independently a single bond, —(CH$_2$)$_2$—, —(CH$_2$)$_4$—, —CH=CH—, —C≡C—, —CF$_2$O—, —OCF$_2$—, —COO— or —OCO—, among which a single bond, —(CH$_2$)$_2$—, —CH=CH—, —C≡C—, —CF$_2$O—, —OCF$_2$—, —COO— and —OCO— are preferred, a single bond, —(CH$_2$)$_2$—, —CF$_2$O— and —COO— are more preferred, and a single bond and —(CH$_2$)$_2$— are particularly preferred. $X^a$, $X^b$, $X^c$, $X^d$, $X^e$ and $X^f$ are independently hydrogen or fluorine. It is preferred that $X^a$, $X^d$ and $X^e$ are hydrogen and $X^b$, $X^c$ and $X^f$ are independently hydrogen or fluorine, and more preferred that $X^a$, $X^b$, $X^d$, $X^e$ and $X^f$ are hydrogen and $X^c$ is hydrogen or fluorine. Y is —OCH$_2$F, —OCHF$_2$, —OCF$_3$, —SCH$_2$F, —SCHF$_2$, —SCF$_3$, —CH$_2$F, —CHF$_2$, —CF$_3$, fluorine or chlorine, preferably is —OCH$_2$F, —OCHF$_2$, —OCF$_3$, —CH$_2$F, —CHF$_2$, —CF$_3$, fluorine or chlorine and more preferably is —OCF$_3$, fluorine or chlorine. In addition, "l" and "m" are independently equal to 0 or 1, while naphthalene-2, 6-diyl or a similar divalent group is considered as one ring group. A compound with l=m=0 has two rings, and is called a two-ring compound. A compound with l=1 and m=0 or with l=0 and m=1 has three rings, and is called a three-ring compound. A compound with l=m=1 has four rings, and is called a four-ring compound. The same definitions are also applied to any one of formulae (1b), (1c-1) to (1c-3), (1c-1-1) to (1c-1-4) and (1c-2-1) to (1c-2-12) mentioned later.

As a preferred example of the compound (1a), a compound of this invention expressed by formula (1b) is described below.

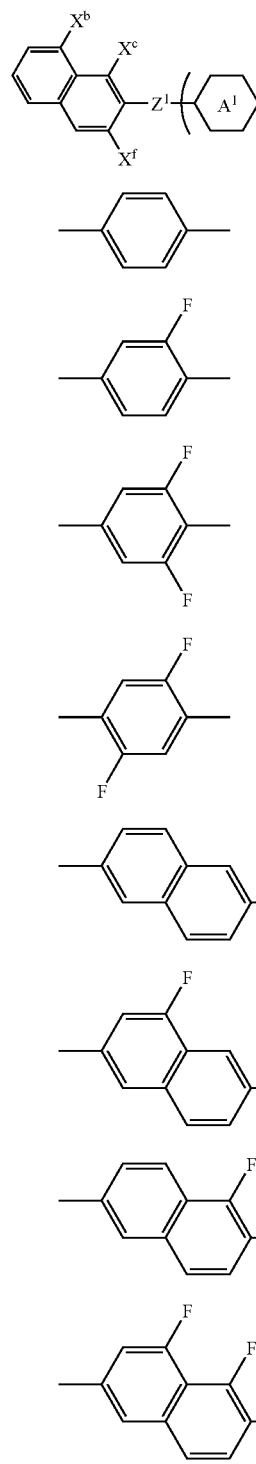

In formula (1b), the ring $A^1$ and the ring $A^2$ each is selected from the above ring structures (a)-(l), preferably from (a), (b), (c) and (d) and more preferably from (a), (b) and (c). $Z^1$, $Z^2$ and $Z^3$ are independently a single bond, —(CH$_2$)$_2$—, —CH=CH—, —C≡C—, —CF$_2$O—, —OCF$_2$—, —COO— or —OCO—, preferably a single bond, —(CH$_2$)$_2$—, —CF$_2$O— or —COO— and more preferably a single bond or —(CH$_2$)$_2$—. $X^b$, $X^c$ and $X^f$ are independently hydrogen or fluorine, while it is preferred that $X^b$ and $X^f$ are hydrogen and $X^c$ is hydrogen or fluorine. Y is —OCH$_2$F, —OCHF$_2$, —OCF$_3$, —CH$_2$F, —CHF$_2$, —CF$_3$, fluorine or chlorine, preferably —OCF$_3$, fluorine or chlorine. The value of "l" and that of "m" are independently 0 or 1.

As preferred examples of the compound (1b), three compounds of this invention respectively expressed by formulae (1c-1) to (1c-3) are described below.

-continued

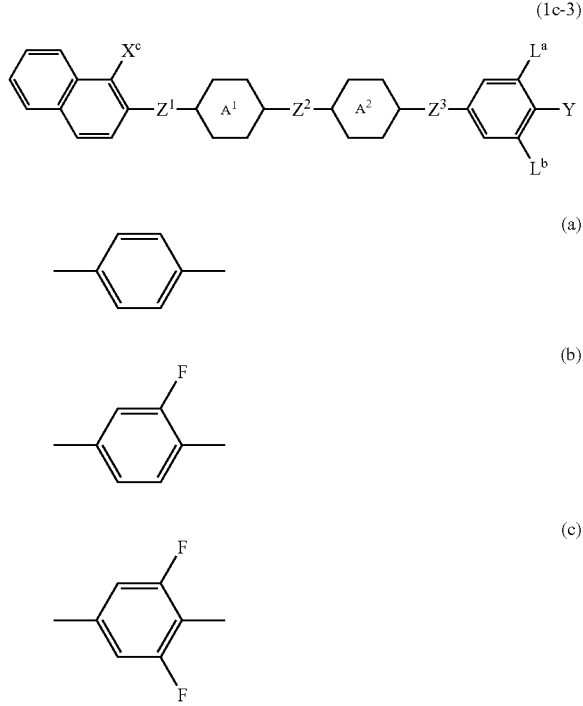

(1c-3)

(a)

(b)

(c)

In the formulae, ring $A^1$ and the ring $A^2$ each is selected from the ring structures (a)-(c). $Z^1$, $Z^2$ and $Z^3$ are independently a single bond, —(CH$_2$)$_2$—, —CF$_2$O— or —COO—. $X^c$ is hydrogen or fluorine. Y is —OCF$_3$, fluorine or chlorine. $L^a$ and $L^b$ are independently hydrogen or fluorine. It is preferred that $Z^1$, $Z^2$ and $Z^3$ are independently a single bond or —(CH$_2$)$_2$—.

Examples of the compounds (1c-1) to (1c-3) include the compounds respectively expressed by formulae (1c-1-1) to (1c-2-12) in the 12$^{th}$ item of this invention.

The compounds (1a), (1b), (1c-1) to (1c-3), (1c-1-1) to (1c-1-4) and (1c-2-1) to (1c-2-12) of this invention are further described below. The compounds (1a), (1b), (1c-1) to (1c-3), (1c-1-1) to (1c-1-4) and (1c-2-1) to (1c-2-12) include two-ring, three-ring and four-ring compounds with a naphthalene group of which the position 6 is bonded with hydrogen and each of the other positions can be replaced by fluorine. These compounds are physically and chemically very stable under ordinary use conditions of the devices, and have an excellent compatibility with other LC compounds. A composition containing such a compound is also stable under normal use conditions of the devices, and the compound is not deposited as crystals or a smectic phase even when the composition is stored at a low temperature. In addition, the compounds have generally required physical properties, proper optical anisotropy and proper dielectric anisotropy.

By suitably selecting the rings, bonding groups and terminal groups of the compounds (1a), (1b), (1c-1) to (1c-3), (1c-1-1) to (1c-1-4) and (1c-2-1) to (1c-2-12), it is possible to easily adjust the physical properties like optical anisotropy and dielectric anisotropy as required. With respect to the species of the ring $A^1$ and the ring $A^2$, the bonding groups $Z^1$, $Z^2$ and $Z^3$ and the terminal groups Y, $L^a$ and $L^b$, their effects to the physical properties of the compounds (1a), (1b), (1c-1) to (1c-3), (1c-1-1) to (1c-1-4) and (1c-2-1) to (1c-2-12) are described as follows.

The dielectric anisotropy of the compounds (1a), (1b), (1c-1) to (1c-3), (1c-1-1) to (1c-1-4) and (1c-2-1) to (1c-2-12) is positively large, and the optical anisotropy of the same is also large. A compound with large dielectric anisotropy is useful as a component for lowering the threshold voltage of the composition. A compound with large optical anisotropy is useful as a component of a quick-response composition that is used in a device with a small cell gap.

When the ring $A^1$ and the ring $A^2$ are independently 1,4-phenylene in which any hydrogen can be replaced by halogen, pyridine-2,5-diyl, pyrimidine-2,5-diyl or naphthalene-2,6-diyl, both the dielectric anisotropy and the optical anisotropy are large.

When the bonding groups $Z^1$, $Z^2$ and $Z^3$ are independently a single bond, —(CH$_2$)$_2$—, —CF$_2$O—, —OCF$_2$—, —CH=CH— or —(CH$_2$)$_4$—, the viscosity is low, wherein a single bond, —(CH$_2$)$_2$—, —OCF$_2$—, —CF$_2$O— or —CH=CH— makes relatively lower viscosity. When the bonding group is —CH=CH—, the temperature range of LC phase is wide and the elastic constant ratio ($K_{33}/K_{11}$) of bend elastic constant $K_{33}$ to splay elastic constant $K_{11}$ is large. When the bonding group is —C≡C—, the optical anisotropy is large.

When the terminal group Y is —OCF$_3$, the balance between dielectric anisotropy and viscosity is good. When the terminal group is fluorine, the dielectric anisotropy is large. When the terminal group is chlorine, the optical anisotropy is large.

When the terminal groups $L^a$ and $L^b$ both are hydrogen, the dielectric anisotropy is large. When one of $L^a$ and $L^b$ is hydrogen and the other is fluorine, the dielectric anisotropy is larger. When the terminal groups $L^a$ and $L^b$ both are fluorine, the dielectric anisotropy is even larger.

The compounds (1a), (1b), (1c-1), (1c-2), (1c-1-1) to (1c-1-4) and (1c-2-1) to (1c-2-12) having two- or three-ring structures cause a low viscosity. The compounds (1a), (1b), (1c-2), (1c-3) and (1c-2-1) to (1c-2-12) having three- or four-ring structures cause a high upper-limit temperature. Accordingly, by suitably selecting the species of the rings, bonding groups and terminal groups as well as the ring number, a compound with target physical properties can be obtained. Therefore, the compound (1) is useful as a component in a composition used in LCD devices of PC type, TN type, STN type, ECB type, OCB type, IPS type, VA type and so forth.

The compounds (1a), (1b), (1c-1) to (1c-3), (1c-1-1) to (1c-1-4) and (1c-2-1) to (1c-2-12) can be synthesized with proper combinations of organic synthesis reactions. The methods of introducing the target terminal groups, rings and bonding groups to the starting material are described in *Organic Syntheses* and *Organic Reactions* both being published by John Wiley & Sons, Inc., *Comprehensive Organic Synthesis* by Pergamon Press, Shin-Jikken-Kagaku-Kouza (*New Lectures on Experiment Chemistry*) by Maruzen Co., Ltd., and so forth.

For exemplary methods of forming the bonding group $Z^1$, $Z^2$ or $Z^3$, a scheme is shown below and explained in the following points (I) to (VII). In the scheme, MSG$^1$ or MSG$^2$ is a monovalent organic group with at least one ring, and the multiple groups MSG$^1$ or MSG$^2$ can be the same or be different. The compounds (1A) to (1G) correspond to the compounds (1a), (1b), (1c-1) to (1c-3), (1c-1-1) to (1c-1-4) and (1c-2-1) to (1c-2-12).

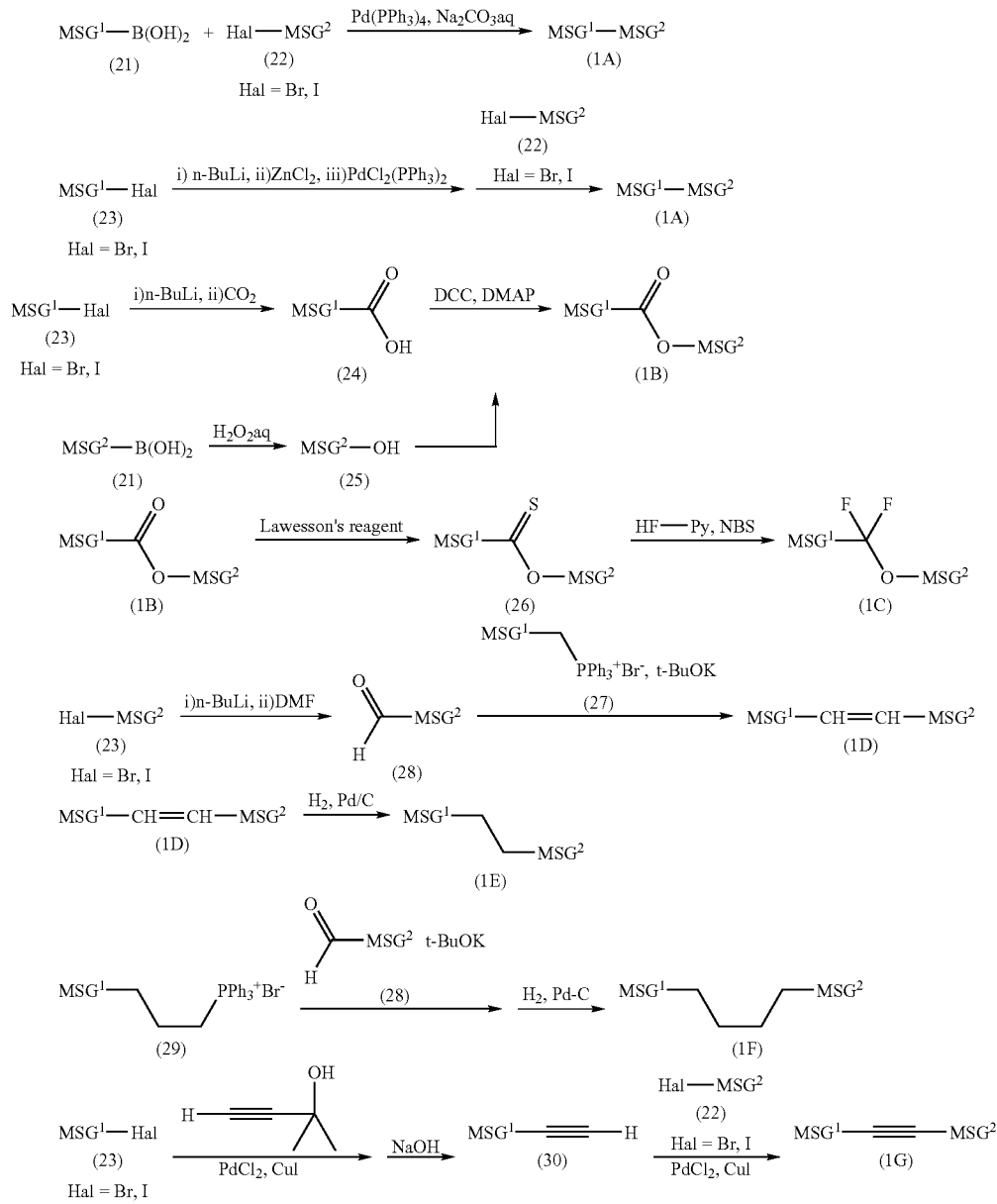

(I) Formation of Single Bond

An arylboric acid (21) and a compound (22) synthesized with a known method are reacted, in the presence of an aqueous solution of a carbonate salt and a catalyst like tetrakis (triphenylphosphine)palladium, to form the compound (1A). The compound (1A) may alternatively be formed by reacting a compound (23) synthesized with a known method with n-butyl lithium and zinc chloride in sequence and then reacting the product with the compound (22) in the presence of a catalyst like dichlorobis(triphenylphosphine)palladium.

(II) Formation of —COO— and —OCO—

The compound (23) is reacted with n-butyl lithium and $CO_2$ in sequence to form a carboxylic acid (24). The compound (24) and a phenol (25) synthesized with a known method are subjected to a dehydration reaction, in the presence of 1,3-dicyclohexyl-carbodiimide (DDC) and 4-dimethylaminopyridine (DMAP), to form a compound (1B) including —COO—. A compound including —OCO— may also be synthesized with the same method.

(III) Formation of —$CF_2O$— and —$OCF_2$—

The compound (1B) is treated with a sulfurizing agent like Lawesson's reagent to form a compound (26). The compound (26) is fluorinated with HF-pyridine complex and N-bromosuccinimide (NBS) to form the compound (1C) with —$CF_2O$—, as described in M. Kuroboshi et al., *Chem. Lett.*, 1992, 827. The compound (1C) may alternatively be synthesized by fluorinating the compound (26) with (diethylamino)sulfur trifluoride (DAST), as described in W. H. Bunnelle et al., *J. Org. Chem.*, 1990, 55, 768. A compound including —$OCF_2$— may also be synthesized with the same method. It is also possible to form these bonding groups with the method described in Peer. Kirsch et al., *Anbew. Chem. Int. Ed.*, 2001, 40, 1480.

(IV) Formation of —CH═CH—

The compound (23) is treated with n-butyl lithium and then reacted with a formamide like N,N-dimethylformamide Next, an exemplary method of synthesizing naphthalene derivatives respectively expressed by formulae (1a), (1b) and (1c-1) to (1c-3) is described.

I. Synthesis of a compound (35) with l=m=0 and $Z^1$ being a single bond, with l=1, m=0 and $Z^2$ being a single bond, or with l=m=1 and $Z^3$ being a single bond:

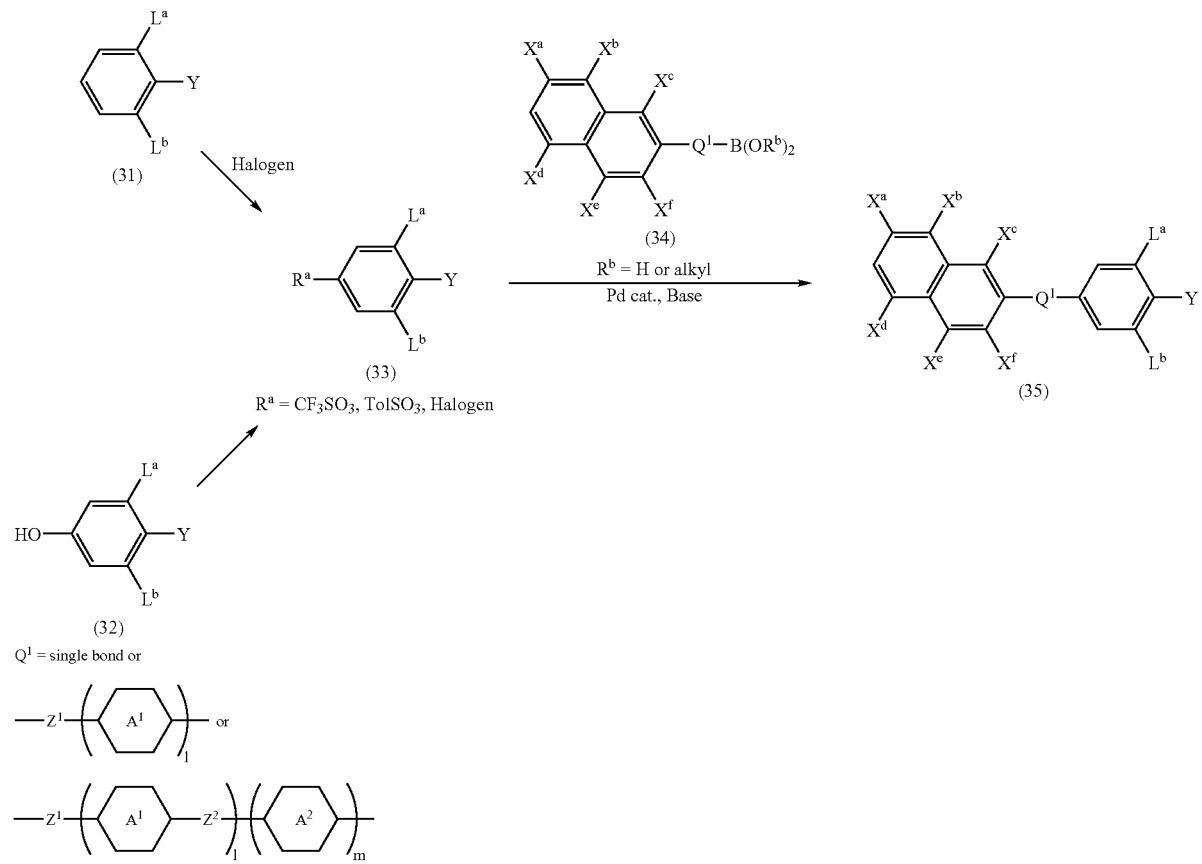

(DMF) to form an aldehyde (28). A phosphor-ylide, which is synthesized by treating a phosphonium salt (27) with a base like potassium t-butoxide, is then reacted with the aldehyde (28) to form the compound (1D). Because the compound (1D) is formed in cis-type due to the reaction conditions, if required, the trans-isomer is formed from the cis-isomer with a known isomerization method.

(V) Formation of —(CH$_2$)$_2$—

The compound (1D) is hydrogenated, in the presence of a catalyst like palladium/carbon (Pd/C), to form the compound (1E) including —(CH$_2$)$_2$—.

(VI) Formation of —(CH$_2$)$_4$—

A compound including —(CH$_2$)$_2$—CH═CH— is obtained using the method described in Point (IV) with the phosphonium salt (27) being replaced by a phosphonium salt (29). The compound is then subjected to catalytic hydrogenation to form the compound (1F).

(VII) Formation of —C≡C—

The compound (23) is reacted with 2-methyl-3-butyne-2-ol in the presence of PdCl$_2$ and a copper halide as a catalyst, and then the product is deprotected under a basic condition to form a compound (30). The compound (30) is reacted with the compound (22), in the presence of PdCl$_2$ and a copper halide as a catalyst, to form the compound (1G).

In these compounds, the definitions of the ring $A^1$, the ring $A^2$, $Z^1$, $Z^2$, $X^a$, $X^b$, $X^c$, $X^d$, $X^e$, $X^f$, Y, $L^a$, $L^b$, "l" and "m" are the same as those in the $1^{st}$ item of this invention. The definitions of $R^a$, $R^b$ and $Q^1$ are shown in the scheme.

A compound (33) with $R^a$ being halogen can be synthesized by reacting the compound (31) with Br$_2$ directly or with I$_2$ in the presence of an oxidizing agent. The reactions are preferably conducted without a solvent, or in a solvent like CH$_2$Cl$_2$ or CHCl$_3$, and so forth, at a temperature between $-75°$ C. and the boiling point of the solvent. A compound (33) with $R^a$ being trifluoromethanesulfonyl or toluenesulfonyl may be synthesized by reacting the compound (32) with a sulfonylating agent like trifluoromethanesulfonyl chloride, anhydrous trifluoromethanesulfonic acid or toluene-sulfonyl chloride, and so forth. These reactions are preferably conducted without a solvent, or in a solvent like CH$_2$Cl$_2$ or —CHCl$_3$, and so forth, at a temperature between $-75°$ C. and the boiling point of the solvent. The compound (35) is synthesized by reacting the compound (33) with a boric acid ester compound (34). The reaction is preferably done in a solvent, such as, an aromatic hydrocarbon solvent like toluene, an alcoholic solvent like ethanol, an ether solvent like ethyleneglycol-dimethyl ether or a mixture of the same with water, and so forth, in the presence of a base like K$_2$CO$_3$ or Na$_2$CO$_3$, and so forth, with a metal catalyst at a temperature between room temperature and the boiling point of the solvent. The metal catalyst utilized may be tetrakis(triphenylphosphine)palladium, dichlorobis(triphenyl-phosphine)palladium or Pd/C, and so forth.

Though the above scheme depicts the syntheses of some naphthalene derivatives expressed by formula (1a) only, the naphthalene derivatives respectively expressed by formulae (1b) and (1c-1) to (1c-3) can also be synthesized with the same method. The cases of the following schemes are similar to the above-mentioned case.

II. Synthesis of a compound (38) with l=1, m=0 and $Z^1$ being a single bond or with l=m=1 and $Z^1$ being a single bond:

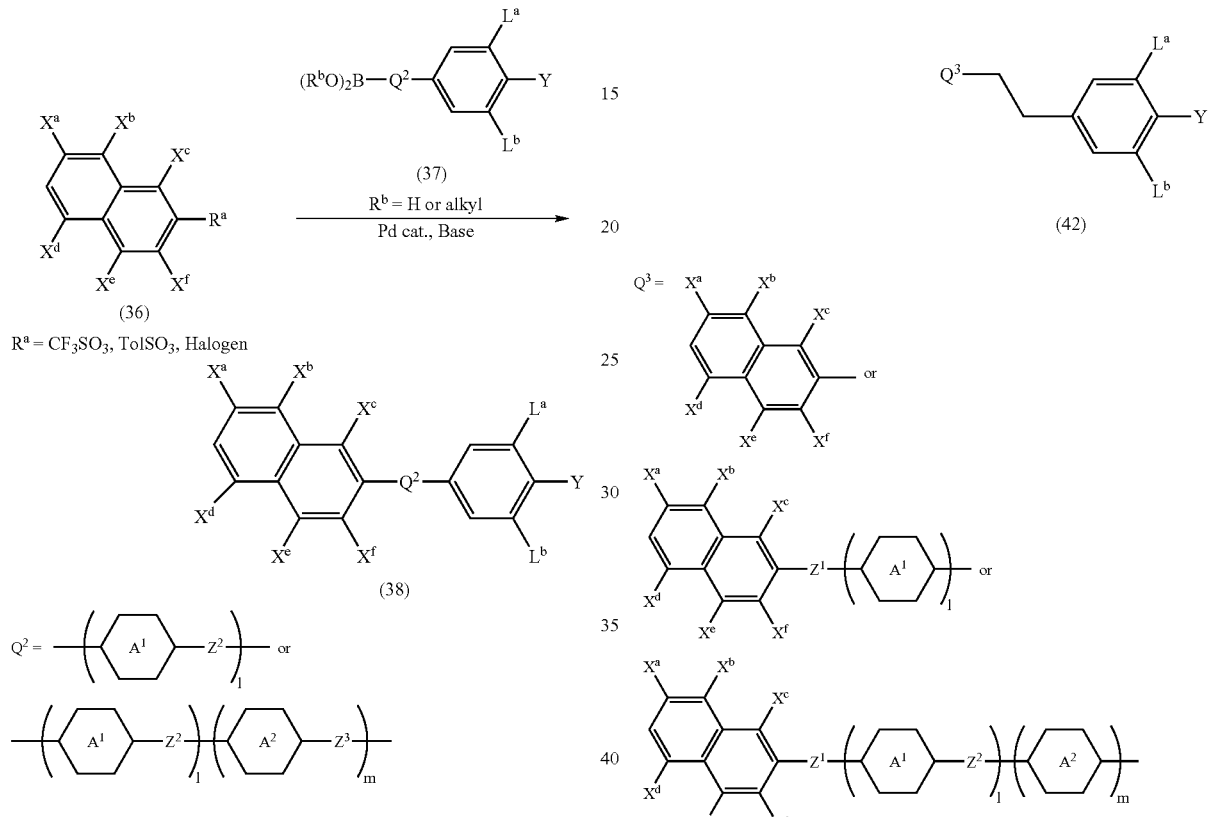

In these compounds, the definitions of the ring $A^1$, the ring $A^2$, $Z^2$, $Z^3$, $X^a$, $X^b$, $X^c$, $X^d$, $X^e$, $X^f$, Y, $L^a$, $L^b$, "l" and m are the same as those in the $1^{st}$ item of this invention. The definitions of $R^a$, $R^b$ and $Q^2$ are shown in the scheme.

A compound (36) with $R^a$ being halogen or with $R^a$ being trifluoromethane-sulfonyl or toluenesulfonyl can be synthesized with the same method mentioned above. A compound (38) can also be synthesized with the same reaction scheme, by utilizing the compounds (36) and (37) instead of the reaction route of synthesizing the compound (35) from the compound (33).

III. Synthesis of a compound (42) with l=m=0 and $Z^1$ being —(CH$_2$)$_2$—, with l=1, m=0 and $Z^2$ being —(CH$_2$)$_2$—, or with l=m=1 and $Z^3$ being —(CH$_2$)$_2$—:

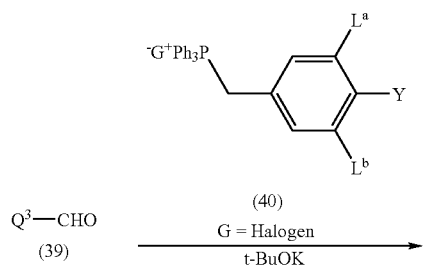

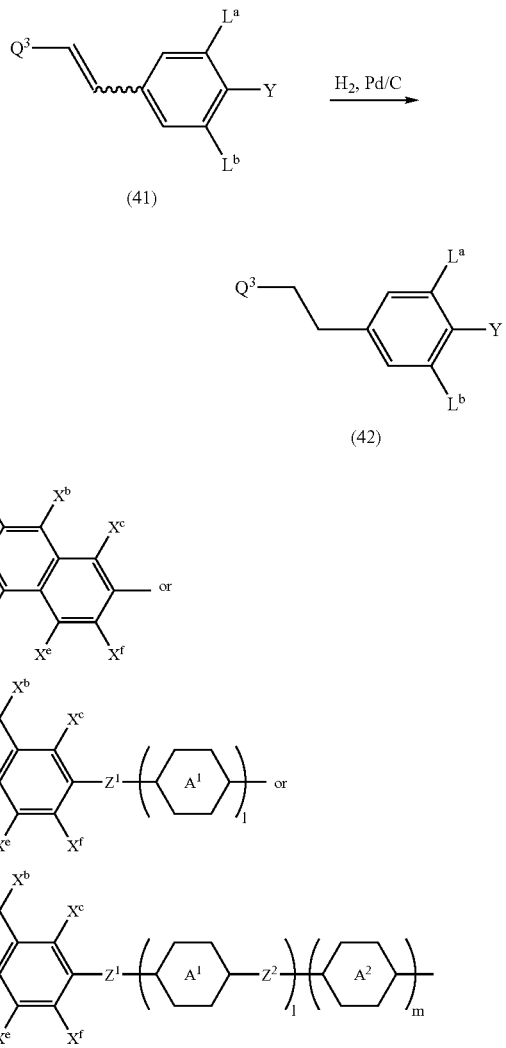

In these compounds, the definitions of the ring $A^1$, the ring $A^2$, $Z^1$, $Z^2$, $X^a$, $X^b$, $X^c$, $X^d$, $X^e$, $X^f$, Y, $L^a$, $L^b$, "l" and "m" are the same as those in the $1^{st}$ item of this invention. The definitions of G and $Q^3$ are shown in the scheme.

A compound (39) synthesized with any known method is reacted with a phosphoylide, which is formed with the reaction of a phosphonium salt (40) synthesized with a known method and a base like potassium t-butoxide, NaH or butyl lithium, and so forth, to synthesize a compound (41). These reactions are preferably conducted in a solvent like tetrahydrofuran (THF) at a temperature between −75° C. and room temperature. A compound (42) is synthesized by adding hydrogen onto the compound (41) using Pd/C or Raney-Ni as a catalyst. These reactions are preferably conducted in a solvent, such as, an alcoholic solvent like methanol or ethanol, an aromatic hydrocarbon solvent like toluene, an aliphatic hydrocarbon solvent like heptane, or a mixture thereof, and so forth, at a temperature between room temperature and the boiling point of the solvent. The hydrogen pressure is preferably between the atmospheric pressure and 10 atm.

IV. Synthesis of a compound (46) with l=1, m=0 and $Z^1$ being —$(CH_2)_2$— or with l=m=1 and $Z^1$ being —$(CH_2)_2$—:

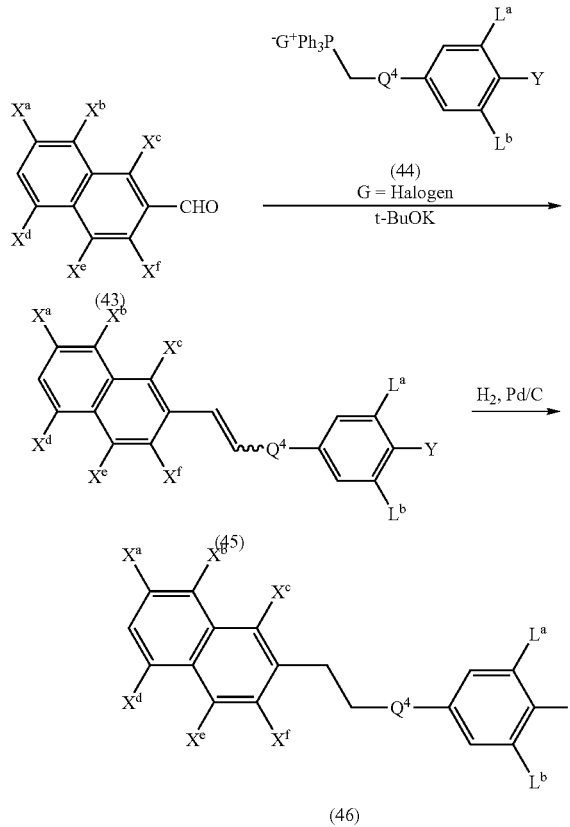

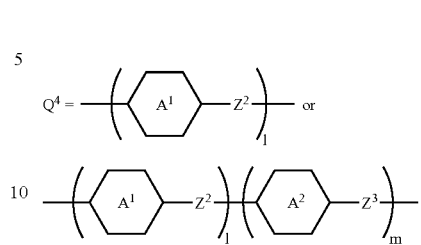

In these compounds, the definitions of the ring $A^1$, the ring $A^2$, $Z^2$, $Z^3$, $X^a$, $X^b$, $X^c$, $X^d$, $X^e$, $X^f$, Y, $L^a$, $L^b$, "l" and "m" are the same as those in the 1$^{st}$ item of this invention. The definitions of G and $Q^4$ are shown in the scheme.

A compound (46) can be synthesized with the same reaction scheme mentioned above, by utilizing the compounds (43) and (44) in replacement of the reaction route of synthesizing the compound (42) from the compound (39).

V. Syntheses of a compound (48) with l=m=0 and $Z^1$ being —COO—, with l=1, m=0 and $Z^1$ being —COO— or with l=m=1 and $Z^1$ being —COO— and a compound (49) with l=m=0 and $Z^1$ being —$CF_2O$—, with l=1, m=0 and $Z^1$ being —$CF_2O$— or with l=m=1 and $Z^1$ being —$CF_2O$—:

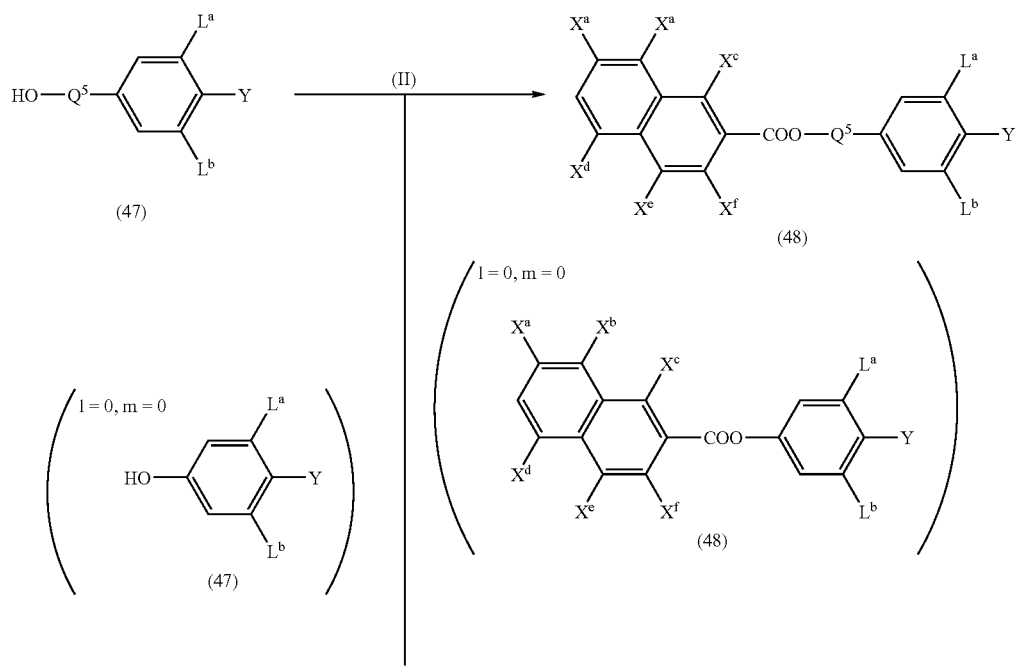

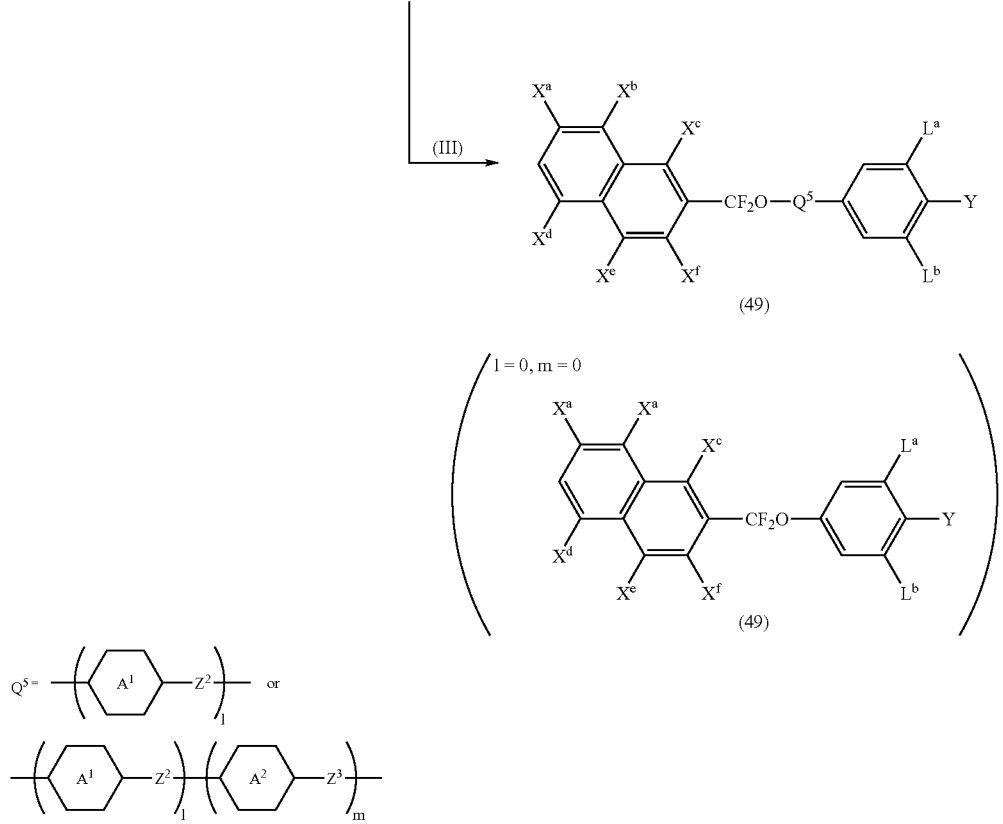

In these compounds, the definitions of the ring $A^1$, the ring $A^2$, $Z^2$, $Z^3$, $X^a$, $X^b$, $X^c$, $X^d$, $X^e$, $X^f$, Y, $L^a$, $L^b$, "l" and "m" are the same as those in the $1^{st}$ item of this invention. The definition of $Q^5$ is shown in the scheme.

The compound (48) and the compound (49) each can be synthesized by using a compound (47) synthesized with any known method, instead of the phenol intermediate, in the above methods (II) and (III) concerning the formation of the bonding group $Z^1$, $Z^2$ or $Z^3$.

The composition of this invention is further described below. The components of the composition may only include multiple compounds selected from the compounds (1a), (1b), (1c-1) to (1c-3), (1c-1-1) to (1c-1-4) and (1c-2-1) to (1c-2-12). A preferred composition includes at least one compound selected from the compounds (1a), (1b), (1c-1) to (1c-3), (1c-1-1) to (1c-1-4) and (1c-2-1) to (1c-2-12), in an amount of 1-99%. The composition also includes at least a compound selected from the group consisting of compounds (2) to (14) as a main component, while in preparing the composition, the components are selected considering the dielectric anisotropy of the compound (1).

The preferred compositions including at least one of the compounds (1a), (1b), (1c-1) to (1c-3), (1c-1-1) to (1c-1-4) and (1c-2-1) to (1c-2-12) are described as follows. A preferred composition includes at least one compound selected from the group consisting of the compounds (2), (3) and (4). Another preferred composition includes at least one compound selected from the group consisting of the compounds (5) and (6). Still another preferred composition includes at least two compounds respectively selected from the above two groups. These compositions may further include at least one compound selected from the group consisting of the compounds (12), (13) and (14) for adjusting the temperature range of LC phase, viscosity, optical anisotropy, dielectric anisotropy, $V_{th}$ and so forth thereof. These compositions may further include at least one compound selected from the group consisting of the compounds (7) and (11), so as to further adjust the physical properties thereof. In addition, to be applicable to AM-TN devices, STN devices and so forth, these compositions may further include other LC compounds, additives and so forth.

Yet another preferred composition includes at least one compound selected from the group consisting of the compounds (12), (13) and (14). These compositions may also include at least one compound selected from the group consisting of the compounds (7) and (11), so as to further adjust the physical properties thereof. In addition, to be applicable to AM-TN devices, STN devices and so forth, these compositions may further include other LC compounds, additives and so forth.

The compounds (2) to (4) are mainly used in a composition of AM-TN device for having large positive dielectric anisotropy. In the composition, the amount of these compounds is 1-99%, preferably 10-97% and more preferably 40-95%. In cases where the compound (12), (13) or (14) is further added in the composition, the amount of these compounds is preferably 60% or below, more preferably 40% or below.

The compound (5) and the compound (6) have very large positive dielectric anisotropy, and are mainly used in a composition of STN device. In the composition, the amount of these compounds is 1-99%, preferably 10-97% and more preferably 40-95%. In cases where the compound (12), (13)

or (14) is further added into the composition, the amount of these compounds is preferably 60% or below, more preferably 40% or below.

The compound (7) and the compound (11) have negative dielectric anisotropy, and are mainly used in a composition of VA device. The amount of these compounds is preferably 80% or below, more preferably 40-80%. In cases where the compound (12), (13) or (14) is further added into the composition, the amount of these compounds is preferably 60% or below, more preferably 40% or below.

The compounds (12) to (14) have small dielectric anisotropy. The compound (12) is used mainly for adjusting the viscosity and the optical anisotropy, while (13) and (14) for raising the upper-limit temperature to widen the temperature range of the LC phase or for adjusting the optical anisotropy. When the amount of the compounds (12) to (14) is increased, the threshold voltage of the composition is raised but the viscosity is lowered. Hence, they can be added in a large amount if only a required threshold voltage is achieved for the composition.

Preferred examples of the compounds (2) to (14) are respectively the following compounds (2-1) to (2-9), (3-1) to (3-97), (4-1) to (4-33), (5-1) to (5-56), (6-1) to (6-3), (7-1) to (7-4), (8-1) to (8-6), (9-1) to (9-4), (10-1), (11-1), (12-1) to (12-11), (13-1) to (13-21) and (14-1) to (14-6). In these compounds, the definitions of $R^1$, $R^2$, $R^3$, $R^4$, $R^5$, $R^6$, $R^7$, $X^1$ and $X^2$ are the same as those in the above descriptions of formulae (2)-(14).

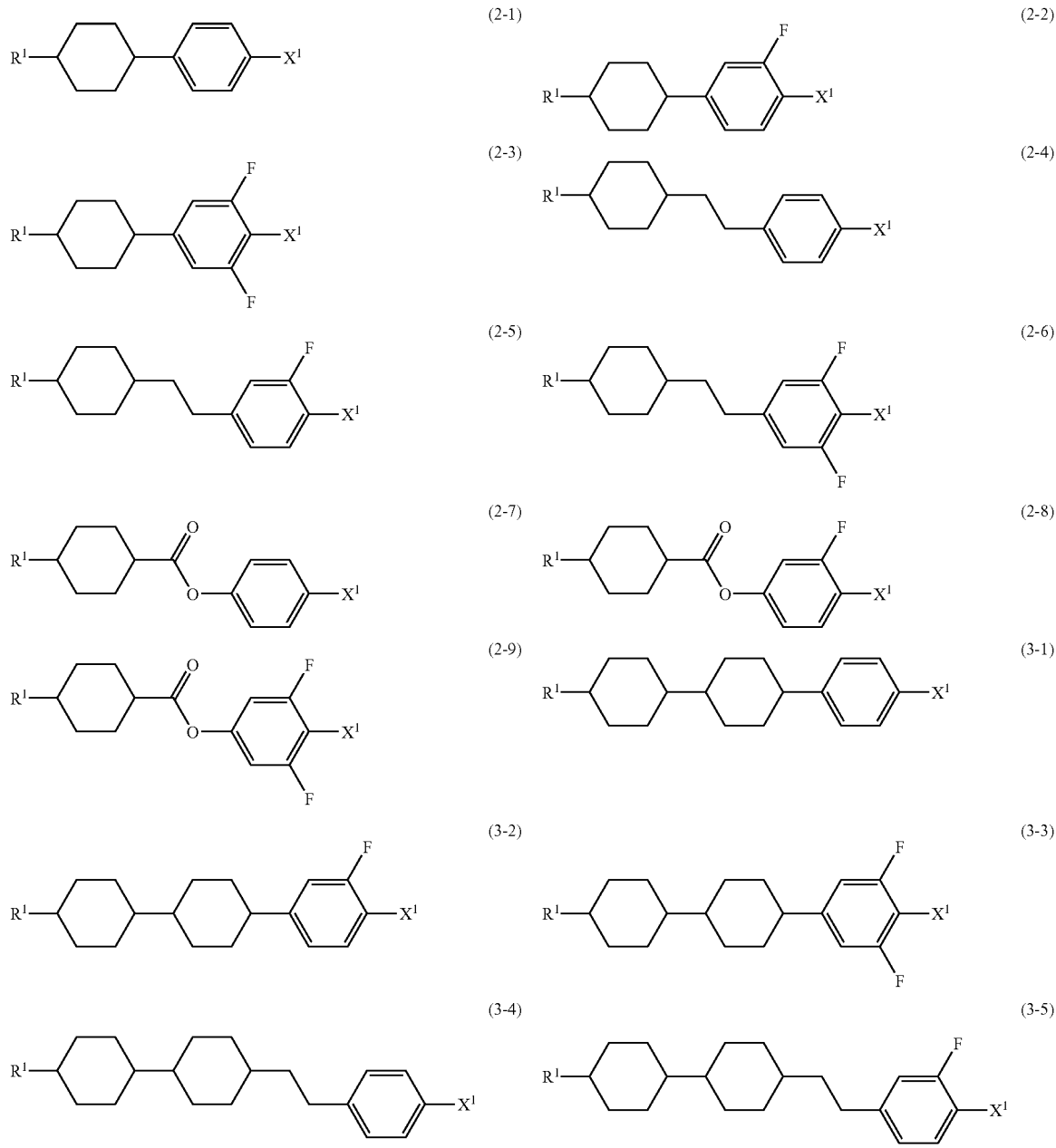

-continued
(3-6)
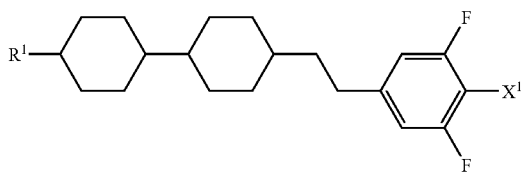
(3-7)
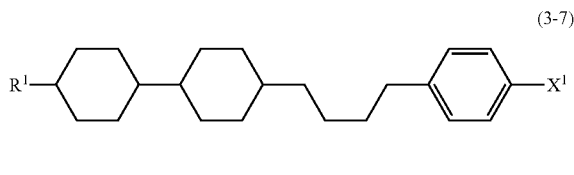
(3-8)
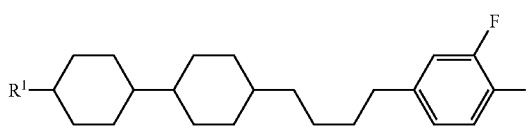
(3-9)
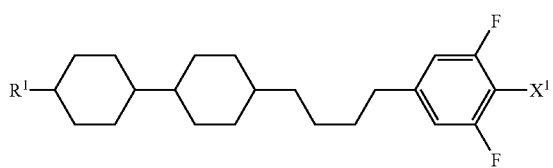
(3-10)
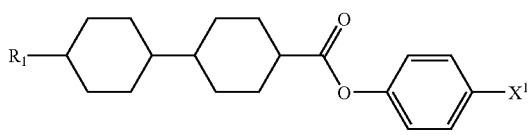
(3-11)
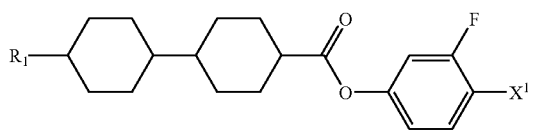
(3-12)
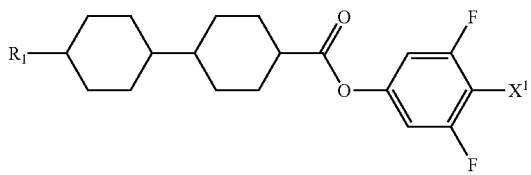
(3-13)
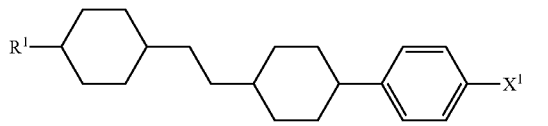
(3-14)
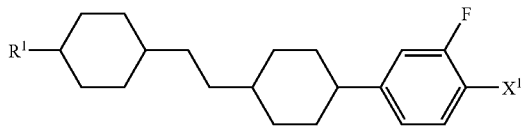
(3-15)
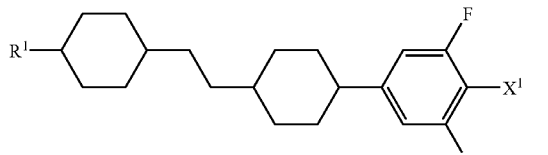
(3-16)
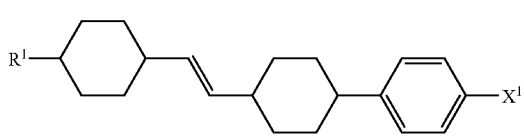
(3-17)
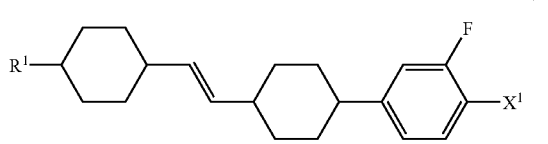
(3-18)
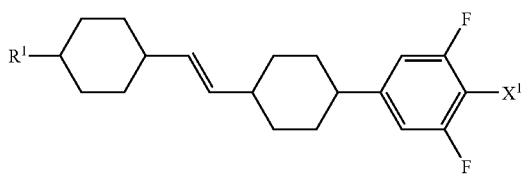
(3-19)
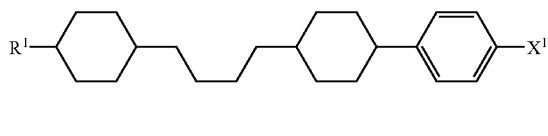
(3-20)
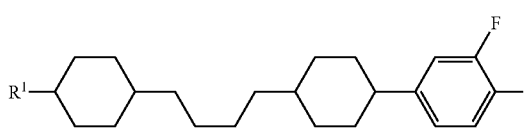
(3-21)
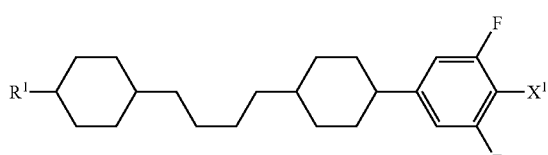

-continued
(3-22)
(3-23)
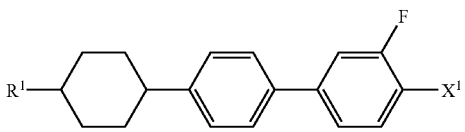
(3-24)
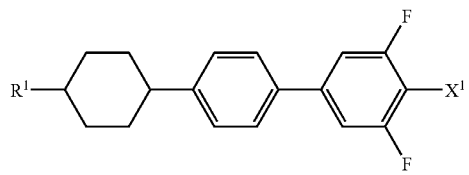
(3-25)
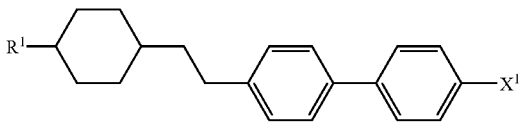
(3-26)
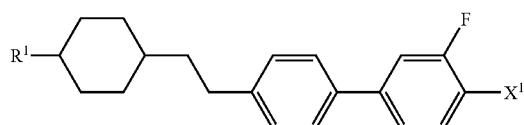
(3-27)
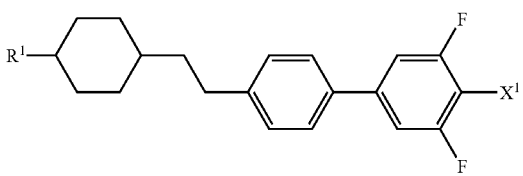
(3-28)
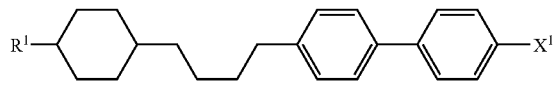
(3-29)
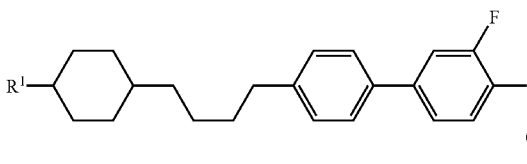
(3-30)
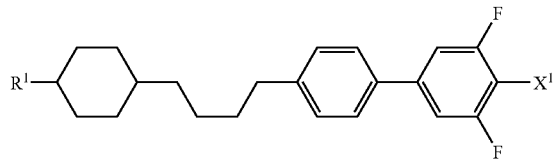
(3-31)
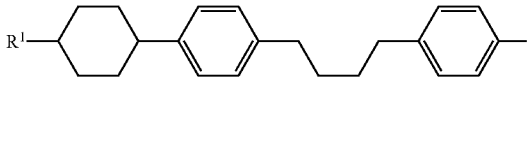
(3-32)
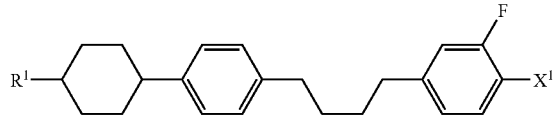
(3-33)
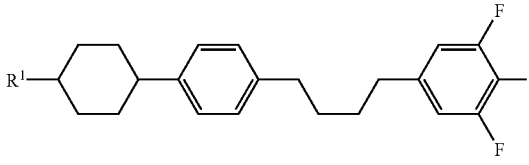
(3-34)
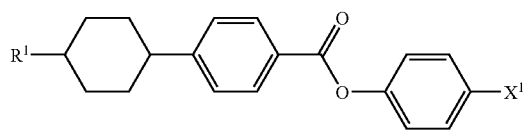
(3-35)
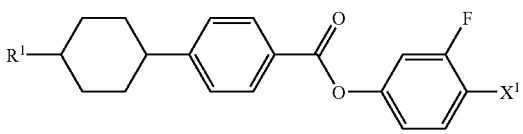
(3-36)
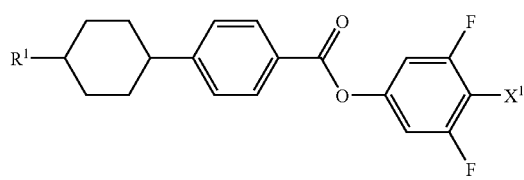
(3-37)
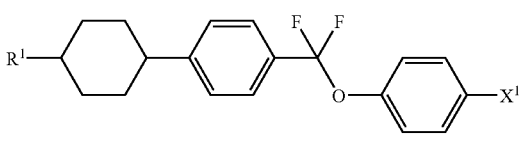
(3-38)
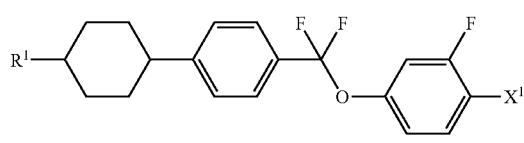
(3-39)
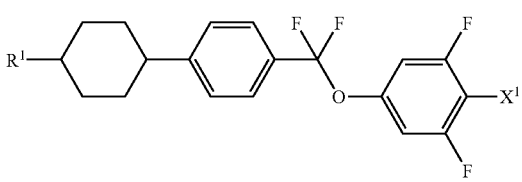

-continued
(3-40) 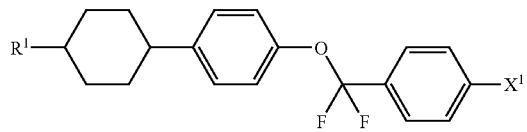
(3-41) 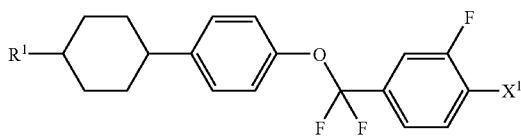
(3-42) 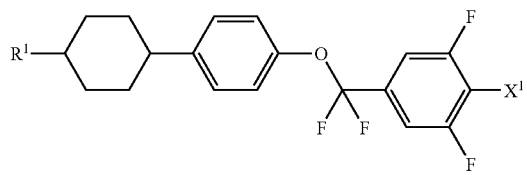
(3-43) 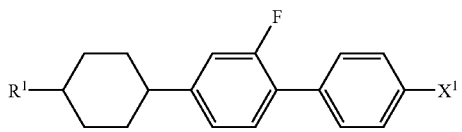
(3-44) 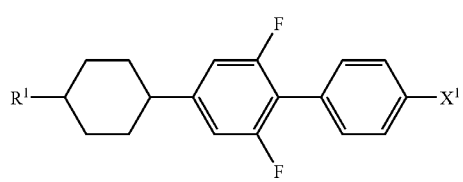
(3-45) 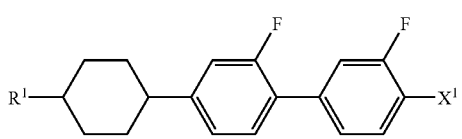
(3-46) 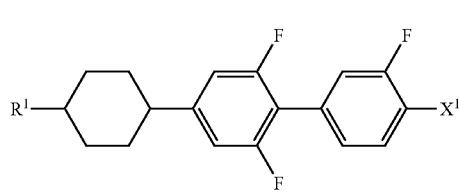
(3-47) 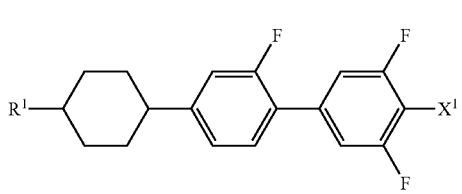
(3-48) 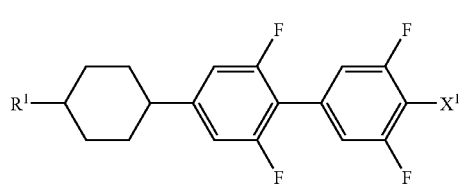
(3-49) 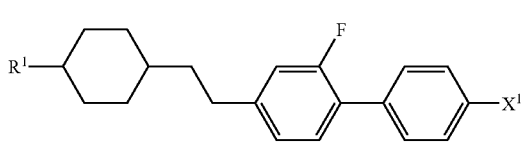
(3-50) 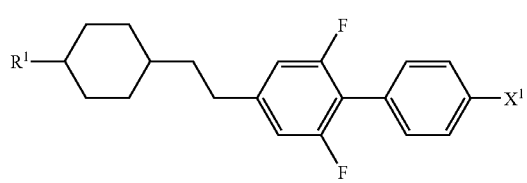
(3-51) 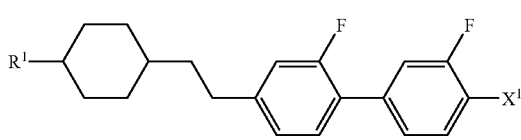
(3-52) 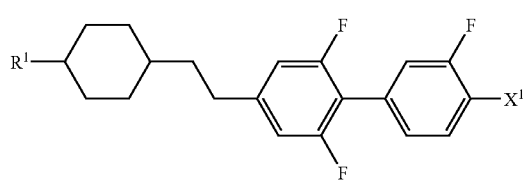
(3-53) 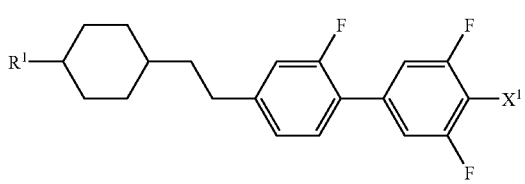
(3-54) 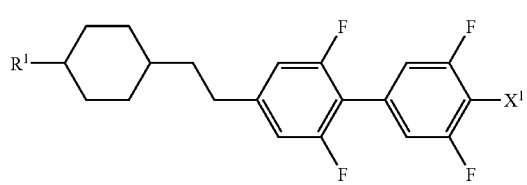
(3-55) 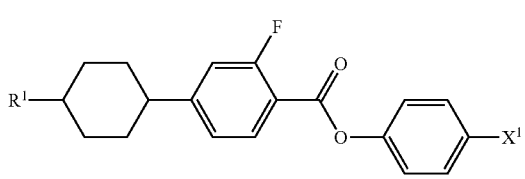

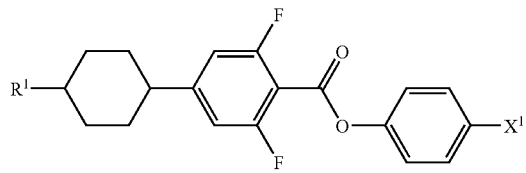 (3-56)
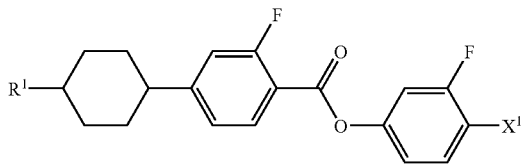 (3-57)
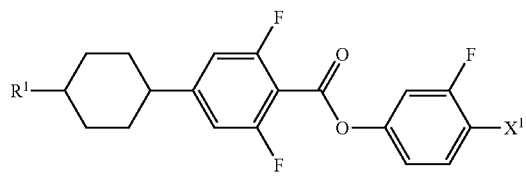 (3-58)
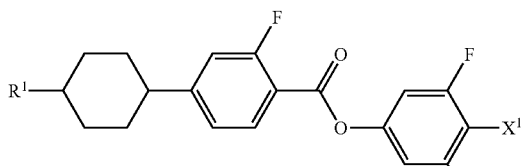 (3-59)
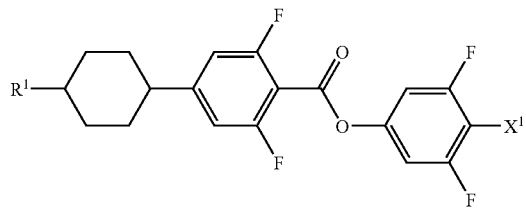 (3-60)
 (3-61)
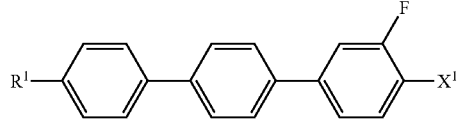 (3-62)
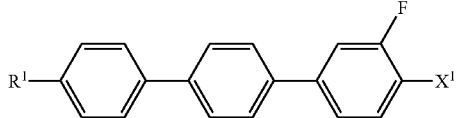 (3-63)
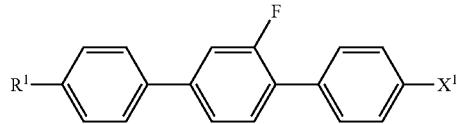 (3-64)
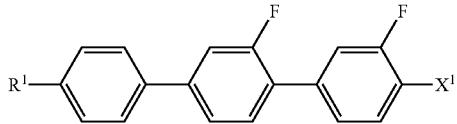 (3-65)
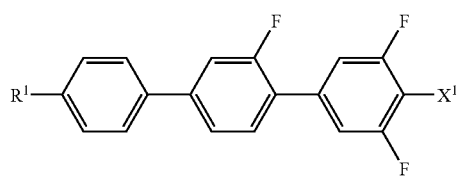 (3-66)
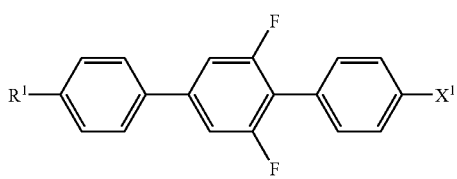 (3-67)
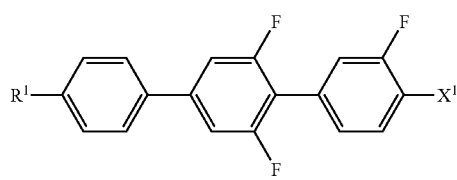 (3-68)
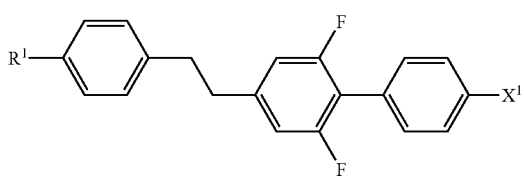 (3-69)
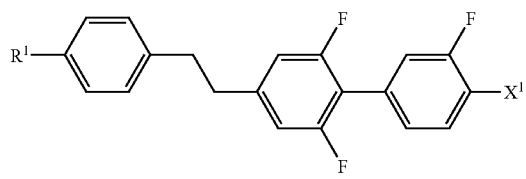 (3-70)
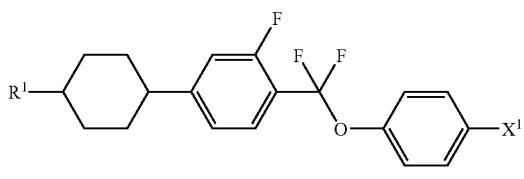 (3-71)

-continued
(3-72) 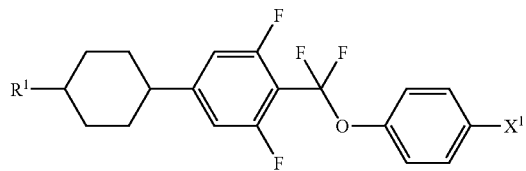
(3-73) 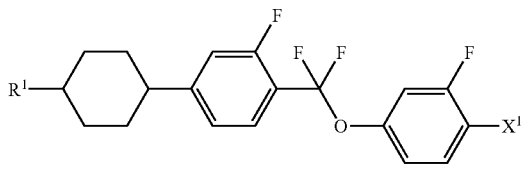
(3-74) 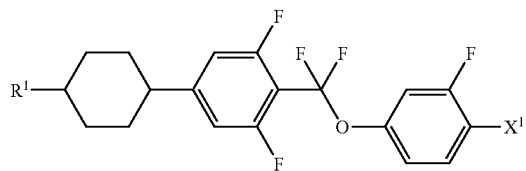
(3-75) 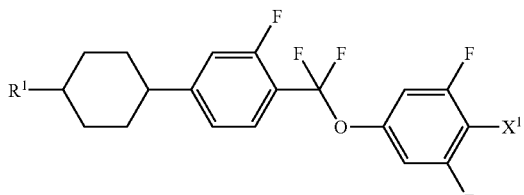
(3-76) 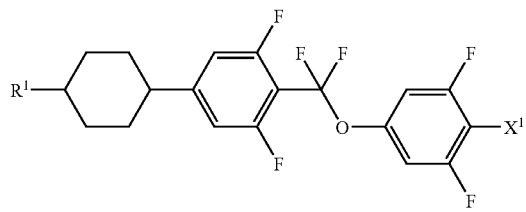
(3-77) 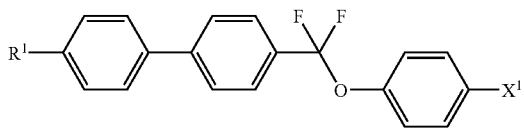
(3-78) 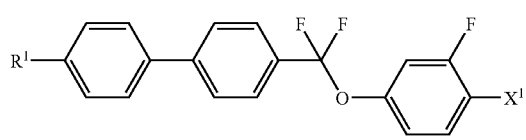
(3-79) 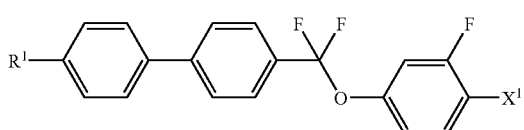
(3-80) 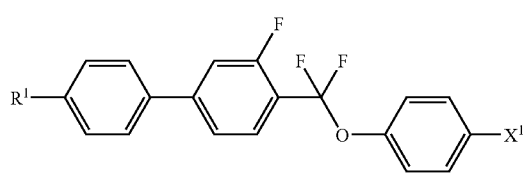
(3-81) 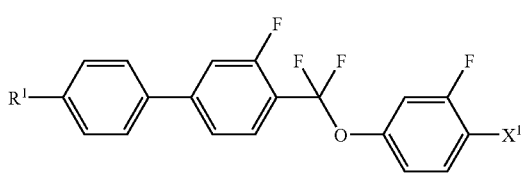
(3-82) 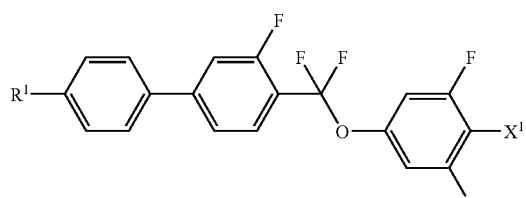
(3-83) 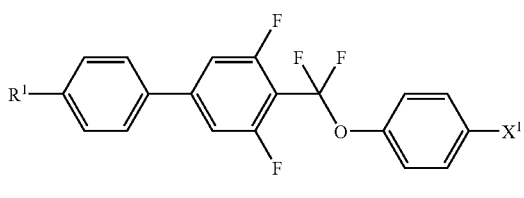
(3-84) 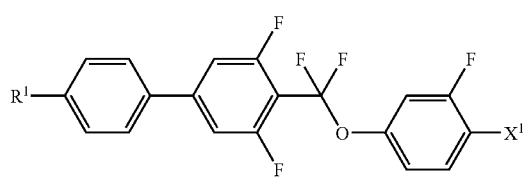
(3-85) 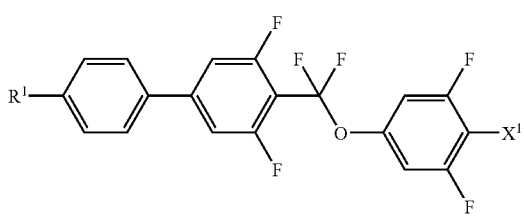

-continued
(3-86) 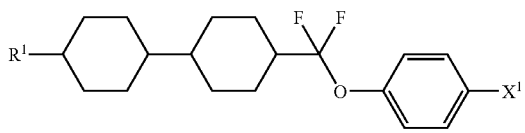
(3-87) 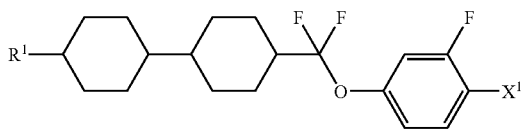
(3-88) 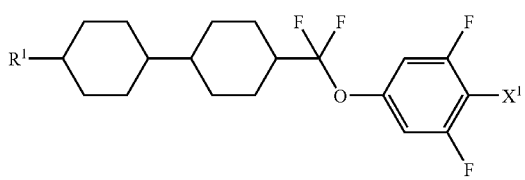
(3-89) 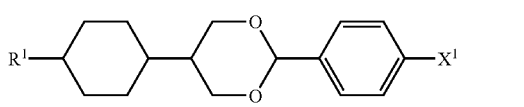
(3-90) 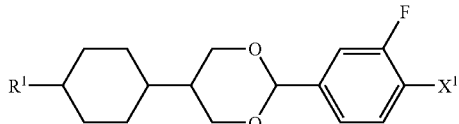
(3-91) 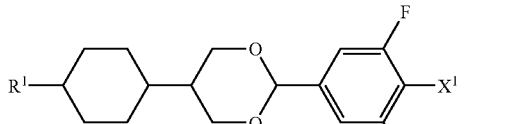
(3-92) 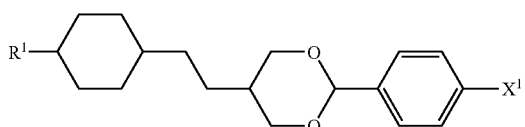
(3-93) 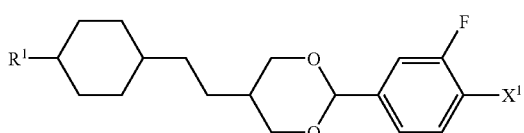
(3-94) 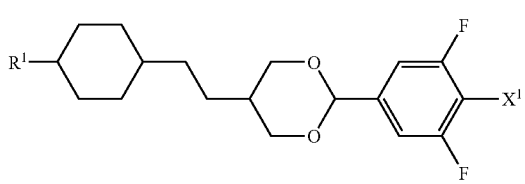
(3-95) 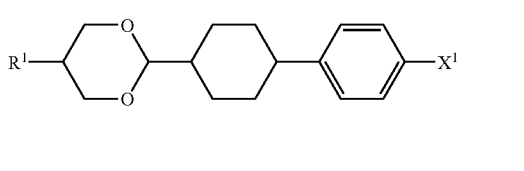
(3-96) 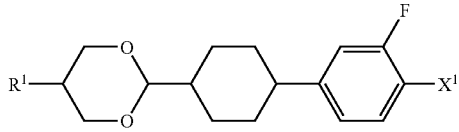
(3-97) 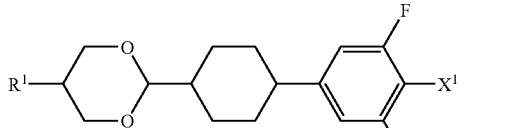
(4-1) (4-2) (4-3) (4-4) 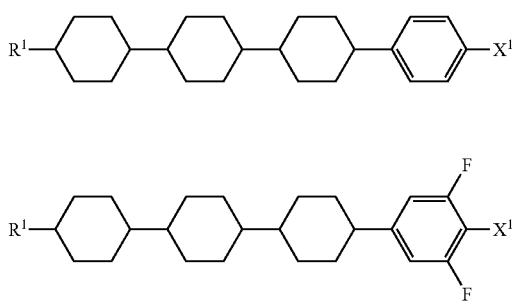 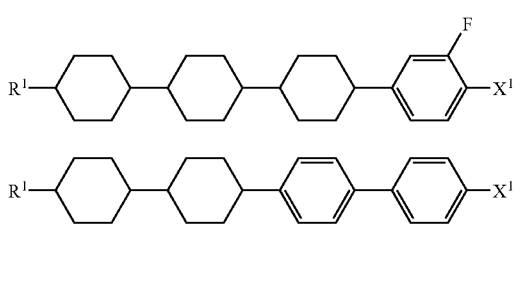
(4-5) 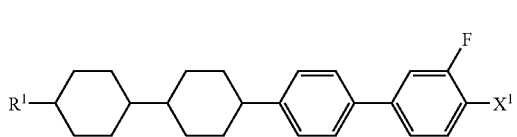
(4-6) 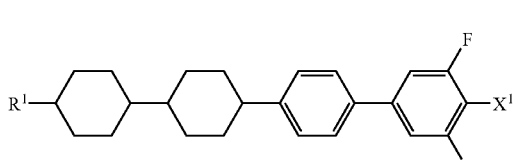

-continued
(4-7)
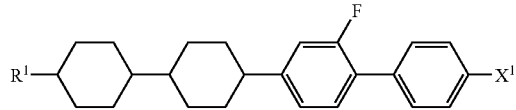
(4-8)
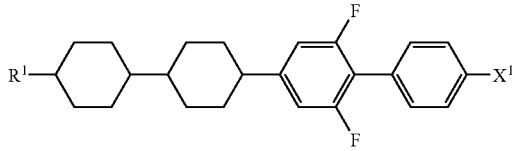
(4-9)
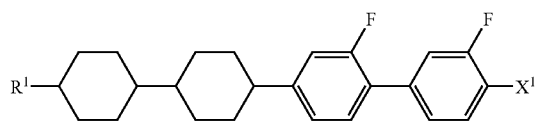
(4-10)
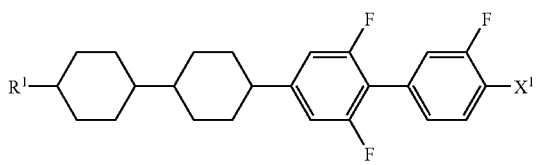
(4-11)
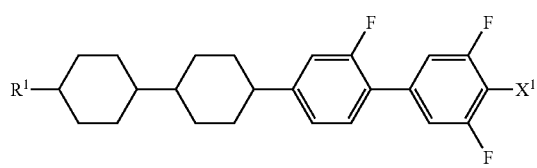
(4-12)
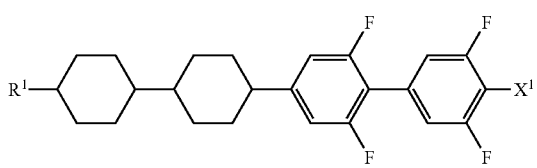
(4-13)
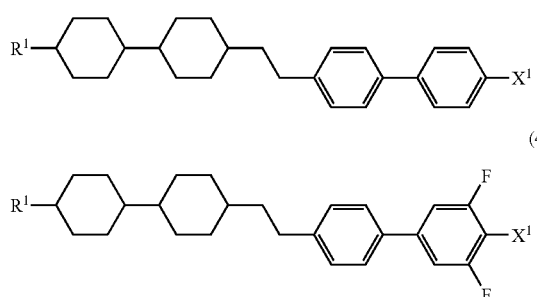
(4-14)
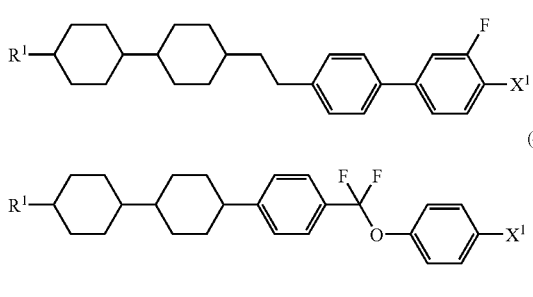
(4-15)
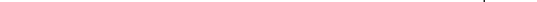
(4-16)
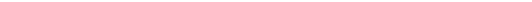
(4-17)
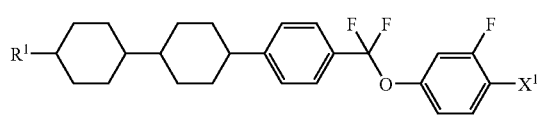
(4-18)
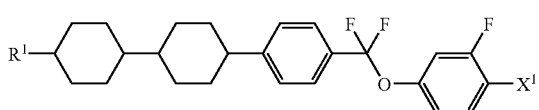
(4-19)
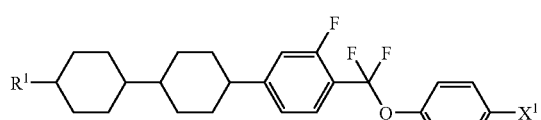
(4-20)
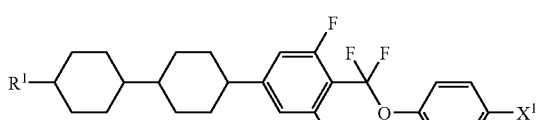
(4-21)
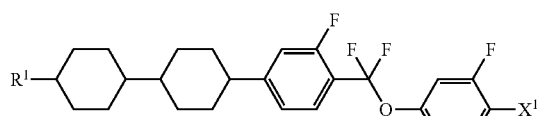
(4-22)
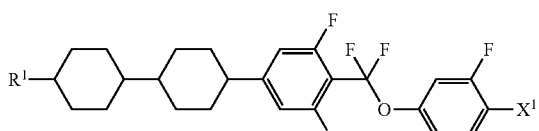
(4-23)
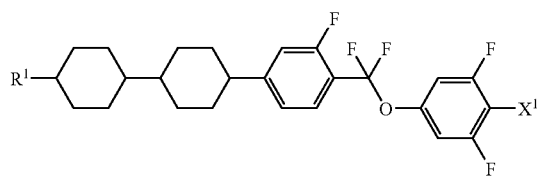
(4-24)
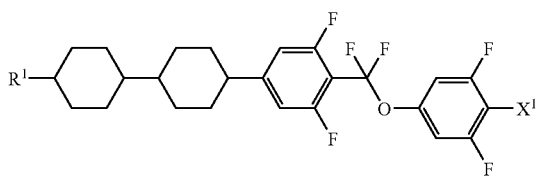

-continued

-continued
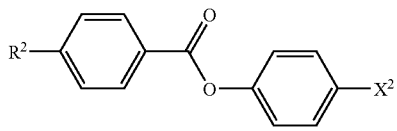
(5-12)
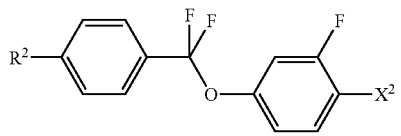
(5-13)
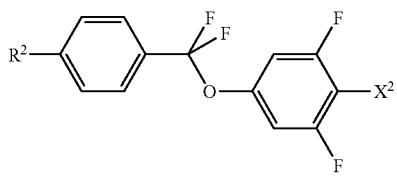
(5-14)
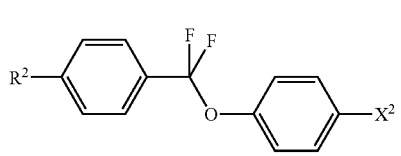
(5-15)
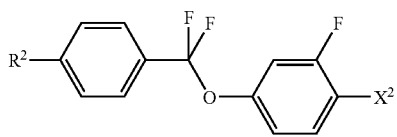
(5-16)
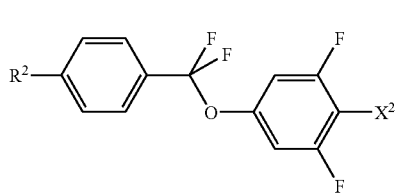
(5-17)
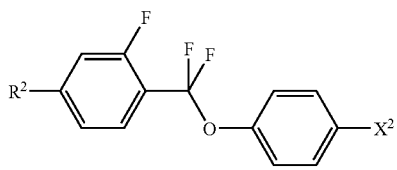
(5-18)
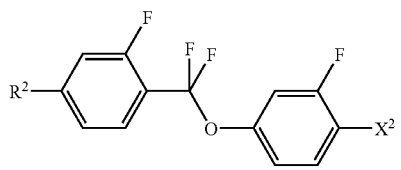
(5-19)
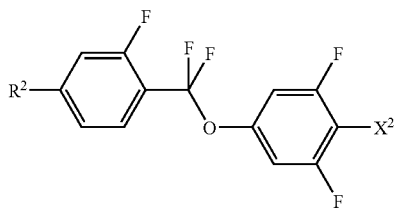
(5-20)
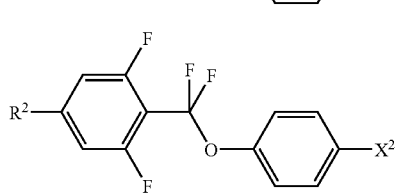
(5-21)
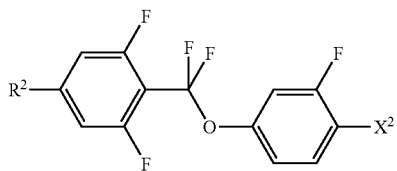
(5-22)
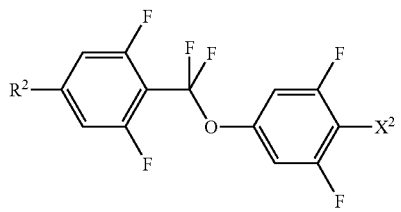
(5-23)
(5-24)
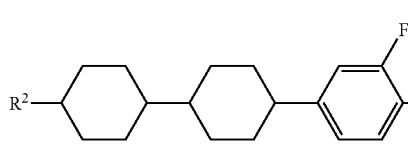
(5-25)
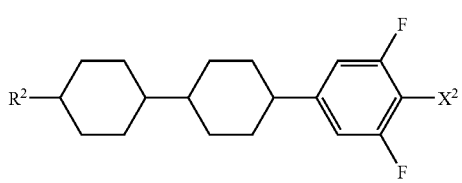
(5-26)
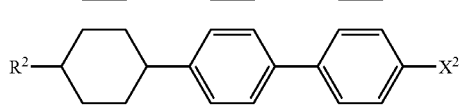
(5-27)
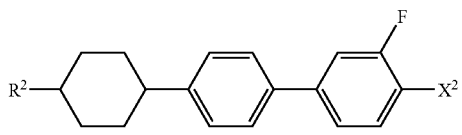
(5-28)
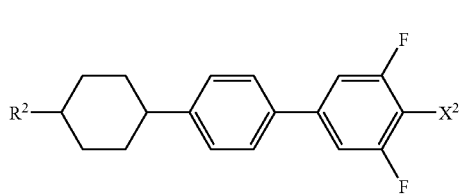
(5-29)

-continued
(5-30) 
(5-31) 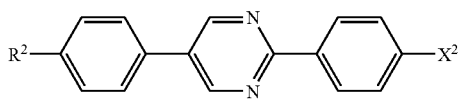
(5-32) 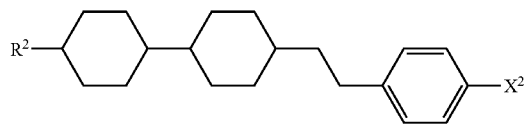
(5-33) 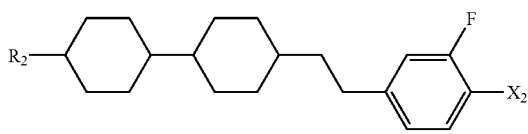
(5-34) 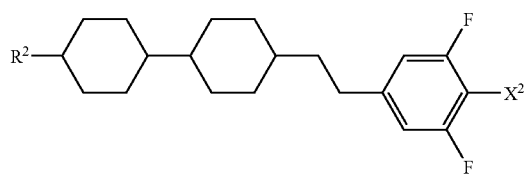
(5-35) 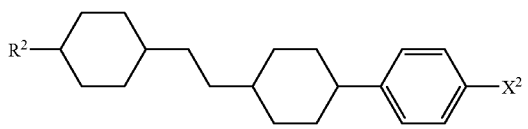
(5-36) 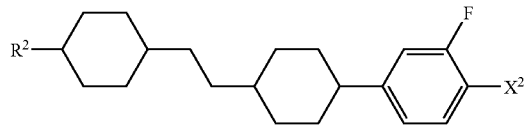
(5-37) 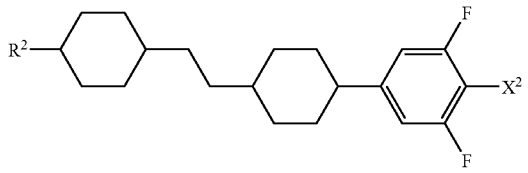
(5-38) 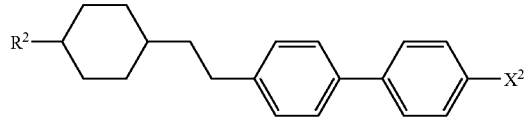
(5-39) 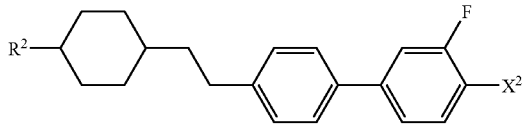
(5-40) 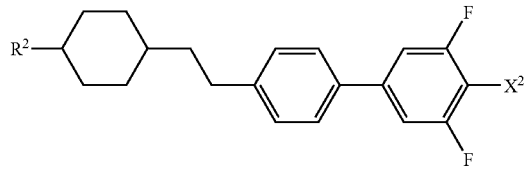
(5-41) 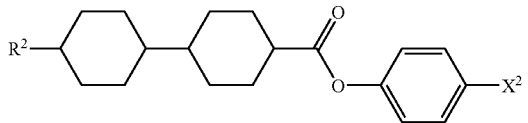
(5-42) 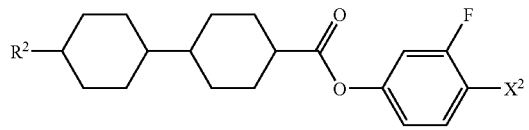
(5-43) 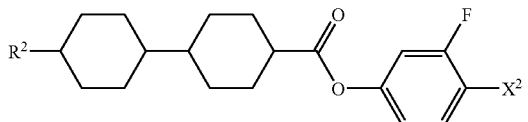
(5-44) 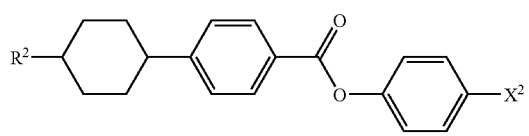
(5-45) 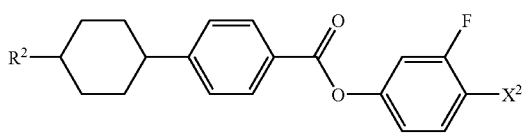
(5-46) 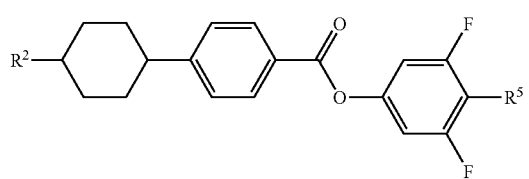
(5-47) 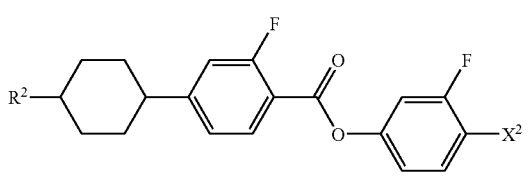

-continued
(5-48) 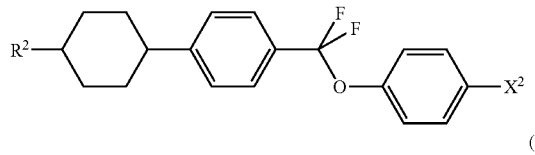
(5-49) 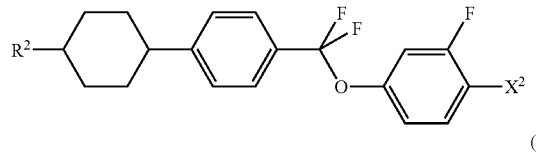
(5-50) 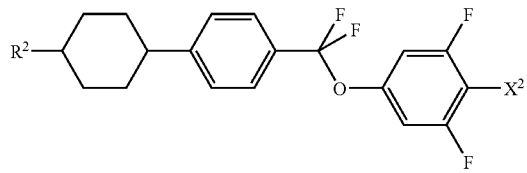
(5-51) 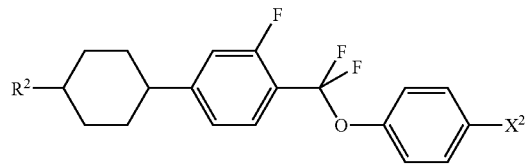
(5-52) 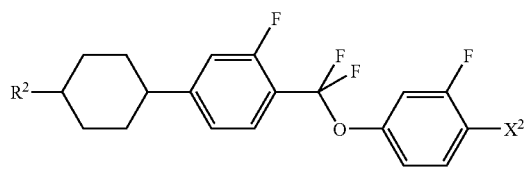
(5-53) 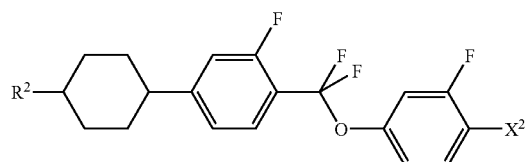
(5-54) 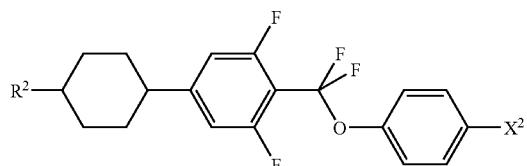
(5-55) 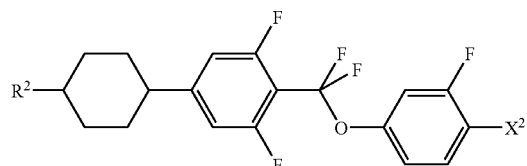
(5-56) 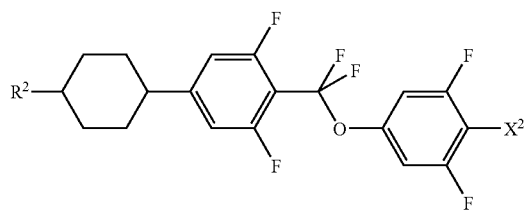
(6-1) 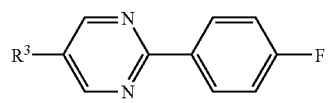
(6-2) 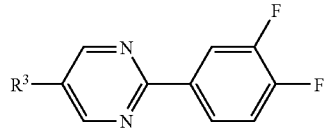
(6-3) 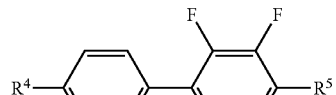
(7-1) 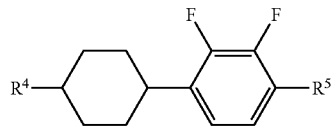
(7-2) 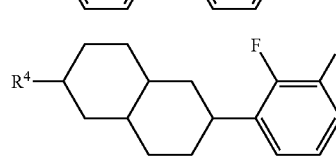
(7-3) 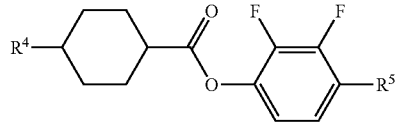
(7-4) 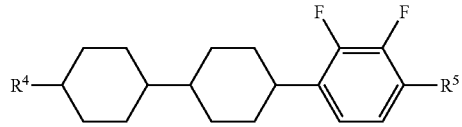
(8-1) (8-2) 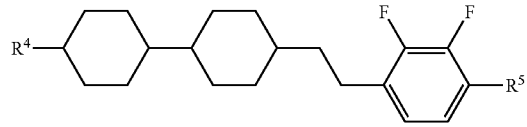

-continued
(8-3) 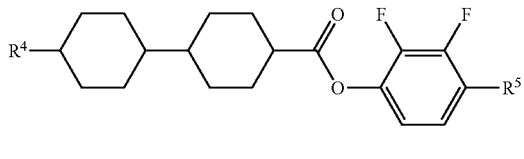
(8-4) 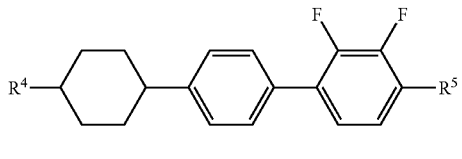
(8-5) 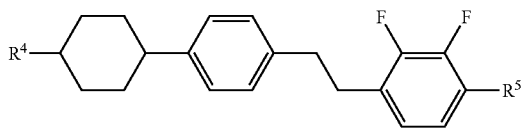
(8-6) 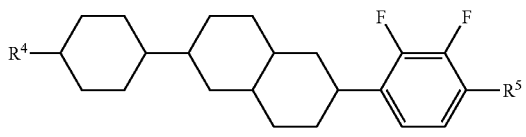
(9-1) 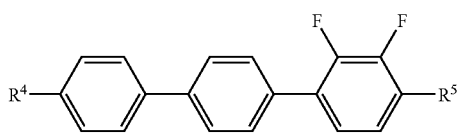
(9-2) 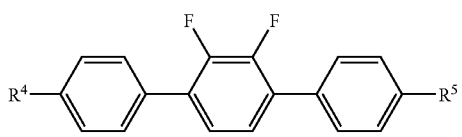
(9-3) 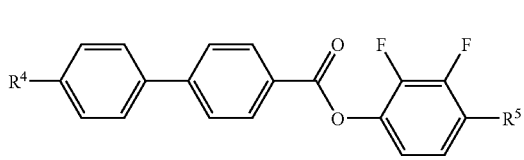
(9-4) 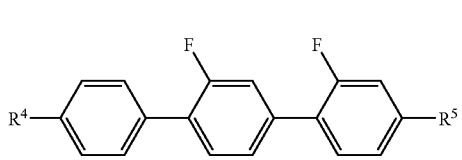
(10-1) 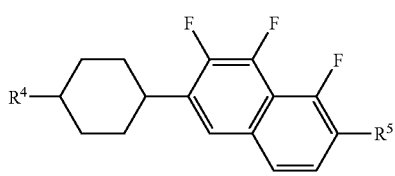
(11-1) 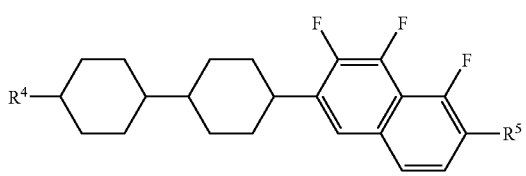
(12-1) 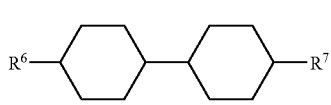
(12-2) 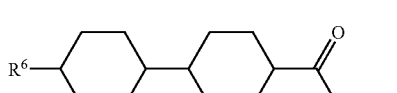
(12-3) 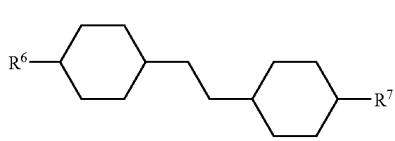
(12-4) 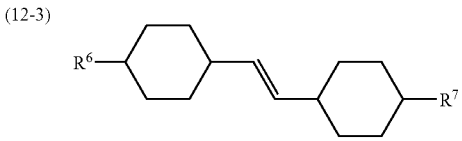
(12-5) 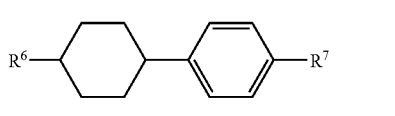
(12-6) 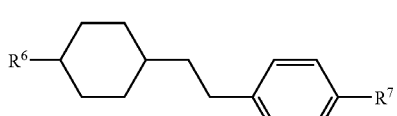
(12-7) 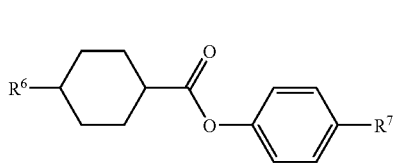
(12-8) 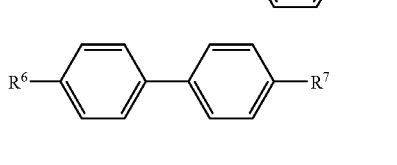
(12-9) 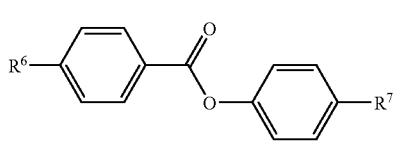
(12-10) 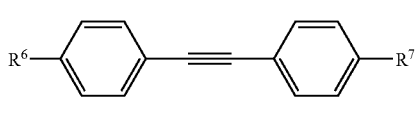
(12-11) 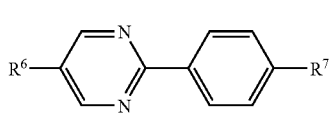
(13-1)

-continued
(13-2) 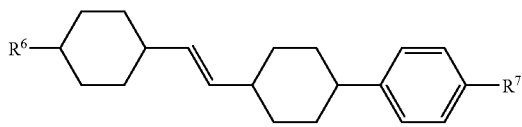
(13-3) 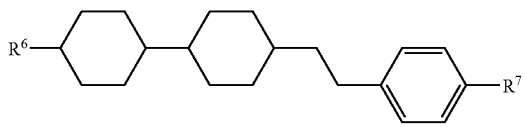
(13-4) 
(13-5) 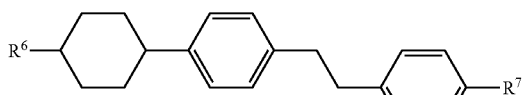
(13-6) 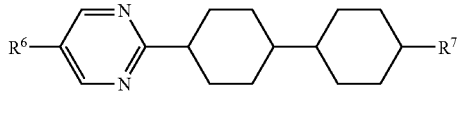
(13-7) 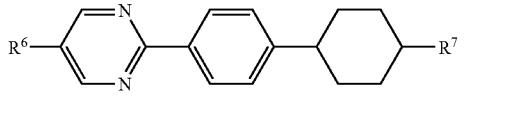
(13-8) 
(13-9) 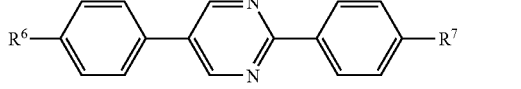
(13-10) 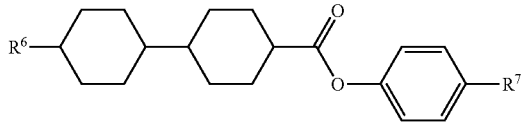
(13-11) 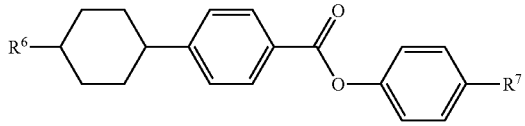
(13-12) 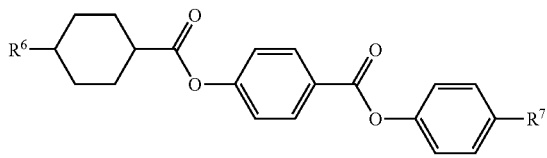
(13-13) 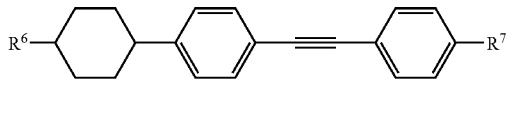
(13-14) 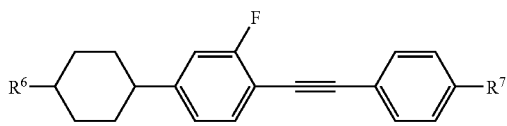
(13-15) 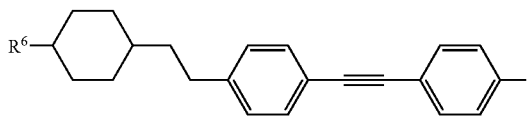
(13-16) 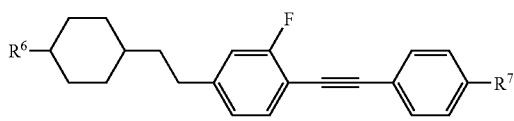
(13-17) 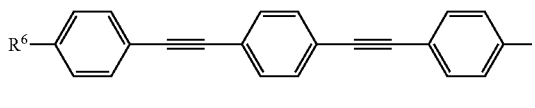
(13-18) 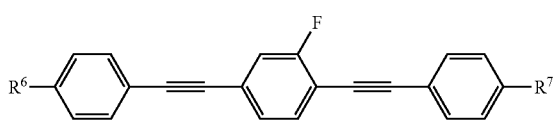
(13-19) 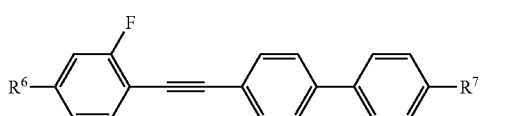
(13-20) 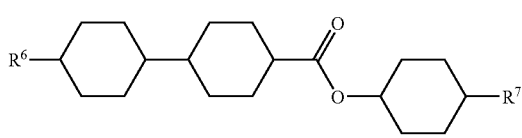
(13-21) 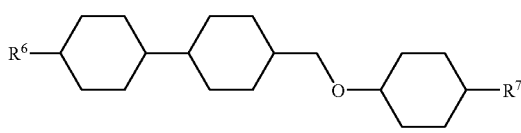

-continued
(14-1) 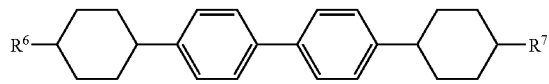
(14-2) 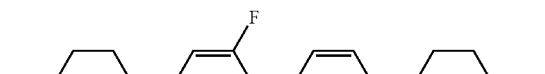
(14-3) 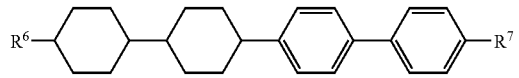
(14-4) 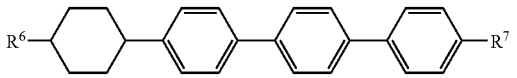
(14-5) 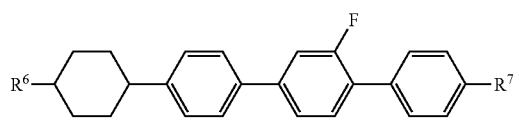
(14-6) 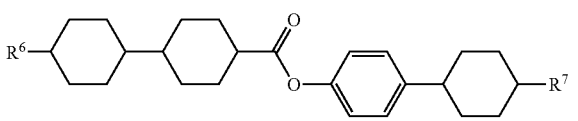
(Op-1) 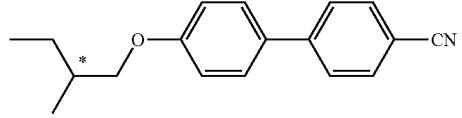
(Op-2) 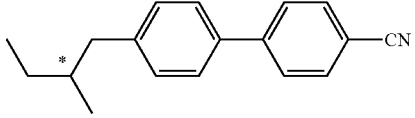
(Op-3) 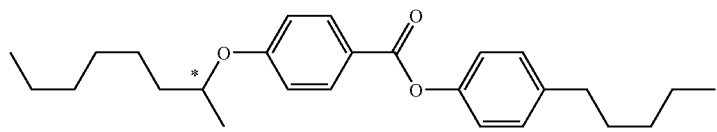
(Op-4) 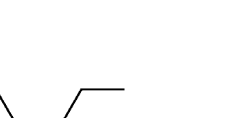
(Op-5) 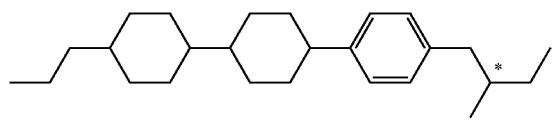
(Op-6) 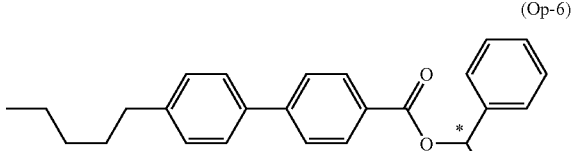
(Op-7) 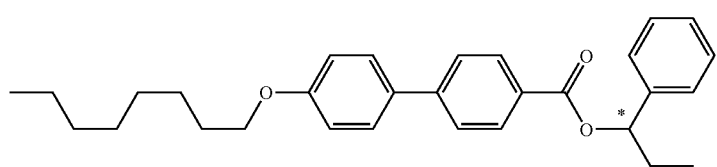
(Op-8) 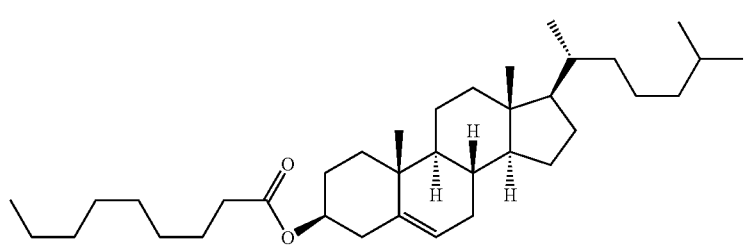
(Op-9) 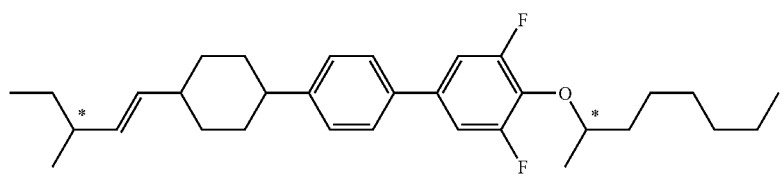

-continued

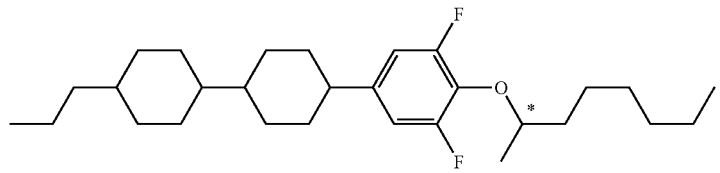
(Op-10)

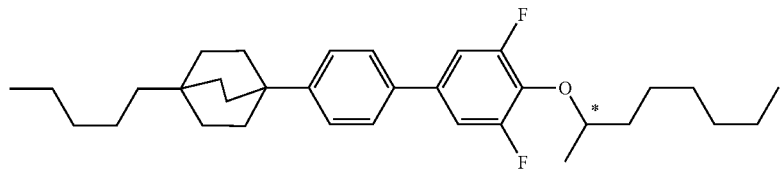
(Op-11)

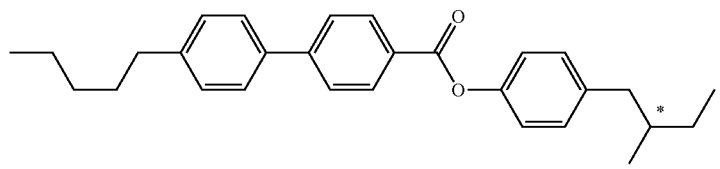
(Op-12)

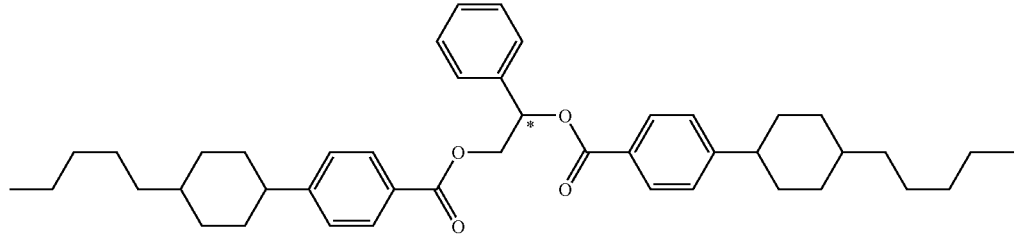
(Op-13)

A composition of this invention can be prepared using a known method. For example, the compounds as the components of the composition are mixed and dissolved through heating, while suitable additives may be added into the composition to adjust the physical properties thereof. Such additives are known to the people working in the field. It is also possible to add a dichromic pigment as a compound of melocyanine, styryl, azo, azomethine, azoxy, quinophthalone, anthraquinone or tetrazine type, and so forth, so as to prepare a composition for a GH device. In addition, to cause a twist angle needed to induce a spiral structure of the liquid crystal, a chiral dopant is added. Examples of the chiral dopant are the optically active compounds (Op-1) to (Op-13) listed above.

The pitch of the twisted structure is adjusted by adding a chiral dopant into the composition. The preferred pitch is 40-200 μm for a TN or TN-TFT device, 6-20 μm for an STN device, or 1.5-4 μm for a BTN device. The composition for a PC device is added with a relatively larger amount of chiral dopant. It is also possible to add at least two chiral dopants for adjusting the temperature dependency of the pitch.

The composition of this invention can be used in devices of PC, TN, STN, BTN, ECB, OCB, IPS and VA types, and so forth, while the driving mode of each of these devices can be PM or AM mode. The composition can also be used in nematic curvilinear aligned phase (NCAP) devices in a microcapsulized form, or be used in polymer dispersed (PD) devices in which 3D-network polymer is formed in the LC composition, such as a polymer network (PN) device.

EXAMPLES

This invention is further explained based on some Examples, but is not limited by them. The structures of the compounds with specific numbers like "No. 1" are shown in the subsequent lists, while the structures of the compounds as synthesized were identified with NMR spectra, mass spectra and so forth.

In the descriptions of the phase transition temperatures of the compounds, the symbols C, Sm, N and I respectively represent crystal, smectic, nematic and isotropic phases. The smectic phase may include multiple species like smectic phase A (SmA), smectic phase B (SmB) and so forth. At first, a compound was put between a slide glass and a cover glass to prepare a thin-film sample. The sample was placed on a hot plate of a boiling measuring instrument equipped with a polarization microscope, heated in a rate of 1° C./min and then observed for the change in the microscopic texture. After the compound was cooled and crystallized, the compound was heated. After a smectic or nematic phase appears in the crystal, the compound was further heated until the crystal entirely disappears, at which moment the temperature was recorded as a C—Sm point or a C—N point. The heating was continued until a nematic phase appears in the smectic phase or until an isotropic phase appears in the nematic phase, at which moment the temperature was recorded as an Sm—N point or an N—I point. When an isotropic phase directly appeared in a crystal phase through no LC phase, a C—I point was recorded. In the notations of phase transitions in the following texts, a phase transition temperature (° C.) is shown between the symbols of the corresponding two phases, while a phase transition shown in parentheses is of monotropic type. For example, the notation of "C 120.0 I" means that the C—I point is 120.0° C., "C 60.0 Sm 80.0 N 100.0 I" means that the C—Sm point is 60.0° C., the Sm—N point is 80.0° C. and the N—I point is 100° C., "C 120.0 (N100.0) I" means that the C—I point is 120° C. and the monotropic N—I point is 100.0° C. A monotropic phase-transition temperature is measured as the composition is being cooled in a rate of 1° C./min.

The measurements of the physical properties of the compositions were based on the methods described in Standard ED-2521A of the Electronic Industries Association of Japan (EIAJ●ED-2521A) or modified versions of the methods.

The upper-limit temperature (N—I point; ° C.) of nematic phase was measured with the sample placed on a hot plate of a boiling point measuring instrument equipped with a polarization microscope and then heated in a rate of 1° C./min. The temperature at which a portion of the sample changed to an isotropic liquid from the nematic phase was recorded, and the upper-limit temperature of nematic phase is sometimes abbreviated to "upper-limit temperature".

The lower-limit temperature ($T_C$; ° C.) of nematic phase was measured with samples having a nematic phase that were stored in different freezers respectively set at 0° C., –10° C., –20° C., –30° C. and –40° C. for 10 days and observed for the liquid crystal phase. For example, when the sample of –20° C. had the original nematic phase but the sample of –30° C. changed to the crystal or smectic phase, "$T_C \leq -20°$ C." was recorded for the composition. The lower-limit temperature of nematic phase is sometimes abbreviated to "lower-limit temperature".

To evaluate the compatibility of a compound, the compound was mixed into a host liquid crystal having a nematic phase that was prepared by mixing several compounds of similar structures. An exemplary mixing ratio of the compound to the host LC was 15%:85%. The composition was stored at a low temperature like –20° C. or –30° C. for 30 days to see if a part of the composition changes to crystal or smectic phase, while the mixing ratio and the storage temperature may be varied if required. From the result of such measurements, the conditions under which a crystal or smectic phase separates out and the conditions under which a crystal or smectic phase does not separate out are known. These conditions can serve as an indicator of the compatibility.

The viscosity ($\eta$; mPa·s) was measured at 20° C., using an E-type viscometer.

The optical anisotropy (refraction-index anisotropy; $\Delta n$) was measured at 25° C., using light with a wavelength of 589 nm and an Abbe refractometer with a polarization plate mounted on the eyepiece. After the surface of the primary prism was rubbed in one direction, the sample was dropped on the primary prism. The refractive index n∥ was measured when the polarization direction was parallel to the rubbing direction, and the refractive index n⊥ was measured when the polarization direction was perpendicular to the rubbing direction. The optical anisotropy ($\Delta n$) was calculated with the equation of "$\Delta n = n\| - n\bot$". When the sample was a composition, $\Delta n$ was measured with the above method. When a compound was to be measured, the compound was mixed in a suitable composition, of which the $\Delta n$ value was measured. The $\Delta n$ value of the compound was then obtained as an extrapolated value.

The dielectric anisotropy ($\Delta \in$) was measured at 25° C. When a compound was to be measured, the compound was mixed in a suitable composition, of which the $\Delta \in$ value was measured. The $\Delta \in$ value of the compound was then obtained as an extrapolated value.

1) For a composition having a positive dielectric anisotropy, the sample was injected into an LC cell with a gap between the two glass substrates being about 9 μm and a twist angle being 80°. The LC cell was applied with 20V as the dielectric constant ∈∥ in the long-axis direction was measured, and was applied with 0.5V as the dielectric constant ∈⊥ in the short-axis direction was measured. The dielectric anisotropy ($\Delta \in$) was calculated with the equation of "$\Delta \in = \in\| - \in\bot$".

2) For a composition having a negative dielectric anisotropy, the sample was injected into an LC cell treated in homeotropic alignment to measure ∈∥ with 0.5V applied, and into an LC cell treated in homogeneous alignment to measure ∈⊥ with 0.5V applied. The dielectric anisotropy ($\Delta \in$) was calculated with the equation of "$\Delta \in = \in\| - \in\bot$".

The threshold voltage ($V_{th}$) was measured at 25° C. When a compound was to be measured, it was mixed in a suitable composition, of which the $V_{th}$ was measured. The $V_{th}$ of the compound was then obtained as an extrapolated value.

1) For a composition having a positive dielectric anisotropy, the sample was injected into an LCD device of normally white mode with a gap between the two glass substrates being $(0.5/\Delta n)$μm and a twist angle of 80°, wherein $\Delta n$ is the optical anisotropy measured with the above method. The LCD device was applied with a square wave of 32 Hz in frequency. The voltage of the square wave was gradually raised, and the voltage at which the transparency of light through the device was 90% was recorded.

2) For a composition having a negative dielectric anisotropy, the sample was injected into an LCD device of normally black mode having been treated in homeotropic alignment, in which the gap between the two glass substrates was about 9 μm. The LCD device was applied with a square wave of 32 Hz in frequency. The voltage of the square wave was gradually raised, and the voltage at which the transparency of light through the device was 10% was recorded.

Example 1

Synthesis of 2-(4'-chloro-2,3'-difluorobiphenyl-4-yl)naphthalene (No. 53)

Step 1:

A mixture of 10.00 g (=47.33 mmol) of 2-bromonaphthalene, 7.95 g (=56.82 mmol) of 3-fluorophenylboric acid, 9.81 g (=70.98 mmol) of $K_2CO_3$, 3.81 g (=11.82 mmol) of tetrabutylammonium bromide, 1.00 g (=1.42 mmol) of dichlorobis(triphenylphosphine) palladium(II), 0.76 g (=2.84 mmol) of triphenylphosphine and a 100 ml mixed solvent of toluene/water/ethanol in a ratio of 1:1:1 was stirred for 7 hours with reflux. The reaction mixture obtained was extracted twice with toluene. The extract was washed thrice with water and then dried with anhydrous $MgSO_4$. After the solvent was evaporated under a reduced pressure, the obtained black solid of 15.40 g was purified with silica gel chromatography using heptane/toluene in a ratio of 5:1 as the eluent, thereby obtaining a white solid of 10.98 g. The white solid was recrystallized with a mixed solvent of Solumix/heptane in a ratio of 1:1 to obtain 8.90 g of 2-(3-fluorophenyl)naphthalene as white crystals.

Step 2:

A 50.21 ml cyclohexane solution of sec-butyl lithium in a concentration of 1.01M was dropped into a 200 ml THF solution of 4.90 g (=22.05 mmol) of the above 2-(3-fluorophenyl)naphthalene at −70° C. After the dropping was finished, the reaction solution was stirred at the same temperature for 1 hour, added with a 200 ml THF solution of 12.87 g (=50.71 mmol) of iodine through dropping and then slowly heated to room temperature. After being stirred for 18 hours, the reaction solution was added into iced water dissolved with $Na_2S_2O_3.5H_2O$, and then the reaction mixture was extracted twice with toluene. The extract was washed thrice with water and then dried with anhydrous $MgSO_4$. After the solvent was evaporated under a reduced pressure, the obtained orange solid of 8.61 g was purified with silica gel chromatography using heptane/toluene in a ratio of 5:1 as the eluent to obtain a pinkish solid of 7.86 g, which was recrystallized with a mixed solvent of Solumix/heptane/toluene in a ratio of 5:5:1 to obtain 6.00 g of 2-(3-fluoro-4-iodophenyl)naphthalene as yellowish crystals.

Step 3:

A mixture of 6.66 g (19.13 mmol) of the above-obtained 2-(3-fluoro-4-iodophenyl)naphthalene, 4.00 g (22.94 mmol) of 4-chloro-3-fluorophenylboric acid, 3.97 g (=28.72 mmol) of potassium carbonate, 1.54 g (=4.78 mmol) of tetrabutylammonium bromide, 0.40 g (=0.57 mmol) of dichlorobis(triphenylphosphine)palladium(II), 0.31 g (=1.16 mmol) of triphenylphosphine and a 60 ml mixed solvent of toluene/water/ethanol in a ratio of 1:1:1 was stirred for 44 hours with reflux. The reaction mixture obtained was extracted twice with toluene. The extract was washed thrice with water and then dried with anhydrous $MgSO_4$. After the solvent was evaporated under a reduced pressure, the obtained yellowish solid of 9.66 g was purified with silica gel chromatography using heptane/toluene in a ratio of 5:1 as the eluent to obtain a white solid of 7.11 g, which was recrystallized with a mixed solvent of heptane/toluene in a ratio of 8:1 to obtain a product in an amount of 4.79 g, which was characterized as the target compound based on results of various instrumental analyses. The phase transitions of the product are notated as "C 121.9 N 128.7 I".

Example 2

Synthesis of 2-[2-(2,4'-difluorobiphenyl-4-yl)ethyl]naphthalene (No. 103)

Step 1:

In the step, 35.00 g (77.55 mmol) of (3-fluorobenzyl)triphenylphosphonium bromide was suspended in 150 ml of THF, and the suspension was cooled to −30° C. and added with 10.25 g (=88.61 mmols) of potassium t-butoxide under stirring. After the addition was finished, the reaction solution was stirred at the same temperature for 1 hour, a 50 ml THF solution of 8.65 g (=55.38 mmol) of 2-naphthoaldehyde was dropped into the same, and then the mixture was slowly heated to room temperature. After being stirred for 18 hours, the reaction mixture was added into iced water, and the mixture was extracted thrice with toluene. The extract was washed thrice with water and then dried with anhydrous $MgSO_4$. After the solvent was evaporated under a reduced pressure, the obtained yellow solid of 43.34 g was purified with silica gel chromatography using heptane as the eluent to obtain 11.54 g of 2-[2-(3-fluorophenyl)vinyl]naphthalene as a white solid.

Step 2

A 60 ml Solumix/toluene (1:1) solution of 11.54 g (46.48 mmol) of the above 2-[2-(3-fluorophenyl)vinyl]naphthalene was added with 0.58 g of 5%-Pd/C and then stirred for 20 hours in an $H_2$-atmosphere. The 5%-Pd/C was filtrated away from the reaction solution, and then the filtrate was condensed under a reduced pressure. The obtained gray solid of 11.18 g was purified with silica gel chromatography using toluene as the eluent to obtain a white solid of 11.05 g, which was recrystallized with a mixed solvent of Solumix/heptane in a ratio of 2:1 to obtain 10.43 g of 2-[2-(3-fluorophenyl)ethyl]naphthalene as white crystals.

Step 3

A 53.35 ml cyclohexane solution of sec-butyl lithium in a concentration of 1.01M was dropped into a 200 ml THF solution of 8.43 g (33.68 mmol) of the above 2-[2-(3-fluorophenyl)ethyl]naphthalene at −70° C. After the dropping was finished, the reaction solution was stirred at the same temperature for 1 hour, added with a 200 ml THF solution of 13.68 g (=53.90 mmol) of iodine through dropping and then slowly heated to room temperature. After being stirred for 18 hours, the reaction solution was added in iced water dissolved with $Na_2S_2O_3.5H_2O$, and then the reaction mixture was extracted twice with toluene. The extract was washed thrice with water, and was then dried with anhydrous $MgSO_4$. After the solvent was evaporated under a reduced pressure, the obtained orange solid of 13.05 g was purified with silica gel chromatography using heptane/toluene in a ratio of 5:1 as the eluent to obtain a yellowish solid of 11.66 g, which was recrystallized with a mixed solvent of Solumix/heptane in a ratio of 5:1 to obtain 10.60 g of 2-[2-(3-fluoro-4-iodophenyl)ethyl]naphthalene as yellowish crystals.

Step 4:

A mixture of 7.00 g (=18.61 mmol) of the above 2-[2-(3-fluoro-4-iodophenyl)ethyl]naphthalene, 3.12 g (=22.30 mmol) of 4-fluorophenylboric acid, 3.86 g (=27.93 mmol) of $K_2CO_3$, 1.50 g (=4.65 mmol) of tetrabutylammonium bromide, 0.39 g (=0.56 mmol) of dichlorobis(triphenylphosphine)palladium(II), 0.30 g (1.12 mmol) of triphenylphosphine and 60 ml of a mixed solvent of toluene/water/ethanol in a ratio of 1:1:1 was stirred for 4 hours with reflux. The reaction mixture obtained was extracted thrice with toluene, and then the extract was washed thrice with water and dried with anhydrous $MgSO_4$. After the solvent was evaporated under a reduced pressure, the obtained orange solid of 8.48 g was purified with silica gel chromatography using heptane/toluene in a ratio of 5:1 as the eluent to obtain a white solid of 7.37 g, which was further recrystallized using a mixed solvent of Solumix/heptane in a ratio of 1:1 to obtain the target compound in an amount of 5.02 g. The product was characterized as the target compound based on results of various instrumental analyses, and the phase transition of the product is notated as "C 108.1 I".

Example 3

Synthesis of 2-{3-fluoro-4-[2-(4-fluorophenyl)ethyl]phenyl}naphthalene (No. 145)

Step 1:

A 86.86 ml cyclohexane solution of sec-butyl lithium in a concentration of 1.01M was dropped into a 300 ml THF solution of 15.00 g (=67.49 mmol) of 2-(3-fluorophenyl)naphthalene at −70° C. After the dropping was finished, the reaction solution was stirred at the same temperature for 1 hour, added with a 150 ml THF solution of 10.88 g (=94.49 mmol) of 4-formylmorpholine through dropping and then slowly heated to room temperature. After being stirred for 18 hours, 25 ml of 6N $HCl_{(aq)}$ was dropped into the reaction solution, and then the reaction mixture was extracted thrice with toluene. The extract was washed with water and an aqueous solution of NaHCO$_3$, and then dried with anhydrous MgSO$_4$. After the solvent was evaporated under a reduced pressure, the obtained yellow solid of 16.83 g was purified with silica gel chromatography using toluene as the eluent to obtain a yellowish solid of 13.26 g, which was further recrystallized with toluene to obtain 10.09 g of 2-fluoro-4-naphthalene-2-yl-benzaldehyde as yellowish crystals.

Step 2

In the step, 6.30 g (15.48 mmol) of (4-fluorobenzyl)triphenylphosphonium bromide was suspended in 50 ml of THF, and the suspension was cooled to −30° C. and added with 1.74 g (=15.48 mmols) of potassium t-butoxide under stirring. After the addition was finished, the reaction solution was stirred at the same temperature for 1 hour, a 25 ml THF solution of 3.00 g (11.99 mmol) of 2-fluoro-4-naphthalene-2-yl-benzaldehyde was dropped into the same, and then the mixture was slowly heated to room temperature. After being stirred for 18 hours, the reaction mixture was added into iced water, and the mixture was extracted thrice with toluene. The extract was washed thrice with water and then dried with anhydrous MgSO$_4$. After the solvent was evaporated under a reduced pressure, the obtained yellow solid of 12.73 g was purified with silica gel chromatography using heptane as the eluent to obtain 3.44 g of 2-{3-fluoro-4-[2-(4-fluorophenyl)vinyl]phenyl}naphthalene as a white solid.

Step 3:

A 30 ml Solumix/toluene (1:1) solution of 3.44 g (=10.05 mmol) of the above 2-{3-fluoro-4-[2-(4-fluorophenyl)vinyl]phenyl}naphthalene was added with 0.17 g of 5%-Pd/C and then stirred for 20 hours in an H$_2$-atmosphere. The 5%-Pd/C was filtrated away from the reaction solution, and the filtrate was condensed under a reduced pressure. The obtained gray solid of 3.66 g was purified with silica gel chromatography using toluene as the eluent to obtain a white solid of 3.29 g, which was further recrystallized with a mixed solvent of heptane/toluene in a ratio of 5:4 to obtain a product of 3.15 g. The product was characterized as the target compound based on results of various instrumental analyses, and the phase transition of the product is notated as "C 154.3 I".

Example 4

Synthesis of 2,3',4',5'-tetrafluorobiphenyl-4-yl ester of naphthalene-2-carboxylic acid (No. 147)

Firstly, 34.10 mmol of 4-dimethylaminopyridine is dropped into a mixture of 28.40 mmol of naphthalene-2-carboxylic acid, 28.40 mmol of 2,3',4',5'-tetrafluorobiphenyl-4-ol and 100 ml of dichloromethane. Then, a 100 ml dichloromethane solution of 34.10 mmol of 1,3-dicyclohexylcarbodiimide is dropped into the resulting mixture. After the dropping is finished, the mixture is stirred at room temperature for 18 hours. The solid formed thereby is filtrated away, and a saturated aqueous solution of NaCl is dropped into the filtrate. The organic layer formed is washed with HCl$_{(aq)}$, water and saturated aqueous solution of NaHCO$_3$ in sequence and dried with anhydrous MgSO$_4$. After the organic layer is evaporated under a reduced pressure, the product is purified with silica gel chromatography and then recrystallized to obtain the target compound.

Example 5

Synthesis of 2-[difluoro-(2,3',4',5'-tetrafluorobiphenyl-4-yloxy)-methyl]naphthalene (No. 149)

Step 1:

In this step, a mixture of 77.60 mmol of 2,3',4',5'-tetrafluorobiphenyl-4-yl ester of naphthalene-2-carboxylic acid, 155.20 mmol of 2,4-bis(methoxyphenyl)-1,3-dithia-2,4-diphosphetane-2,4-disulfide and 400 ml of toluene is stirred for 60 hours with reflux. The reaction mixture obtained is washed with water, a saturated aqueous solution of NaHCO$_3$, a 10% aqueous solution of NaHSO$_3$ and water in sequence and then dried with anhydrous MgSO$_4$. After being condensed under a reduced pressure, the product is purified with silica gel chromatography and then recrystallized to obtain naphthalene-2-carbothioacid-oxy-(2,3',4',5'-tetrafluorobiphenyl-4-yl)ester.

Step 2:

In this step, 76.50 mmol of (diethylamino)sulfur trifluoride is dropped into a 100 ml dichloromethane solution of 30.60 mmol of the above naphthalene-2-carbothioacid-oxy-(2,3',4', 5'-tetrafluorobiphenyl-4-yl)ester. After the dropping is finished, the solution is stirred at room temperature for 20 hours. The reaction mixture obtained is added in a saturated aqueous solution of NaHCO$_3$ and then extracted with dichloromethane. The extract is then washed with water and dried with anhydrous MgSO$_4$. After being condensed under a reduced pressure, the product is purified with silica gel chromatography and then recrystallized to obtain the target compound.

Example 6

The following compounds of No. 1 to No. 162 are synthesized with the methods in Examples 1-5 and other known synthesis methods. The phase transition temperatures measured for some of the compounds are also shown in the following tables.

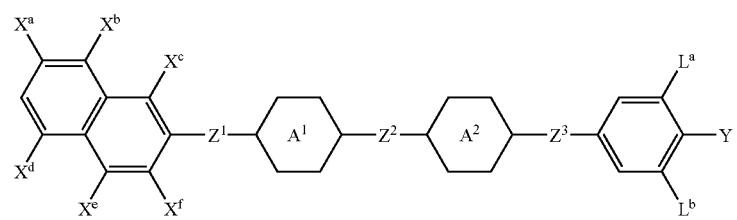

| No. | $X^a$ | $X^b$ | $X^c$ | $X^d$ | $X^e$ | $X^f$ | $Z^1$ | $A^1$ | $Z^2$ | $A^2$ | $Z^3$ | $L^a$ | $L^b$ | Y |
|---|---|---|---|---|---|---|---|---|---|---|---|---|---|---|
| 1 | H | H | H | H | H | H | — | | | | | H | H | OCF$_3$ |
| 2 | H | H | H | H | H | H | — | | | | | F | H | OCF$_3$ |
| 3 | H | H | H | H | H | H | — | | | | | F | F | OCF$_3$ |
| 4 | H | H | H | H | H | H | — | | | | | H | H | F |

C 104.3 I

-continued

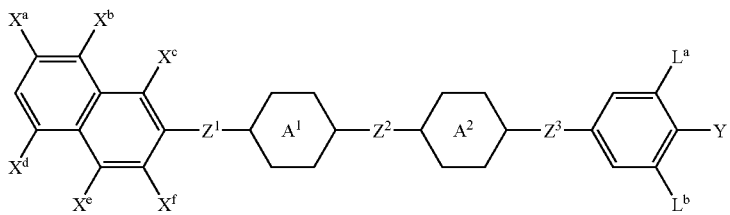

| No. | $X^a$ | $X^b$ | $X^c$ | $X^d$ | $X^e$ | $X^f$ | $Z^1$ | $A^1$ | $Z^2$ | $A^2$ | $Z^3$ | $L^a$ | $L^b$ | Y |
|---|---|---|---|---|---|---|---|---|---|---|---|---|---|---|
| 5 | H | H | H | H | H | H | — | | | | | F | H | F |
| | | | | | | | | | | | | | | C 137.1 I |
| 6 | H | H | H | H | H | H | — | | | | | F | F | F |
| 7 | H | H | H | H | H | H | — | | | | | H | H | Cl |
| | | | | | | | | | | | | | | C 163.8 I |
| 8 | H | H | H | H | H | H | — | | | | | F | H | Cl |
| | | | | | | | | | | | | | | C 162.8 I |
| 9 | H | H | H | H | H | H | — | | | | | F | F | Cl |
| 10 | H | H | F | H | H | H | — | | | | | H | H | $OCF_3$ |
| 11 | H | H | F | H | H | H | — | | | | | F | H | $OCF_3$ |
| 12 | H | H | F | H | H | H | — | | | | | F | F | $OCF_3$ |
| 13 | H | H | F | H | H | H | — | | | | | H | H | F |
| 14 | H | H | F | H | H | H | — | | | | | F | H | F |
| 15 | H | H | F | H | H | H | — | | | | | F | F | F |
| | | | | | | | | | | | | | | C 101.5 I |
| 16 | H | H | F | H | H | H | — | | | | | H | H | Cl |
| | | | | | | | | | | | | | | C 98.5 I |
| 17 | H | H | F | H | H | H | — | | | | | F | H | Cl |
| 18 | H | H | F | H | H | H | — | | | | | F | F | Cl |
| 19 | H | H | H | H | H | H | $-(CH_2)_2-$ | | | | | H | H | $OCF_3$ |
| 20 | H | H | H | H | H | H | $-(CH_2)_2-$ | | | | | F | H | $OCF_3$ |
| 21 | H | H | H | H | H | H | $-(CH_2)_2-$ | | | | | F | F | $OCF_3$ |
| 22 | H | H | H | H | H | H | $-(CH_2)_2-$ | | | | | H | H | F |
| 23 | H | H | H | H | H | H | $-(CH_2)_2-$ | | | | | F | H | F |
| | | | | | | | | | | | | | | C 77.5 I |
| 24 | H | H | H | H | H | H | $-(CH_2)_2-$ | | | | | F | F | F |
| 25 | H | H | H | H | H | H | $-(CH_2)_2-$ | | | | | H | H | Cl |
| 26 | H | H | H | H | H | H | $-(CH_2)_2-$ | | | | | F | H | Cl |
| 27 | H | H | H | H | H | H | $-(CH_2)_2-$ | | | | | F | F | Cl |
| 28 | H | H | F | H | H | H | $-(CH_2)_2-$ | | | | | H | H | $OCF_3$ |
| 29 | H | H | F | H | H | H | $-(CH_2)_2-$ | | | | | F | H | $OCF_3$ |
| 30 | H | H | F | H | H | H | $-(CH_2)_2-$ | | | | | F | F | $OCF_3$ |
| 31 | H | H | F | H | H | H | $-(CH_2)_2-$ | | | | | H | H | F |
| 32 | H | H | F | H | H | H | $-(CH_2)_2-$ | | | | | F | H | F |
| 33 | H | H | F | H | H | H | $-(CH_2)_2-$ | | | | | F | F | F |
| 34 | H | H | F | H | H | H | $-(CH_2)_2-$ | | | | | H | H | Cl |
| 35 | H | H | F | H | H | H | $-(CH_2)_2-$ | | | | | F | H | Cl |
| 36 | H | H | F | H | H | H | $-(CH_2)_2-$ | | | | | F | F | Cl |
| 37 | H | H | H | H | H | H | — | 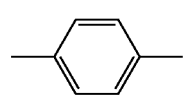 | — | | | H | H | $OCF_3$ |
| 38 | H | H | H | H | H | H | — | 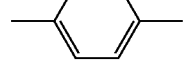 | — | | | F | H | $OCF_3$ |
| 39 | H | H | H | H | H | H | — | 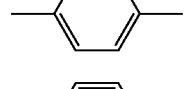 | — | | | F | F | $OCF_3$ |
| 40 | H | H | H | H | H | H | — | 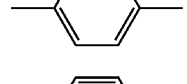 | — | | | H | H | F |
| 41 | H | H | H | H | H | H | — |  | — | | | F | H | F |

-continued
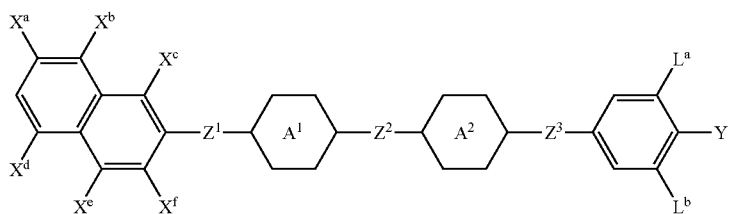
| No. | $X^a$ | $X^b$ | $X^c$ | $X^d$ | $X^e$ | $X^f$ | $Z^1$ | $A^1$ | $Z^2$ | $A^2$ | $Z^3$ | $L^a$ | $L^b$ | Y |
|---|---|---|---|---|---|---|---|---|---|---|---|---|---|---|
| 42 | H | H | H | H | H | H | — | phenyl | — | | | F | F | F |
| 43 | H | H | H | H | H | H | — | phenyl | — | | | H | H | Cl |
| 44 | H | H | H | H | H | H | — | phenyl | — | | | F | H | Cl |
| 45 | H | H | H | H | H | H | — | phenyl | — | | | F | F | Cl |
| 46 | H | H | H | H | H | H | — | F-phenyl | — | | | H | H | $OCF_3$ |
| 47 | H | H | H | H | H | H | — | F-phenyl | — | | | F | H | $OCF_3$ |
| 48 | H | H | H | H | H | H | — | F-phenyl | — | | | F | F | $OCF_3$<br>C 132.3<br>(N 100.1) I |
| 49 | H | H | H | H | H | H | — | F-phenyl | — | | | H | H | F<br>C 155.3 I |
| 50 | H | H | H | H | H | H | — | F-phenyl | — | | | F | H | F |
| 51 | H | H | H | H | H | H | — | F-phenyl | — | | | F | F | F<br>C 140.4 I |

-continued
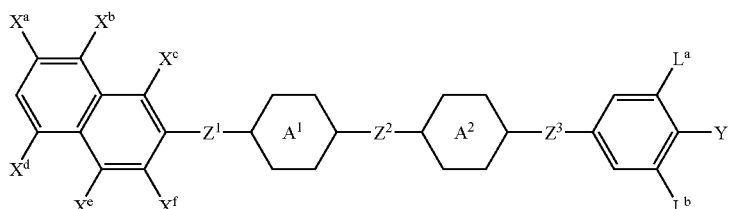
| No. | $X^a$ | $X^b$ | $X^c$ | $X^d$ | $X^e$ | $X^f$ | $Z^1$ | $A^1$ | $Z^2$ | $A^2$ | $Z^3$ | $L^a$ | $L^b$ | Y |
|---|---|---|---|---|---|---|---|---|---|---|---|---|---|---|
| 52 | H | H | H | H | H | H | — | ![F-phenyl] | — | | | H | H | Cl |
| 53 | H | H | H | H | H | H | — | ![F-phenyl] | — | | | F | H | Cl<br>C 121.9<br>N 128.7 |
| 54 | H | H | H | H | H | H | — | ![F-phenyl] | — | | | F | F | Cl |
| 55 | H | H | H | H | H | H | — | ![diF-phenyl] | — | | | H | H | OCF$_3$ |
| 56 | H | H | H | H | H | H | — | ![diF-phenyl] | — | | | F | H | OCF$_3$ |
| 57 | H | H | H | H | H | H | — | ![diF-phenyl] | — | | | F | F | OCF$_3$ |
| 58 | H | H | H | H | H | H | — | ![diF-phenyl] | — | | | H | H | F |
| 59 | H | H | H | H | H | H | — | ![diF-phenyl] | — | | | F | H | F |

-continued

| No. | $X^a$ | $X^b$ | $X^c$ | $X^d$ | $X^e$ | $X^f$ | $Z^1$ | $A^1$ | $Z^2$ | $A^2$ | $Z^3$ | $L^a$ | $L^b$ | Y |
|---|---|---|---|---|---|---|---|---|---|---|---|---|---|---|
| 60 | H | H | H | H | H | H | — | 2,6-difluoro-phenylene (F,F) | — | | | F | F | F |
| 61 | H | H | H | H | H | H | — | 2,6-difluoro-phenylene (F,F) | — | | | H | H | Cl |
| 62 | H | H | H | H | H | H | — | 2,6-difluoro-phenylene (F,F) | — | | | F | H | Cl  C 162.5  C 166.3 I |
| 63 | H | H | H | H | H | H | — | 2,6-difluoro-phenylene (F,F) | — | | | F | F | Cl |
| 64 | H | H | F | H | H | H | — | phenylene | — | | | H | H | $OCF_3$ |
| 65 | H | H | F | H | H | H | — | phenylene | — | | | F | H | $OCF_3$ |
| 66 | H | H | F | H | H | H | — | phenylene | — | | | F | F | $OCF_3$ |
| 67 | H | H | F | H | H | H | — | phenylene | — | | | H | H | F |
| 68 | H | H | F | H | H | H | — | phenylene | — | | | F | H | F |
| 69 | H | H | F | H | H | H | — | phenylene | — | | | F | F | F |

-continued
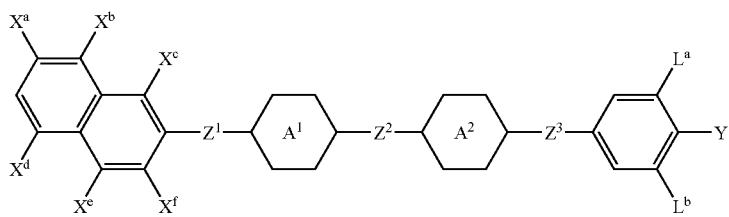
| No. | $X^a$ | $X^b$ | $X^c$ | $X^d$ | $X^e$ | $X^f$ | $Z^1$ | $A^1$ | $Z^2$ | $A^2$ | $Z^3$ | $L^a$ | $L^b$ | Y |
|---|---|---|---|---|---|---|---|---|---|---|---|---|---|---|
| 70 | H | H | F | H | H | H | — | ⬡ | — | | | H | H | Cl |
| 71 | H | H | F | H | H | H | — | ⬡ | — | | | F | H | Cl |
| 72 | H | H | F | H | H | H | — | ⬡ | — | | | F | F | Cl |
| 73 | H | H | F | H | H | H | — | ⬡-F | — | | | H | H | $OCF_3$ |
| 74 | H | H | F | H | H | H | — | ⬡-F | — | | | F | H | $OCF_3$ |
| 75 | H | H | F | H | H | H | — | ⬡-F | — | | | F | F | $OCF_3$ |
| 76 | H | H | F | H | H | H | — | ⬡-F | — | | | H | H | F |
| 77 | H | H | F | H | H | H | — | ⬡-F | — | | | F | H | F |
| 78 | H | H | F | H | H | H | — | ⬡-F | — | | | F | F | F C 177.3 I |
| 79 | H | H | F | H | H | H | — | ⬡-F | — | | | H | H | Cl |

-continued
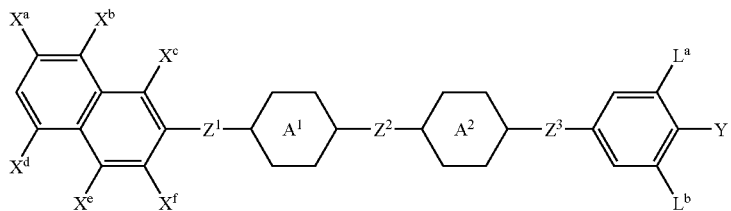
| No. | $X^a$ | $X^b$ | $X^c$ | $X^d$ | $X^e$ | $X^f$ | $Z^1$ | $A^1$ | $Z^2$ | $A^2$ | $Z^3$ | $L^a$ | $L^b$ | Y |
|---|---|---|---|---|---|---|---|---|---|---|---|---|---|---|
| 80 | H | H | F | H | H | H | — | ![3-F phenyl] | — | | | F | H | Cl<br>C 161.9 I |
| 81 | H | H | F | H | H | H | — | ![3-F phenyl] | — | | | F | F | Cl |
| 82 | H | H | F | H | H | H | — | ![3,5-diF phenyl] | — | | | H | H | $OCF_3$ |
| 83 | H | H | F | H | H | H | — | ![3,5-diF phenyl] | — | | | F | H | $OCF_3$ |
| 84 | H | H | F | H | H | H | — | ![3,5-diF phenyl] | — | | | F | F | $OCF_3$ |
| 85 | H | H | F | H | H | H | — | ![3,5-diF phenyl] | — | | | H | H | F |
| 86 | H | H | F | H | H | H | — | ![3,5-diF phenyl] | — | | | F | H | F |

-continued
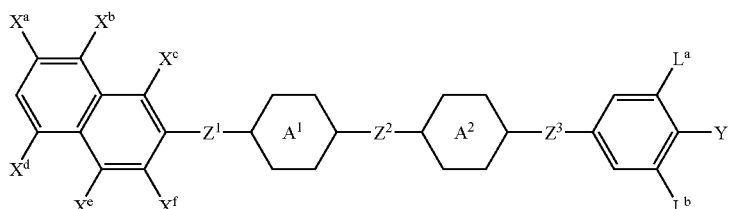
| No. | Xa | Xb | Xc | Xd | Xe | Xf | Z1 | A1 | Z2 | A2 | Z3 | La | Lb | Y |
|---|---|---|---|---|---|---|---|---|---|---|---|---|---|---|
| 87 | H | H | F | H | H | H | — | | — | | | F | F | F<br>C 230.5 ∣ |
| 88 | H | H | F | H | H | H | — | | — | | | H | H | Cl |
| 89 | H | H | F | H | H | H | — | | — | | | F | H | Cl<br>C 215.6 ∣ |
| 90 | H | H | F | H | H | H | — | | — | | | F | F | Cl |
| 91 | H | H | H | H | H | H | —(CH$_2$)$_2$— | | — | | | H | H | OCF$_3$ |
| 92 | H | H | H | H | H | H | —(CH$_2$)$_2$— | | — | | | F | H | OCF$_3$ |
| 93 | H | H | H | H | H | H | —(CH$_2$)$_2$— | | — | | | F | F | OCF$_3$ |
| 94 | H | H | H | H | H | H | —(CH$_2$)$_2$— | | — | | | H | H | F |
| 95 | H | H | H | H | H | H | —(CH$_2$)$_2$— | | — | | | F | H | F |
| 96 | H | H | H | H | H | H | —(CH$_2$)$_2$— | | — | | | F | F | F |

-continued

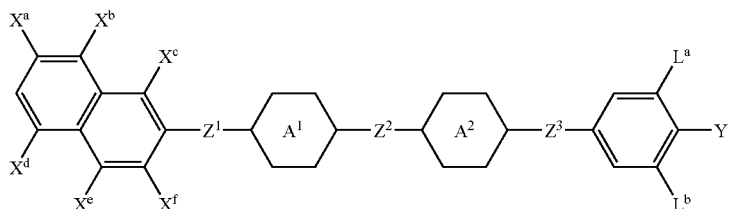

| No. | $X^a$ | $X^b$ | $X^c$ | $X^d$ | $X^e$ | $X^f$ | $Z^1$ | $A^1$ | $Z^2$ | $A^2$ | $Z^3$ | $L^a$ | $L^b$ | Y |
|---|---|---|---|---|---|---|---|---|---|---|---|---|---|---|
| 97 | H | H | H | H | H | H | —(CH$_2$)$_2$— | phenyl | — | | | H | H | Cl |
| 98 | H | H | H | H | H | H | —(CH$_2$)$_2$— | phenyl | — | | | F | H | Cl |
| 99 | H | H | H | H | H | H | —(CH$_2$)$_2$— | phenyl | — | | | F | F | Cl |
| 100 | H | H | H | H | H | H | —(CH$_2$)$_2$— | F-phenyl | — | | | H | H | OCF$_3$ |
| 101 | H | H | H | H | H | H | —(CH$_2$)$_2$— | F-phenyl | — | | | F | H | OCF$_3$ |
| 102 | H | H | H | H | H | H | —(CH$_2$)$_2$— | F-phenyl | — | | | F | F | OCF$_3$ |
| 103 | H | H | H | H | H | H | —(CH$_2$)$_2$— | F-phenyl | — | | | H | H | F<br>C 108.9 I |
| 104 | H | H | H | H | H | H | —(CH$_2$)$_2$— | F-phenyl | — | | | F | H | F<br>C 101.0 I |
| 105 | H | H | H | H | H | H | —(CH$_2$)$_2$— | F-phenyl | — | | | F | F | F |
| 106 | H | H | H | H | H | H | —(CH$_2$)$_2$— | F-phenyl | — | | | H | H | Cl<br>C 119.2 I |

-continued
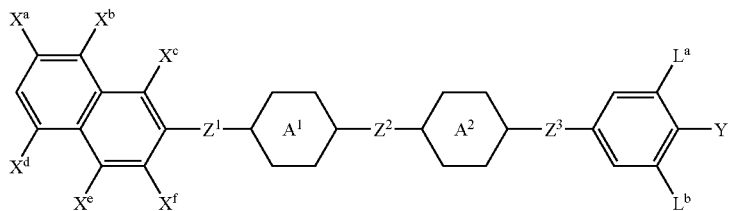
| No. | $X^a$ | $X^b$ | $X^c$ | $X^d$ | $X^e$ | $X^f$ | $Z^1$ | $A^1$ | $Z^2$ | $A^2$ | $Z^3$ | $L^a$ | $L^b$ | Y |
|-----|-----|-----|-----|-----|-----|-----|--------|------|-----|-----|-----|-----|-----|-----|
| 107 | H | H | H | H | H | H | —(CH$_2$)$_2$— | 3-F-phenyl | — | | | F | H | Cl |
| 108 | H | H | H | H | H | H | —(CH$_2$)$_2$— | 3-F-phenyl | — | | | F | F | Cl |
| 109 | H | H | H | H | H | H | —(CH$_2$)$_2$— | 3,5-diF-phenyl | — | | | H | H | OCF$_3$ |
| 110 | H | H | H | H | H | H | —(CH$_2$)$_2$— | 3,5-diF-phenyl | — | | | F | H | OCF$_3$ |
| 111 | H | H | H | H | H | H | —(CH$_2$)$_2$— | 3,5-diF-phenyl | — | | | F | F | OCF$_3$ |
| 112 | H | H | H | H | H | H | —(CH$_2$)$_2$— | 3,5-diF-phenyl | — | | | H | H | F<br>C 116.4 I |
| 113 | H | H | H | H | H | H | —(CH$_2$)$_2$— | 3,5-diF-phenyl | — | | | F | H | F<br>C 117.9 I |

-continued

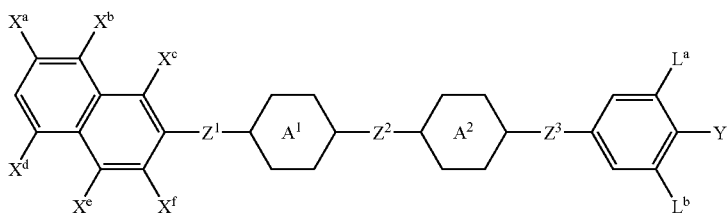

| No. | $X^a$ | $X^b$ | $X^c$ | $X^d$ | $X^e$ | $X^f$ | $Z^1$ | $A^1$ | $Z^2$ | $A^2$ | $Z^3$ | $L^a$ | $L^b$ | Y |
|---|---|---|---|---|---|---|---|---|---|---|---|---|---|---|
| 114 | H | H | H | H | H | H | —(CH$_2$)$_2$— | 3,4,5-trifluorophenylene | — | | | F | F | F |
| 115 | H | H | H | H | H | H | —(CH$_2$)$_2$— | 3,4,5-trifluorophenylene | — | | | H | H | Cl |
| 116 | H | H | H | H | H | H | —(CH$_2$)$_2$— | 3,4,5-trifluorophenylene | — | | | F | H | Cl |
| 117 | H | H | H | H | H | H | —(CH$_2$)$_2$— | 3,4,5-trifluorophenylene | — | | | F | F | Cl |
| 118 | H | H | F | H | H | H | —(CH$_2$)$_2$— | phenylene | — | | | H | H | OCF$_3$ |
| 119 | H | H | F | H | H | H | —(CH$_2$)$_2$— | phenylene | — | | | F | H | OCF$_3$ |
| 120 | H | H | F | H | H | H | —(CH$_2$)$_2$— | phenylene | — | | | F | F | OCF$_3$ |
| 121 | H | H | F | H | H | H | —(CH$_2$)$_2$— | phenylene | — | | | H | H | F |
| 122 | H | H | F | H | H | H | —(CH$_2$)$_2$— | phenylene | — | | | F | H | F |
| 123 | H | H | F | H | H | H | —(CH$_2$)$_2$— | phenylene | — | | | F | F | F |

-continued

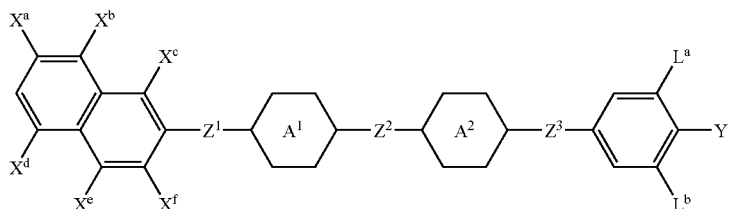

| No. | $X^a$ | $X^b$ | $X^c$ | $X^d$ | $X^e$ | $X^f$ | $Z^1$ | $A^1$ | $Z^2$ | $A^2$ | $Z^3$ | $L^a$ | $L^b$ | Y |
|---|---|---|---|---|---|---|---|---|---|---|---|---|---|---|
| 124 | H | H | F | H | H | H | —(CH$_2$)$_2$— | phenyl | — | | | H | H | Cl |
| 125 | H | H | F | H | H | H | —(CH$_2$)$_2$— | phenyl | — | | | F | H | Cl |
| 126 | H | H | F | H | H | H | —(CH$_2$)$_2$— | phenyl | — | | | F | F | Cl |
| 127 | H | H | F | H | H | H | —(CH$_2$)$_2$— | F-phenyl | — | | | H | H | OCF$_3$ |
| 128 | H | H | F | H | H | H | —(CH$_2$)$_2$— | F-phenyl | — | | | F | H | OCF$_3$ |
| 129 | H | H | F | H | H | H | —(CH$_2$)$_2$— | F-phenyl | — | | | F | F | OCF$_3$ |
| 130 | H | H | F | H | H | H | —(CH$_2$)$_2$— | F-phenyl | — | | | H | H | F |
| 131 | H | H | F | H | H | H | —(CH$_2$)$_2$— | F-phenyl | — | | | F | H | F |
| 132 | H | H | F | H | H | H | —(CH$_2$)$_2$— | F-phenyl | — | | | F | F | F |
| 133 | H | H | F | H | H | H | —(CH$_2$)$_2$— | F-phenyl | — | | | H | H | Cl |

-continued
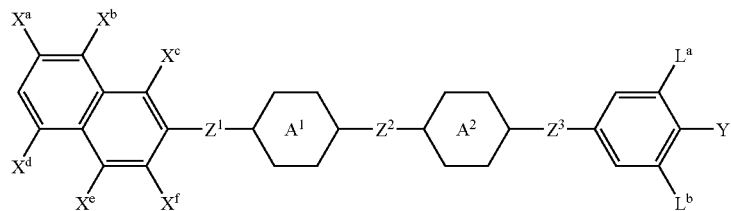
| No. | $X^a$ | $X^b$ | $X^c$ | $X^d$ | $X^e$ | $X^f$ | $Z^1$ | $A^1$ | $Z^2$ | $A^2$ | $Z^3$ | $L^a$ | $L^b$ | Y |
|---|---|---|---|---|---|---|---|---|---|---|---|---|---|---|
| 134 | H | H | F | H | H | H | —(CH$_2$)$_2$— | (3-F phenyl) | — | | | F | H | Cl |
| 135 | H | H | F | H | H | H | —(CH$_2$)$_2$— | (3-F phenyl) | — | | | F | F | Cl |
| 136 | H | H | F | H | H | H | —(CH$_2$)$_2$— | (3,5-diF phenyl) | — | | | H | H | OCF$_3$ |
| 137 | H | H | F | H | H | H | —(CH$_2$)$_2$— | (3,5-diF phenyl) | — | | | F | H | OCF$_3$ |
| 138 | H | H | F | H | H | H | —(CH$_2$)$_2$— | (3,5-diF phenyl) | — | | | F | F | OCF$_3$ |
| 139 | H | H | F | H | H | H | —(CH$_2$)$_2$— | (3,5-diF phenyl) | — | | | H | H | F |
| 140 | H | H | F | H | H | H | —(CH$_2$)$_2$— | (3,5-diF phenyl) | — | | | F | H | F |

-continued
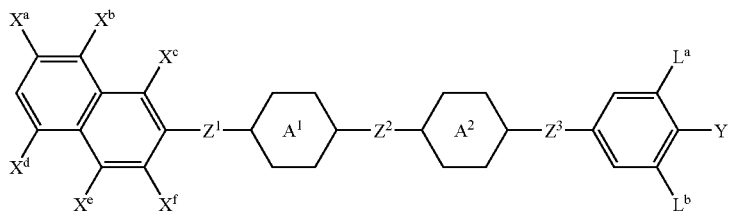
| No. | $X^a$ | $X^b$ | $X^c$ | $X^d$ | $X^e$ | $X^f$ | $Z^1$ | $A^1$ | $Z^2$ | $A^2$ | $Z^3$ | $L^a$ | $L^b$ | Y |
|---|---|---|---|---|---|---|---|---|---|---|---|---|---|---|
| 141 | H | H | F | H | H | H | —(CH$_2$)$_2$— | 3,5-diF-phenyl | — | | | F | F | F |
| 142 | H | H | F | H | H | H | —(CH$_2$)$_2$— | 3,5-diF-phenyl | — | | | H | H | Cl |
| 143 | H | H | F | H | H | H | —(CH$_2$)$_2$— | 3,5-diF-phenyl | — | | | F | H | Cl |
| 144 | H | H | F | H | H | H | —(CH$_2$)$_2$— | 3,5-diF-phenyl | — | | | F | F | Cl |
| 145 | H | H | H | H | H | H | — | 3-F-phenyl | —(CH$_2$)$_2$— | | | H | H | F  C 154.3 I |
| 146 | H | H | H | H | H | H | — | 3-F-phenyl | — | 3,5-diF-phenyl | — | F | H | Cl  C 215.0  N 307.4 I |
| 147 | H | H | H | H | H | H | —COO— | 3-F-phenyl | — | | | F | F | F |
| 148 | H | H | H | H | H | H | —COO— | 3-F-phenyl | — | | | F | H | Cl |

-continued
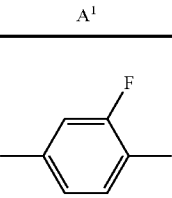
| No. | $X^a$ | $X^b$ | $X^c$ | $X^d$ | $X^e$ | $X^f$ | $Z^1$ | $A^1$ | $Z^2$ | $A^2$ | $Z^3$ | $L^a$ | $L^b$ | Y |
|---|---|---|---|---|---|---|---|---|---|---|---|---|---|---|
| 149 | H | H | H | H | H | H | —CF$_2$O— | 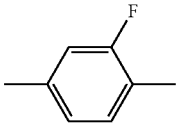 | — | | | F | F | F |
| 150 | H | H | H | H | H | H | —CF$_2$O— | 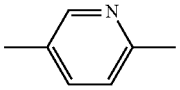 | — | | | F | H | Cl |
| 151 | H | H | H | H | H | H | — |  | — | | | F | H | F |
| 152 | H | H | F | H | H | H | —(CH$_2$)$_2$— | 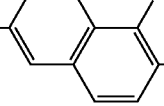 | — | | | F | H | Cl |
| 153 | H | H | F | H | H | H | — | 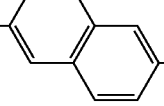 | — | | | F | H | Cl |
| 154 | H | H | F | H | H | F | — | 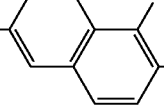 | — | | | F | F | F |
| 155 | H | F | F | H | H | F | —(CH$_2$)$_2$— | 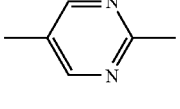 | — | | | H | H | Cl |
| 156 | H | H | H | H | H | H | — | 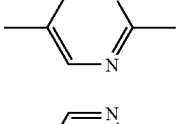 | — | | | F | F | F |
| 157 | H | H | F | H | H | H | — | 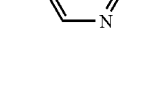 | — | | | F | H | F |
| 158 | H | F | H | H | H | F | — | 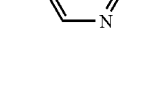 | — | | | H | H | OCF$_3$ |

-continued

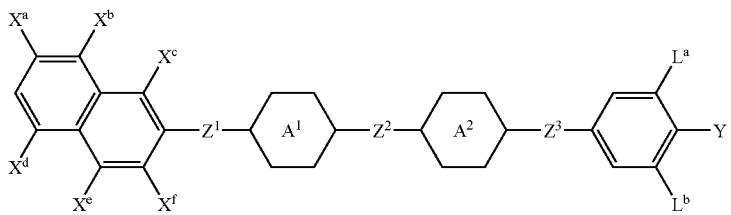

| No. | $X^a$ | $X^b$ | $X^c$ | $X^d$ | $X^e$ | $X^f$ | $Z^1$ | $A^1$ | $Z^2$ | $A^2$ | $Z^3$ | $L^a$ | $L^b$ | Y |
|---|---|---|---|---|---|---|---|---|---|---|---|---|---|---|
| 159 | H | H | H | H | H | H | —(CH$_2$)$_2$— | pyrimidine | — | | | H | H | F |
| 160 | H | H | F | H | H | H | —(CH$_2$)$_2$— | pyrimidine | — | | | H | H | Cl |
| 161 | H | H | F | H | H | F | —(CH$_2$)$_2$— | pyrimidine | — | | | F | H | OCF$_3$ |
| 162 | H | H | F | H | H | H | — | pyrimidine | —(CH$_2$)$_2$— | | | F | F | Cl |

Example 7

Four compounds, i.e., 4-(4-propylcyclohexyl)benzonitrile, 4-(4-pentylcyclohexyl)benzonitrile, 4-(4-heptylcyclohexyl)benzonitrile and 4-(4-pentylcyclohexyl)-4'-cyanobiphenyl, were mixed in amounts of 24%, 36%, 25% and 15% respectively to prepare a composition A having a nematic phase as a host liquid crystal, which had an upper-limit temperature (N—I point) of 71.7° C., a viscosity ($\eta_{20}$) of 27.0 mPa·s, a dielectric anisotropy ($\Delta\epsilon$) of 11.0 and an optical anisotropy ($\Delta$n) of 0.137. The composition A and the compound of No. 5, i.e., 2-(3,4-difluorophenyl)naphthalene, were mixed in amounts of 95% and 5% respectively to prepare a composition B, which had a dielectric anisotrophy ($\Delta\epsilon$) of 11.6 and an optical anisotropy ($\Delta$n) of 0.139. From the mixing ratio of the compounds and the above two values, the physical properties of the compound of No. 5 were calculated through extrapolation. The dielectric anisotropy ($\Delta\epsilon$) calculated was 11.6, and the optical anisotropy ($\Delta$n) calculated was 0.177.

Comparative Example 1

The composition A in Example 7 and 2-(3,4-difluorophenyl)-6-propylnaphthalene, which is the right-side compound in claim 6 of Japan Patent Publication No. Hei 4-504571 with $R_1$ being a propyl group, were mixed in amounts of 85% and 15% respectively to prepare a composition C, which had a dielectric anisotropy ($\Delta\epsilon$) of 11.3 and an optical anisotropy ($\Delta$n) of 0.141. From the mixing ratio of the compounds and the above two values, the physical properties of 2-(3,4-difluorophenyl)-6-propylnaphthalene were calculated with extrapolation. The dielectric anisotropy ($\Delta\epsilon$) calculated was 9.6, and the optical anisotropy ($\Delta$n) calculated was 0.164.

Accordingly, the compound of No. 5 in this invention, i.e., 2-(3,4-difluorophenyl)naphthalene, has a large positive dielectric anisotropy as well as a large optical anisotropy, each of which is even larger than that of 2-(3,4-difluorophenyl)-6-propylnaphthalene as a compound known in the prior art.

Representative compositions of this invention are described in Use Examples 1-14. The amounts (wt %) of the compounds as the composition components are shown first. A compound is notated by the symbols of the left terminal group, the bonding groups, the ring structures and the right terminal group in the manner shown in Table 1, wherein 1,4-cyclohexylene and 1,3-dioxane-2,5-diyl groups are in trans-configuration. Moreover, when no symbol of terminal group is shown, the terminal group is hydrogen. The physical properties of the composition are shown subsequently in some Examples.

TABLE 1

Notation of the compounds using symbols [R—(A$_1$)—Z$_1$—...—Z$_n$—(A$_n$)—R']

| 1) Left terminal group R— | Symbol | 3) Bonding group —Z$_n$— | Symbol |
|---|---|---|---|
| H— | none | —C$_2$H$_4$— | 2 |
| C$_n$H$_{2n+1}$— | n- | —C$_4$H$_8$— | 4 |
| C$_n$H$_{2n+1}$OC$_m$H$_{2m}$— | nOm- | —CH═CH— | V |

TABLE 1-continued

| Notation of the compounds using symbols [R—(A₁)—Z₁—...—Zₙ—(Aₙ)—R'] | | | |
|---|---|---|---|
| CH₂=CH— | V- | —COO— | E |
| CₙH₂ₙ₊₁CH=CH— | nV- | —C≡C— | T |
| CH₂=CHCₙH₂ₙ— | Vn- | —CF₂O— | X |
| CₙH₂ₙ₊₁CH=CHCₘH₂ₘ— | nVm- | | |
| CF₂=CH— | VFF- | | |
| CF₂=CHCₙH₂ₙ— | VFFn- | | |

| 2) Ring structure —Aₙ— | Symbol | 4) Right terminal group —R' | Symbol |
|---|---|---|---|
|  | B | —F | — |
| 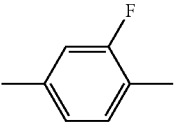 | B(F) | —Cl<br>—CN | —CL<br>—C |
| 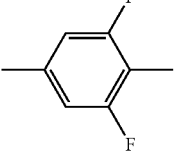 | B(F, F) | —OCF₂H<br>—OCF₃ | —OCF2H<br>—OCF3 |
| 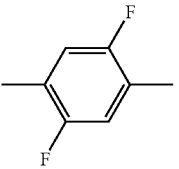 | B(2F, 5F) | —CF₃<br>—CₙH₂ₙ₊₁ | —CF3<br>-n |
| 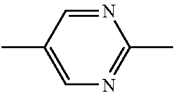 | Py | —OCₙH₂ₙ₊₁ | —On |
| 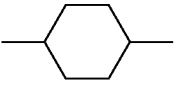 | H | —CH=CH₂<br>—CₙH₂ₙCH=CH₂ | -V<br>-nV |
| 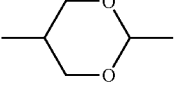 | G | —CH=CHCₙH₂ₙ₊₁ | -Vn |
| 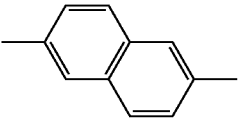 | Np | —CₙH₂ₙCH=CHCₘH₂ₘ₊₁ | -nVm |
| 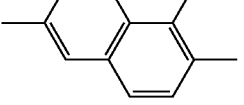 | | —CH=CF₂<br>—COOCH₃ | -VFF<br>-EMe |

TABLE 1-continued

Notation of the compounds using symbols [R—(A₁)—Z₁—...—Zₙ—(Aₙ)—R']

5) Notation examples

Example 1: 3-BB(F, F) XB(F, F)—

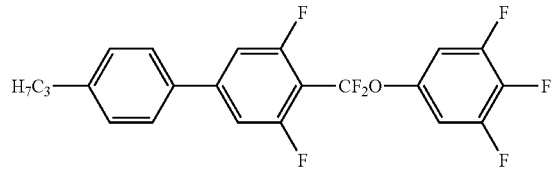

Example 2: 101-HBBH-5

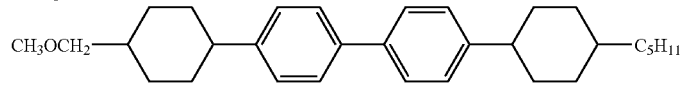

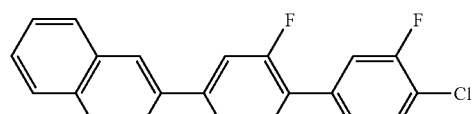

Example 3: Np B(F) B(F) —CL

Use Example 1:

| | |
|---|---|
| NpB(F)B(F)-CL | 5% |
| Np2B(F)B-F | 5% |
| 2-BEB(F)-C | 5% |
| 3-BEB(F)-C | 4% |
| 4-BEB(F)-C | 12% |
| 1V2-BEB(F,F)-C | 15% |
| 3-HB-O2 | 5% |
| 3-HH-4 | 3% |
| 3-HHB-F | 3% |
| 3-HHB-1 | 4% |
| 3-HHB-O1 | 4% |
| 3-HBEB-F | 4% |
| 3-HHEB-F | 7% |
| 5-HHEB-F | 7% |
| 3-H2BTB-2 | 4% |
| 3-H2BTB-3 | 4% |
| 3-H2BTB-4 | 4% |
| 3-HB(F)TB-2 | 5% |

N-I temperature = 85.8° C.; Δn = 0.145; Δε = 27.9; V$_{th}$ = 1.10 V.

Use Example 2:

| | |
|---|---|
| Np(F)B(F,F)-F | 4% |
| NpB(F)B(F,F)-F | 3% |
| 2-HB-C | 5% |
| 3-HB-C | 12% |
| 3-HB-O2 | 14% |
| 2-BTB-1 | 3% |
| 3-HHB-F | 4% |
| 3-HHB-1 | 8% |
| 3-HHB-O1 | 5% |
| 3-HHB-3 | 14% |
| 3-HHEB-F | 4% |
| 5-HHEB-F | 4% |
| 2-HHB(F)-F | 5% |
| 3-HHB(F)-F | 5% |
| 5-HHB(F)-F | 5% |
| 3-HHB(F,F)-F | 5% |

Use Example 3:

| | |
|---|---|
| NpB-CL | 3% |
| NpB(F,F)B(F)-CL | 3% |
| Np(F)2B(F)-F | 3% |
| 3-BEB(F)-C | 8% |
| 3-HB-C | 8% |
| V-HB-C | 8% |
| 1V-HB-C | 8% |
| 3-HB-O2 | 3% |
| 3-HH-2V | 10% |
| 3-HH-2V1 | 7% |
| V2-HHB-1 | 10% |
| 3-HHB-1 | 5% |
| 3-HHEB-F | 7% |
| 3-H2BTB-2 | 6% |
| 3-H2BTB-3 | 6% |
| 3-H2BTB-4 | 5% |

Use Example 4:

| | |
|---|---|
| Np2B(F,F)B-F | 4% |
| Np2B(F,F)B(F)-F | 5% |
| 5-BEB(F)-C | 5% |
| V-HB-C | 11% |
| 5-PyB-C | 6% |
| 4-BB-3 | 8% |
| 3-HH-2V | 10% |
| 5-HH-V | 11% |
| V-HHB-1 | 7% |
| V2-HHB-1 | 9% |
| 3-HHB-1 | 9% |
| 1V2-HBB-2 | 10% |
| 3-HHEBH-3 | 5% |

Use Example 5:

| | |
|---|---|
| Np2B(F)B(F,F)-F | 4% |
| Np2B(F)B(F)-CL | 4% |

-continued

| | |
|---|---|
| 1V2-BEB(F,F)-C | 6% |
| 3-HB-C | 18% |
| 2-BTB-1 | 10% |
| 5-HH-VFF | 22% |
| 3-HHB-1 | 4% |
| VFF-HHB-1 | 8% |
| VFF2-HHB-1 | 11% |
| 3-H2BTB-2 | 5% |
| 3-H2BTB-3 | 4% |
| 3-H2BTB-4 | 4% |

Use Example 6:

| | |
|---|---|
| NpB(F)B(F)-CL | 4% |
| Np2B(F)B-F | 4% |
| 5-HB-CL | 16% |
| 3-HH-4 | 12% |
| 3-HH-5 | 4% |
| 3-HHB-F | 4% |
| 3-HHB-CL | 3% |
| 4-HHB-CL | 4% |
| 3-HHB(F)-F | 7% |
| 4-HHB(F)-F | 7% |
| 5-HHB(F)-F | 7% |
| 7-HHB(F)-F | 6% |
| 5-HBB(F)-F | 5% |
| 1O1-HBBH-5 | 3% |
| 3-HHBB(F,F)-F | 2% |
| 4-HHBB(F,F)-F | 3% |
| 5-HHBB(F,F)-F | 3% |
| 3-HH2BB(F,F)-F | 3% |
| 4-HH2BB(F,F)-F | 3% |

N-I temperature = 109.8° C.; Δn = 0.094; Δε = 3.8; $V_{th}$ = 2.61 V.

When the above optically active compound Op-05 is further added in an amount of 0.25 part relative to 100 parts of the above composition, the pitch becomes 59.5 μm.

Use Example 7:

| | |
|---|---|
| NpB(F)B(F,F)-OCF3 | 3% |
| NpXB(F)B(F,F)-F | 3% |
| NpXB(F)B(F)-CL | 3% |
| 3-HHB(F,F)-F | 9% |
| 3-H2HB(F,F)-F | 8% |
| 4-H2HB(F,F)-F | 8% |
| 5-H2HB(F,F)-F | 8% |
| 3-HBB(F,F)-F | 22% |
| 5-HBB(F,F)-F | 10% |
| 3-H2BB(F,F)-F | 10% |
| 5-HHBB(F,F)-F | 3% |
| 5-HHEBB-F | 3% |
| 3-HH2BB(F,F)-F | 2% |
| 1O1-HBBH-4 | 4% |
| 1O1-HBBH-5 | 4% |

Use Example 8:

| | |
|---|---|
| NpEB(F)B(F,F)-F | 3% |
| NpEB(F)B(F)-CL | 4% |
| 5-HB-F | 12% |
| 6-HB-F | 9% |
| 7-HB-F | 7% |
| 2-HHB-OCF3 | 7% |
| 3-HHB-OCF3 | 7% |
| 4-HHB-OCF3 | 7% |
| 5-HHB-OCF3 | 5% |
| 3-HH2B-OCF3 | 4% |

-continued

| | |
|---|---|
| 5-HH2B-OCF3 | 4% |
| 3-HHB(F,F)-OCF2H | 4% |
| 3-HHB(F,F)-OCF3 | 4% |
| 3-HH2B(F)-F | 3% |
| 3-HBB(F)-F | 7% |
| 5-HBB(F)-F | 7% |
| 5-HBBH-3 | 3% |
| 3-HB(F)BH-3 | 3% |

Use Example 9:

| | |
|---|---|
| Np(F)B(F,F)-F | 5% |
| Np(F)2B(F)-F | 5% |
| 5-HB-CL | 11% |
| 3-HH-4 | 8% |
| 3-HHB-1 | 5% |
| 3-HHB(F,F)-F | 8% |
| 3-HBB(F,F)-F | 20% |
| 5-HBB(F,F)-F | 5% |
| 3-HHEB(F,F)-F | 10% |
| 4-HHEB(F,F)-F | 3% |
| 5-HHEB(F,F)-F | 3% |
| 2-HBEB(F,F)-F | 3% |
| 3-HBEB(F,F)-F | 5% |
| 5-HBEB(F,F)-F | 3% |
| 3-HHBB(F,F)-F | 6% |

Use Example 10:

| | |
|---|---|
| Np2B(F,F)B(F)-F | 4% |
| Np2B(F)B(F)-CL | 4% |
| 3-HB-CL | 6% |
| 5-HB-CL | 4% |
| 3-HHB-OCF3 | 5% |
| 3-H2HB-OCF3 | 5% |
| 5-H4HB-OCF3 | 11% |
| V-HHB(F)-F | 5% |
| 3-HHB(F)-F | 4% |
| 5-HHB(F)-F | 4% |
| 3-H4HB(F,F)-CF3 | 8% |
| 5-H4HB(F,F)-CF3 | 10% |
| 5-H2HB(F,F)-F | 5% |
| 5-H4HB(F,F)-F | 7% |
| 2-H2BB(F)-F | 5% |
| 3-H2BB(F)-F | 8% |
| 3-HBEB(F,F)-F | 5% |

Use Example 11:

| | |
|---|---|
| Np2B(F)B(F,F)-F | 5% |
| NpXB(F)B(F,F)-F | 5% |
| 5-HB-CL | 17% |
| 7-HB(F,F)-F | 3% |
| 3-HH-4 | 10% |
| 3-HH-5 | 5% |
| 3-HB-O2 | 11% |
| 3-HHB-1 | 8% |
| 3-HHB-O1 | 5% |
| 2-HHB(F)-F | 5% |
| 3-HHB(F)-F | 5% |
| 5-HHB(F)-F | 5% |
| 3-HHB(F,F)-F | 6% |
| 3-H2HB(F,F)-F | 5% |
| 4-H2HB(F,F)-F | 5% |

Use Example 12:

| | | |
|---|---|---|
| NpXB(F)B(F)-CL | 4% | |
| NpEB(F)B(F)-CL | 4% | |
| 5-HB-CL | 3% | |
| 7-HB(F)-F | 7% | |
| 3-HH-4 | 9% | |
| 3-HH-EMe | 15% | |
| 3-HHEB-F | 8% | |
| 5-HHEB-F | 8% | |
| 3-HHEB(F,F)-F | 10% | |
| 4-HHEB(F,F)-F | 5% | |
| 4-HGB(F,F)-F | 5% | |
| 5-HGB(F,F)-F | 6% | |
| 2-H2GB(F,F)-F | 4% | |
| 3-H2GB(F,F)-F | 5% | |
| 5-GHB(F,F)-F | 7% | |

Use Example 13:

| | | |
|---|---|---|
| NpB(F)B(F,F)-OCF3 | 3% | |
| Np2B(F,F)B(F)-F | 4% | |
| 3-HH-4 | 8% | |
| 3-HHB-1 | 6% | |
| 3-HHB(F,F)-F | 10% | |
| 3-H2HB(F,F)-F | 9% | |
| 3-HBB(F,F)-F | 15% | |
| 3-BB(F,F) X B(F,F)-F | 28% | |
| 1O1-HBBH-5 | 7% | |
| 2-HHBB(F,F)-F | 3% | |
| 3-HHBB(F,F)-F | 3% | |
| 3-HH2BB(F,F)-F | 4% | |

Use Example 14:

| | | |
|---|---|---|
| Np2B(F)B-CL | 5% | |
| 3-HBB(F,F)-F | 33% | |
| 5-HBB(F,F)-F | 5% | |
| 2-BB(2F,5F)B-2 | 8% | |
| 3-BB(2F,5F)B-3 | 10% | |
| 3-BB(F,F) XB(F,F)-F | 20% | |
| 2-HHBB(F,F)-F | 3% | |
| 5-HBB(F)B-2 | 9% | |
| 5-HBB(F)B-3 | 7% | |

N-I temperature = 97.0° C.;
Δn = 0.180;
Δε = 9.8;
$V_{th}$ = 1.59 V.

It will be apparent to those skilled in the art that various modifications and variations can be made to the structure of this invention without departing from the scope or spirit of this invention. In view of the foregoing, it is intended that this invention covers modifications and variations of this invention provided they fall within the scope of the following claims and their equivalents.

What is claimed is:

1. A nematic compound expressed by formula (1a):

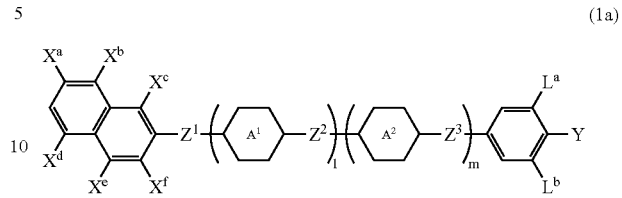

(1a)

wherein the ring $A^1$ is 1,4-phenylene, pyridine-2,5-diyl, pyrimidine-2,5-diyl or naphthalene-2,6-diyl, in which any hydrogen can be replaced by halogen; the ring $A^2$ is 2,6-difluoro-1,4-phenylene; $Z^1$ and $Z^2$ are independently a single bond, —(CH$_2$)$_2$—, —(CH$_2$)$_4$—, —CF$_2$O—, —OCF$_2$— or —COO—; $Z^3$ is a single bond; $X^a$, $X^b$, $X^d$ and $X^e$ are independently hydrogen or fluorine; $X'$ is fluorine; $X^f$ is hydrogen; Y is —OCH$_2$F, —OCHF$_2$, —OCF$_3$, —SCH$_2$F, —SCHF$_2$, —SCF$_3$, —CH$_2$F, —CHF$_2$, —CF$_3$, fluorine or chlorine, $L^a$ and $L^b$ are independently hydrogen or fluorine; and "l" and "m" are independently equal to 0 or 1.

2. A nematic compound expressed by formula (1b):

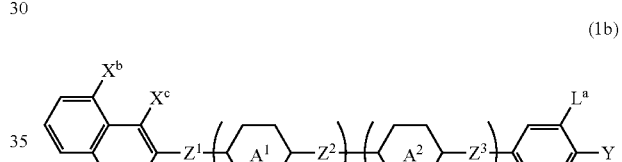

(1b)

(a)

(b)

(c)

(d)

(e)

-continued

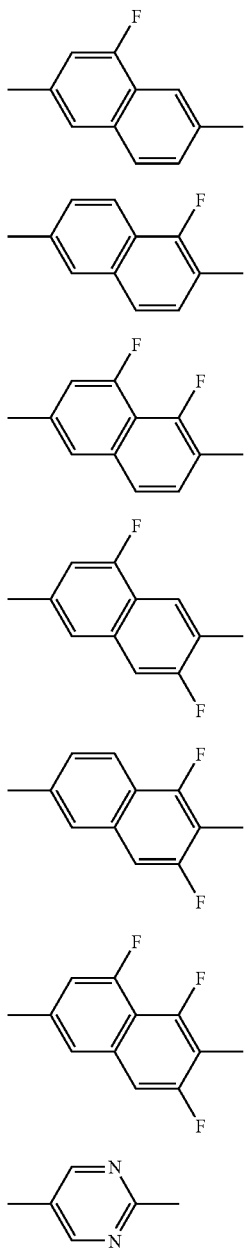

wherein the ring $A^1$ is selected from the above ring structures (a)-(l); the ring $A^2$ is the above ring structure (c); $Z^1$ and $Z^2$ are independently a single bond, —(CH$_2$)$_2$—, —CF$_2$O—, —OCF$_2$— or —COO—; $Z^3$ is a single bond; $X^b$ is hydrogen or fluorine; $X^c$ is fluorine; $X^f$ is hydrogen; Y is —OCH$_2$F, —OCHF$_2$, —OCF$_3$, —CH$_2$F, —CHF$_2$, —CF$_3$, fluorine or chlorine, $L^a$ and $L^b$ are independently hydrogen or fluorine; and "l" and "m" are independently equal to 0 or 1.

3. The compound of claim 2, wherein in formula (1b), the ring $A^1$ is selected from the ring structures (a)-(d); the ring $A^2$ is the ring structure (c); $Z^1$ and $Z^2$ are independently a single bond, —(CH$_2$)$_2$—, —CF$_2$O— or —COO—; $X^b$ is hydrogen; Y is —OCF$_3$, fluorine or chlorine; $L^a$ and $L^b$ are independently hydrogen or fluorine; and "l" and "m" are independently equal to 0 or 1.

4. A compound expressed by any one of formulae (1c-1) to (1c-3):

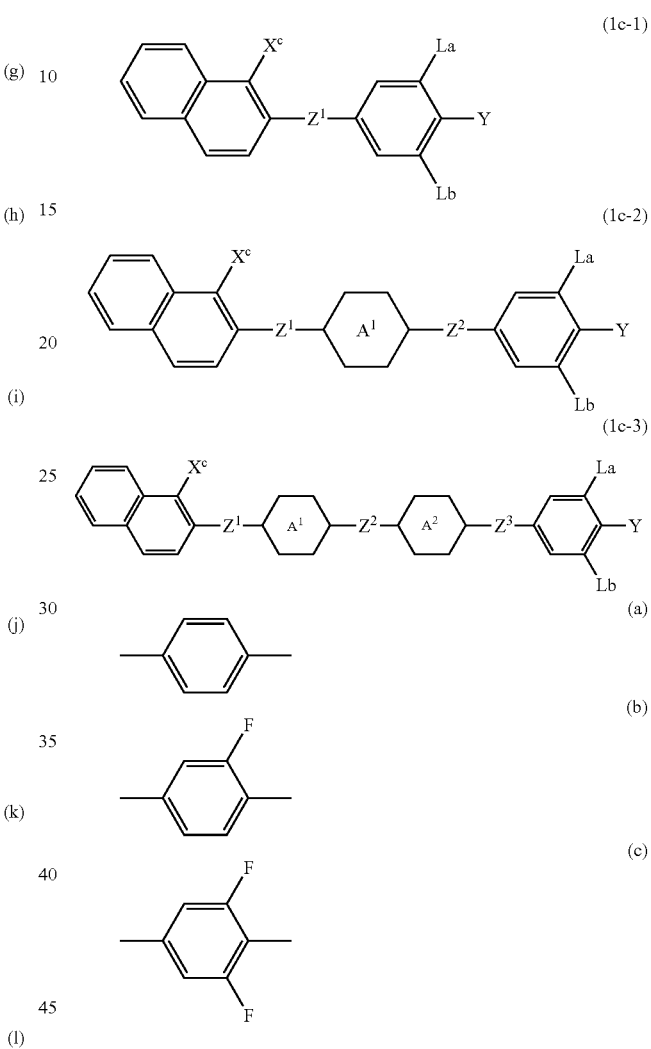

wherein the ring $A^1$ is selected from the ring structures (a)-(c); the ring $A^2$ is the ring structure (c); $Z^1$ and $Z^2$ are independently a single bond, —(CH$_2$)$_2$—, —CF$_2$O— or —COO—; $Z^3$ is a single bond; $X^c$ is fluorine; Y is —OCF$_3$, fluorine or chlorine; and $L^a$ and $L^b$ are independently hydrogen or fluorine.

5. The compound of claim 4, wherein in formulae (1c-1) to (1c-3), $Z^1$ is a single bond or —(CH$_2$)$_2$—.

6. The compound of claim 4, wherein in formulae (1c-1) to (1c-3), $Z^1$, $Z^2$ and $Z^3$ each is a single bond.

7. The compound of claim 4, wherein in formulae (1c-1) to (1c-3), $Z^1$ is —(CH$_2$)$_2$— and $Z^2$ and $Z^3$ each is a single bond.

8. The compound of claim 4, wherein in formulae (1c-2) and (1c-3), $Z^1$ and $Z^3$ each is a single bond and $Z^2$ is —(CH$_2$)$_2$—.

9. The compound of claim 4, wherein in formulae (1c-1) to (1c-3), one of $Z^1$ and $Z^2$ is —CF$_2$O—, the other of $Z^1$ and $Z^2$ is a single bond, and $Z^3$ is a single bond.

10. The compound of claim 4, wherein in formulae (1c-1) to (1c-3), one of $Z^1$ and $Z^2$ is —COO—, the other of $Z^1$ and $Z^2$ is a single bond, and $Z^3$ is a single bond.
11. A compound expressed by any one of formulae (1c-1-2) and (1c-1-4) and formulae (1c-2-1) to (1c-2-12):
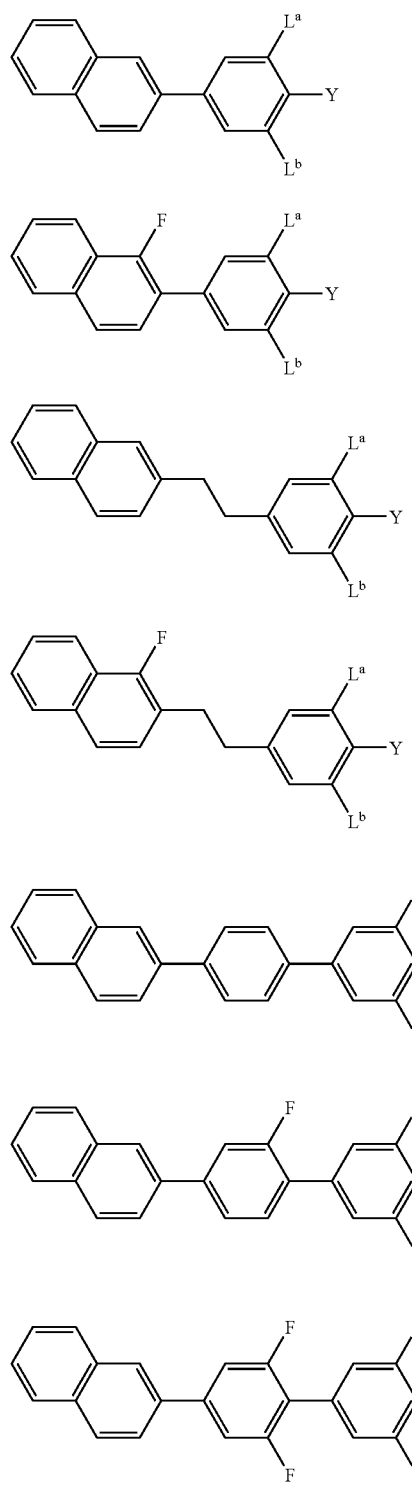
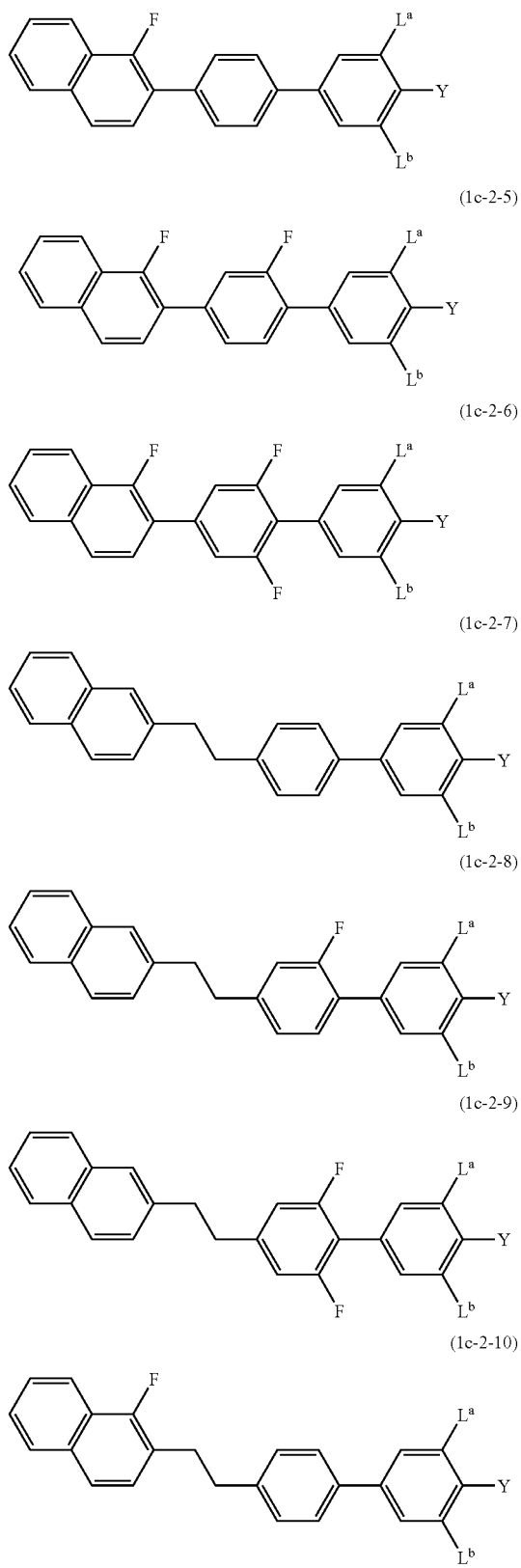

(1c-2-11)

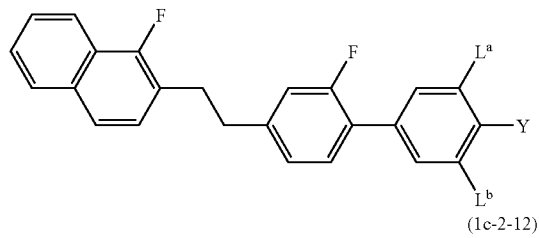

(1c-2-12)

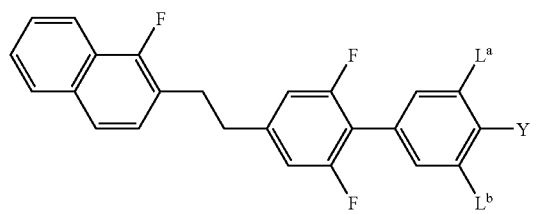

wherein Y is —OCF$_3$, fluorine or chlorine; and L$^a$ and L$^b$ are independently hydrogen or fluorine.

12. The compound of claim 11, wherein in any one of formulae (1c-1-2) and (1c-1-4) and formulae (1c-2-1) to (1c-2-12), Y is —OCF$_3$ and L$^a$ and L$^b$ are hydrogen.

13. The compound of claim 11, wherein in any one of formulae (1c-1-2) and (1c-1-4) and formulae (1c-2-1) to (1c-2-12), Y is —OCF$_3$, L$^a$ is fluorine and L$^b$ is hydrogen.

14. The compound of claim 11, wherein in any one of formulae (1c-1-2) and (1c-1-4) and formulae (1c-2-1) to (1c-2-12), Y is —OCF$_3$ and L$^a$ and L$^b$ are fluorine.

15. The compound of claim 11, wherein in any one of formulae (1c-1-2) and (1c-1-4) and formulae (1c-2-1) to (1c-2-12), Y is fluorine and L$^a$ and L$^b$ are hydrogen.

16. The compound of claim 11, wherein in any one of formulae (1c-1-2) and (1c-1-4) and formulae (1c-2-1) to (1c-2-12), Y is fluorine, L$^a$ is fluorine and L$^b$ is hydrogen.

17. The compound of claim 11, wherein in any one of formulae (1c-1-2) and (1c-1-4) and formulae (1c-2-1) to (1c-2-12), Y is fluorine and L$^a$ and L$^b$ are fluorine.

18. The compound of claim 11, wherein in any one of formulae (1c-1-2) and (1c-1-4) and formulae (1c-2-1) to (1c-2-12), Y is chlorine and L$^a$ and L$^b$ are hydrogen.

19. The compound of claim 11, wherein in any one of formulae (1c-1-2) and (1c-1-4) and formulae (1c-2-1) to (1c-2-12), Y is chlorine, L$^a$ is fluorine and L$^b$ is hydrogen.

20. The compound of claim 11, wherein in any one of formulae (1c-1-2) and (1c-1-4) and formulae (1c-2-1) to (1c-2-12), Y is chlorine and L$^a$ and L$^b$ are fluorine.

21. A nematic liquid crystal composition comprising two or more compounds, which comprise at least one compound of claim 1.

22. The liquid crystal composition of claim 21, further comprising at least one compound selected from the group consisting of compounds respectively expressed by formulae (2), (3) and (4):

(2)

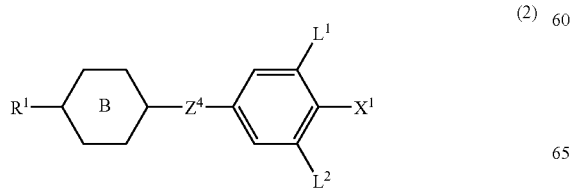

(3)

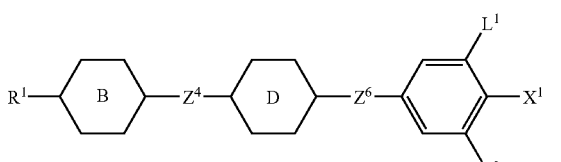

(4)

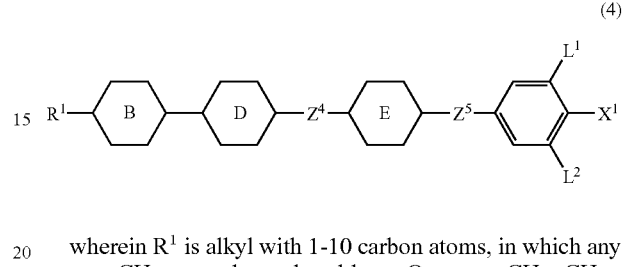

wherein R$^1$ is alkyl with 1-10 carbon atoms, in which any —CH$_2$— can be replaced by —O— or —CH=CH— and any hydrogen can be replaced by fluorine; X$^1$ is fluorine, chlorine, —OCF$_3$, —OCHF$_2$, —CF$_3$, —CHF$_2$, —CH$_2$F, —OCF$_2$CHF$_2$ or —OCF$_2$CHFCF$_3$; the ring B and the ring D are independently 1,4-cyclohexylene, 1,3-dioxane-2,5-diyl, or 1,4-phenylene in which any hydrogen can be replaced by fluorine; the ring E is 1,4-cyclohexylene, or 1,4-phenylene in which any hydrogen can be replaced by fluorine; Z$^4$ and Z$^5$ are independently —(CH$_2$)$_2$—, —(CH$_2$)$_4$—, —COO—, —CF$_2$O—, —OCF$_2$—, —CH=CH— or a single bond; and L$^1$ and L$^2$ are independently hydrogen or fluorine.

23. The liquid crystal composition of claim 21, further comprising at least one compound selected from the group consisting of compounds respectively expressed by formulae (5) and (6):

(5)

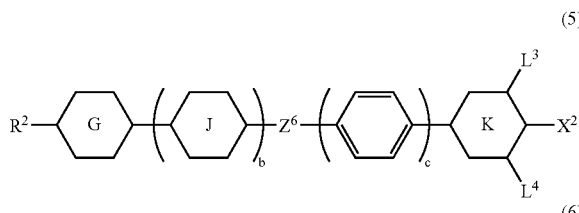

(6)

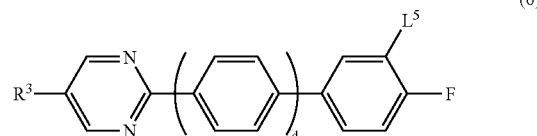

wherein R$^2$ and R$^3$ are independently alkyl with 1-10 carbon atoms, in which any —CH$_2$— can be replaced by —O— or —CH=CH— and any hydrogen can be replaced by fluorine; X$^2$ is —CN or —C≡C—CN; the ring G is 1,4-cyclohexylene, 1,4-phenylene, 1,3-dioxane-2,5-diyl or pyrimidine-2,5-diyl; the ring J is 1,4-cyclohexylene, pyrimidine-2,5-diyl, or 1,4-phenylene in which any hydrogen can be replaced by fluorine; the ring K is 1,4-cyclohexylene or 1,4-phenylene; Z$^6$ is —(CH$_2$)$_2$—, —COO—, —CF$_2$O—, —OCF$_2$— or a single bond; L$^3$, L$^4$ and L$^5$ are independently hydrogen or fluorine; and "b", "c" and "d" are independently equal to 0 or 1.

24. The liquid crystal composition of claim 21, further comprising at least one compound selected from the group consisting of compounds respectively expressed by formulae (7), (8), (9), (10) and (11):

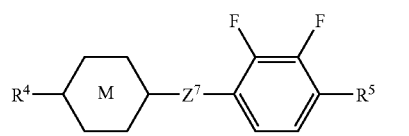
(7)

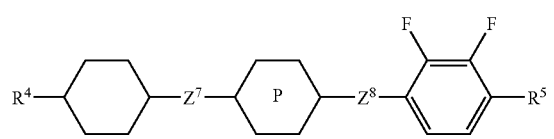
(8)

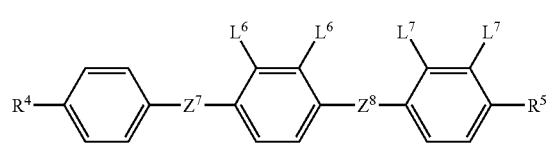
(9)

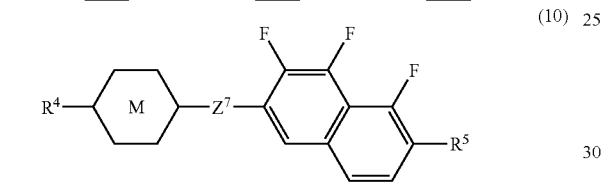
(10)

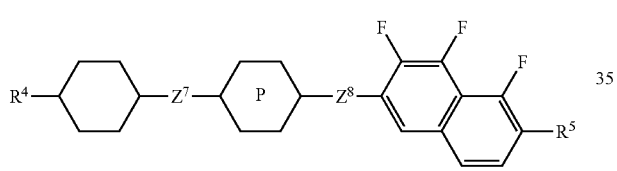
(11)

wherein $R^4$ is alkyl with 1-10 carbon atoms, in which any —$CH_2$— can be replaced by —O— or —CH=CH— and any hydrogen can be replaced by fluorine; $R^5$ is fluorine or alkyl with 1-10 carbon atoms, in which any —$CH_2$— can be replaced by —O— or —CH=CH— and any hydrogen can be replaced by fluorine; the ring M and the ring P are independently 1,4-cyclohexylene, 1,4-phenylene or decahydro-2,6-naphthylene; $Z^7$ and $Z^8$ are independently —$(CH_2)_2$—, —COO— or a single bond; $L^6$ and $L^7$ are independently hydrogen or fluorine, while at least one of $L^6$ and $L^7$ is fluorine.

25. The liquid crystal composition of claim 21, further comprising at least one compound selected from the group consisting of compounds respectively expressed by formulae (12), (13) and (14):

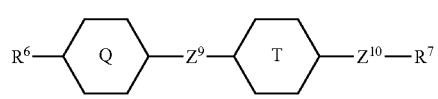
(12)

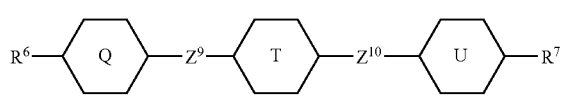
(13)

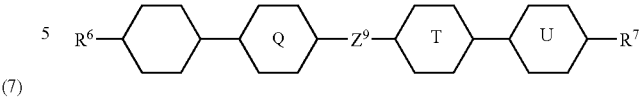
(14)

wherein $R^6$ and $R^7$ are independently alkyl with 1-10 carbon atoms, in which any —$CH_2$— can be replaced by —O— or —CH=CH— and any hydrogen can be replaced by fluorine; the ring Q, the ring T and the ring U are independently 1,4-cyclohexylene, pyrimidine-2,5-diyl, or 1,4-phenylene in which any hydrogen can be replaced by fluorine; and $Z^9$ and $Z^{10}$ are independently —C≡C—, —COO—, —$(CH_2)_2$—, —CH=CH— or a single bond.

26. The liquid crystal composition of claim 22, further comprising at least one compound selected from the group consisting of compounds respectively expressed by formulae (5) and (6):

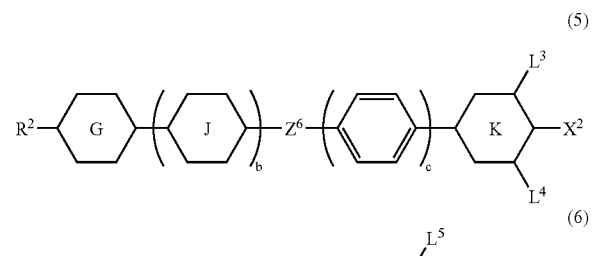
(5)

(6)
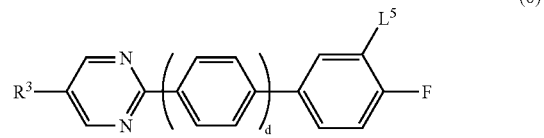

wherein $R^2$ and $R^3$ are independently alkyl with 1-10 carbon atoms, in which any —$CH_2$— can be replaced by —O— or —CH=CH— and any hydrogen can be replaced by fluorine; $X^2$ is —CN or —C≡C—CN; the ring G is 1,4-cyclohexylene, 1,4-phenylene, 1,3-dioxane-2,5-diyl or pyrimidine-2,5-diyl; the ring J is 1,4-cyclohexylene, pyrimidine-2,5-diyl, or 1,4-phenylene in which any hydrogen can be replaced by fluorine; the ring K is 1,4-cyclohexylene or 1,4-phenylene; $Z^6$ is —$(CH_2)_2$—, —COO—, —$CF_2O$—, —$OCF_2$— or a single bond; $L^3$, $L^4$ and $L^5$ are independently hydrogen or fluorine; and "b", "c" and "d" are independently equal to 0 or 1.

27. The liquid crystal composition of claim 22, further comprising at least one compound selected from the group consisting of compounds respectively expressed by formulae (12), (13) and (14):

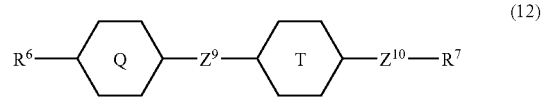
(12)

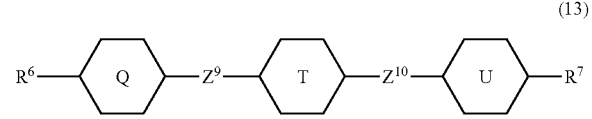
(13)

-continued

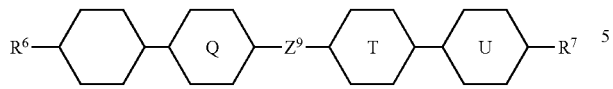
(14)

wherein $R^6$ and $R^7$ are independently alkyl with 1-10 carbon atoms, in which any —$CH_2$— can be replaced by —O— or —CH=CH— and any hydrogen can be replaced by fluorine; the ring Q, the ring T and the ring U are independently 1,4-cyclohexylene, pyrimidine-2,5-diyl, or 1,4-phenylene in which any hydrogen can be replaced by fluorine; and $Z^9$ and $Z^{10}$ are independently —C≡C—, —COO—, —$(CH_2)_2$—, —CH=CH— or a single bond.

28. The liquid crystal composition of claim 23, further comprising at least one compound selected from the group consisting of compounds respectively expressed by formulae (12), (13) and (14):

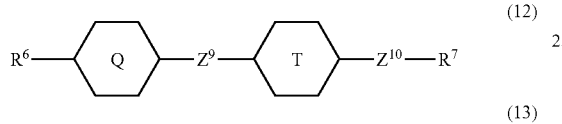
(12)

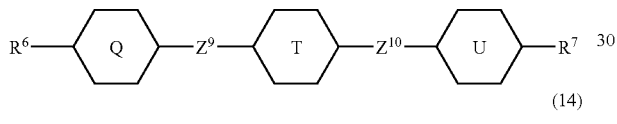
(13)

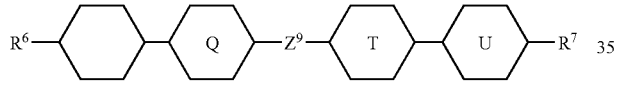
(14)

wherein $R^6$ and $R^7$ are independently alkyl with 1-10 carbon atoms, in which any —$CH_2$— can be replaced by —O— or —CH=CH— and any hydrogen can be replaced by fluorine; the ring Q, the ring T and the ring U are independently 1,4-cyclohexylene, pyrimidine-2,5-diyl, or 1,4-phenylene in which any hydrogen can be replaced by fluorine; and $Z^9$ and $Z^{10}$ are independently —C≡C—, —COO—, —$(CH_2)_2$—, —CH=CH— or a single bond.

29. The liquid crystal composition of claim 24, further comprising at least one compound selected from the group consisting of compounds respectively expressed by formulae (12), (13) and (14):

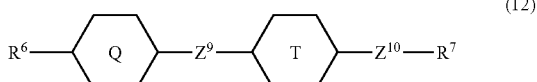
(12)

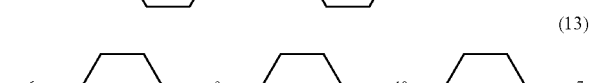
(13)

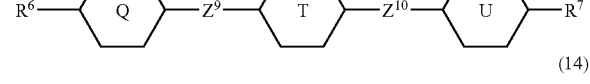
(14)

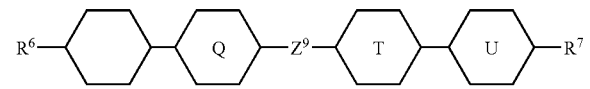

wherein $R^6$ and $R^7$ are independently alkyl with 1-10 carbon atoms, in which any —$CH_2$— can be replaced by —O— or —CH=CH— and any hydrogen can be replaced by fluorine; the ring Q, the ring T and the ring U are independently 1,4-cyclohexylene, pyrimidine-2,5-diyl, or 1,4-phenylene in which any hydrogen can be replaced by fluorine; and $Z^9$ and $Z^{10}$ are independently —C≡C—, —COO—, —$(CH_2)_2$—, —CH=CH— or a single bond.

30. The liquid crystal composition of claim 21, further comprising at least one optically active compound.

31. A liquid crystal display device, comprising the liquid crystal composition of claim 21.

* * * * *